(12) United States Patent
Sakai et al.

(10) Patent No.: US 8,790,202 B2
(45) Date of Patent: Jul. 29, 2014

(54) POWER TRANSMISSION APPARATUS FOR HYBRID VEHICLE

(75) Inventors: Atsuhiro Sakai, Saitama (JP); Shinji Fujimoto, Saitama (JP); Takefumi Ikegami, Saitama (JP); Seiichi Mogi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 359 days.

(21) Appl. No.: 13/203,672

(22) PCT Filed: Mar. 3, 2010

(86) PCT No.: PCT/JP2010/053937
§ 371 (c)(1),
(2), (4) Date: Sep. 30, 2011

(87) PCT Pub. No.: WO2010/101296
PCT Pub. Date: Sep. 10, 2010

(65) Prior Publication Data
US 2012/0021861 A1  Jan. 26, 2012

(30) Foreign Application Priority Data
Mar. 3, 2009  (JP) .................. 2009-049254

(51) Int. Cl.
| | |
|---|---|
| *F16H 3/72* | (2006.01) |
| *F16H 37/06* | (2006.01) |
| *B60K 6/547* | (2007.10) |
| *F16H 3/12* | (2006.01) |
| *B60K 6/48* | (2007.10) |
| *B60K 6/383* | (2007.10) |
| *B60K 6/365* | (2007.10) |
| *F16H 3/00* | (2006.01) |

(52) U.S. Cl.
CPC ............. *B60K 6/48* (2013.01); *B60Y 2400/428* (2013.01); *Y02T 10/6221* (2013.01); *B60K 6/547* (2013.01); *F16H 3/126* (2013.01); *F16H 3/006* (2013.01); *B60K 6/383* (2013.01); *F16H 2200/0043* (2013.01); *B60K 6/365* (2013.01)
USPC ............................................. 475/5

(58) Field of Classification Search
USPC ................................. 475/5; 74/330
See application file for complete search history.

(56) References Cited

U.S. PATENT DOCUMENTS

| | | |
|---|---|---|
| 6,591,705 B1 | 7/2003 | Reik et al. |
| 2002/0033059 A1 | 3/2002 | Pels et al. |

(Continued)

FOREIGN PATENT DOCUMENTS

| | | |
|---|---|---|
| CN | 101311579 A | 11/2008 |
| EP | 0 845 618 A2 | 6/1998 |

(Continued)

OTHER PUBLICATIONS

Office Action, Chinese Applicaiton dated Aug. 5, 2013.

*Primary Examiner* — Justin Holmes
*Assistant Examiner* — Stacey Fluhart
(74) *Attorney, Agent, or Firm* — Westerman, Hattori, Daniels & Adrian LLP

(57) ABSTRACT

A power transmission apparatus 1 for a hybrid vehicle having an engine 6 and a motor 7 is provided with a planetary gear mechanism 31 configured to differentially rotate a sun gear 32, a carrier 36, and a ring gear 35. The sun gear 32 is connected to one of a first input shaft and a second input shaft and to the motor 7. The ring gear 35 is connected to a lock mechanism capable of stopping a rotation state. The carrier 36 is configured to transmit power to a counter shaft 14. The other of the first input shaft and the second input shaft is configured to transmit power to the counter shaft 14 without passing through the planetary gear mechanism 31.

25 Claims, 33 Drawing Sheets

(56) References Cited

U.S. PATENT DOCUMENTS

| | | |
|---|---|---|
| 2006/0194665 A1* | 8/2006 | Heitmann et al. ............ 475/5 |
| 2006/0205552 A1* | 9/2006 | Grumbach et al. ............ 475/5 |
| 2009/0011887 A1 | 1/2009 | Komada et al. |
| 2010/0009805 A1 | 1/2010 | Bachmann |
| 2010/0311540 A1 | 12/2010 | Hellenbroich |
| 2012/0028747 A1* | 2/2012 | Imamura et al. ............ 475/5 |
| 2013/0035186 A1* | 2/2013 | Martin et al. ............ 475/5 |

FOREIGN PATENT DOCUMENTS

| | | |
|---|---|---|
| EP | 1 209 017 A2 | 5/2002 |
| EP | 1 826 462 A2 | 8/2007 |
| JP | 2007-290677 A | 11/2007 |
| WO | WO 2008/074614 A1 | 6/2008 |
| WO | WO 2008/138387 A1 | 11/2008 |

* cited by examiner

FIG.4 ⟨STOP⟩

(a)

(b)

NORMAL ROTATION ← 0 → REVERSE ROTATION

S (MOT)   C (DW)   R (OWC)

FIG.5 <ENGINE START>
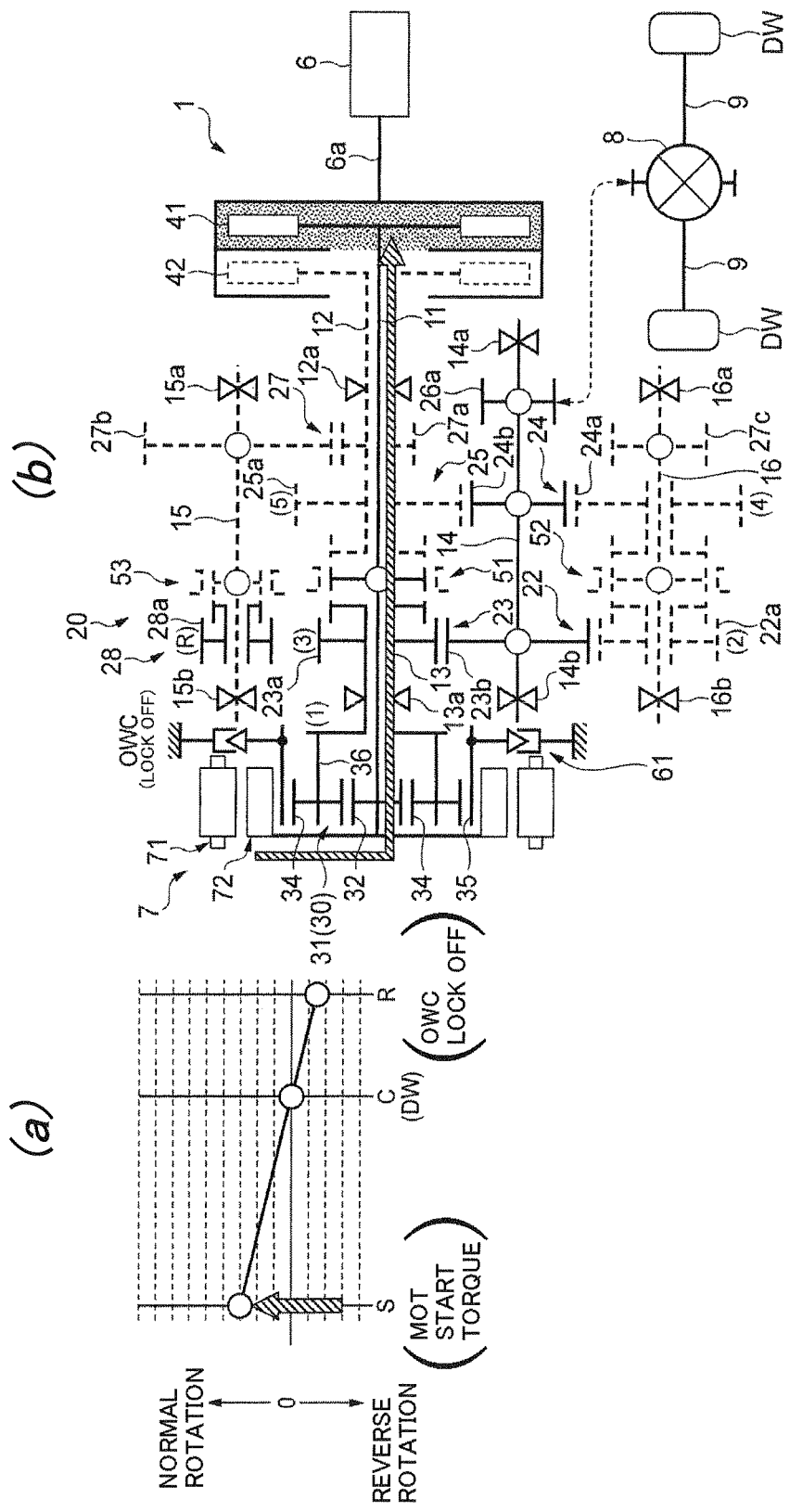

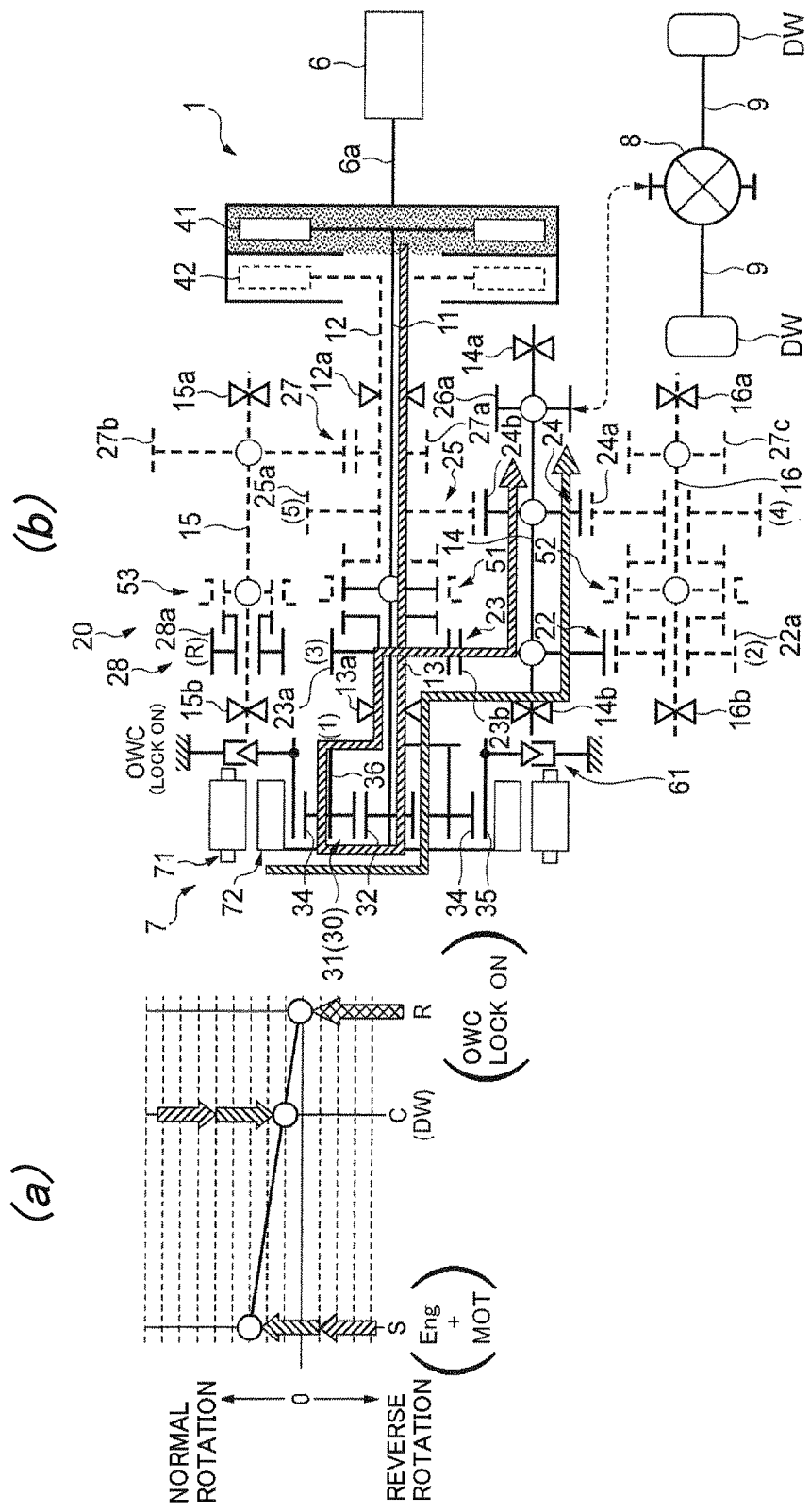
FIG.6 ⟨1ST MODE ASSIST⟩

FIG. 7
(a) <1ST MODE>
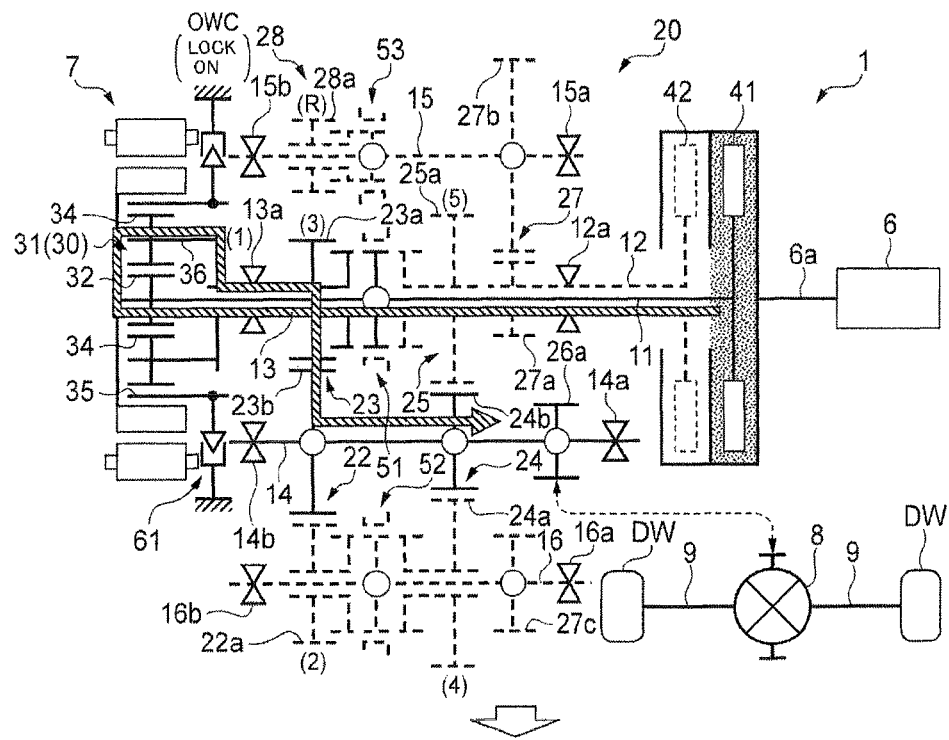
(b) <2ND POST1 MODE>
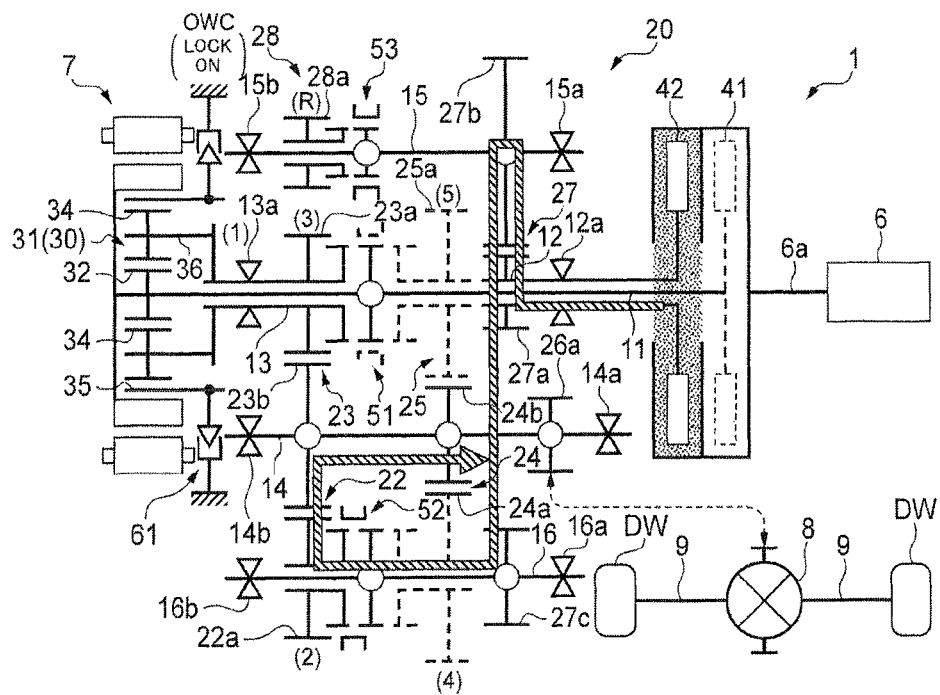

FIG.8  ⟨2ND POST1 MODE ASSIST⟩

FIG.9 ⟨2ND MODE (CLUTCH DOUBLE CLAMP) ASSIST⟩

⟨2ND PRE3 MODE ASSIST⟩

FIG. 11
(a) <2ND MODE>
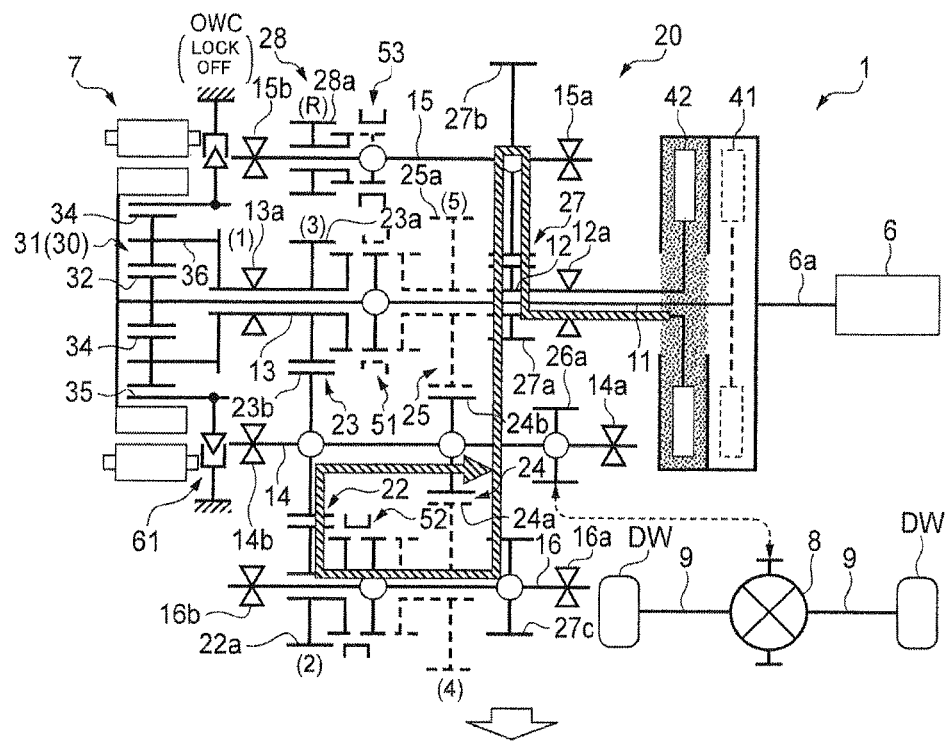
(b) <3RD POST2 MODE>
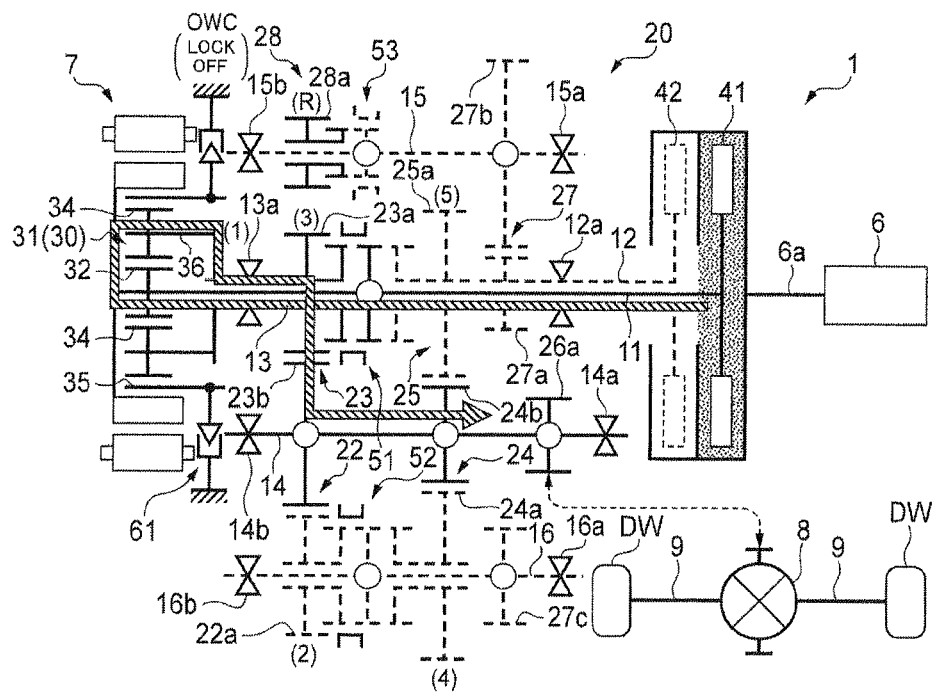

FIG.12 〈3RD MODE ASSIST〉

FIG.13
(a) <3RD MODE>
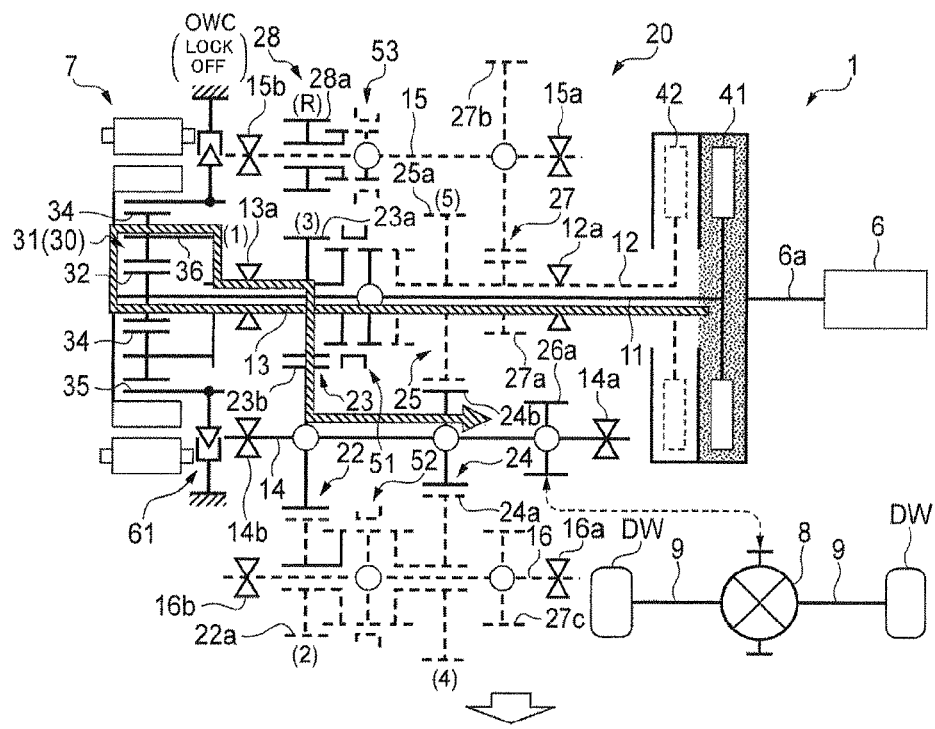
(b) <4TH POST3 MODE>
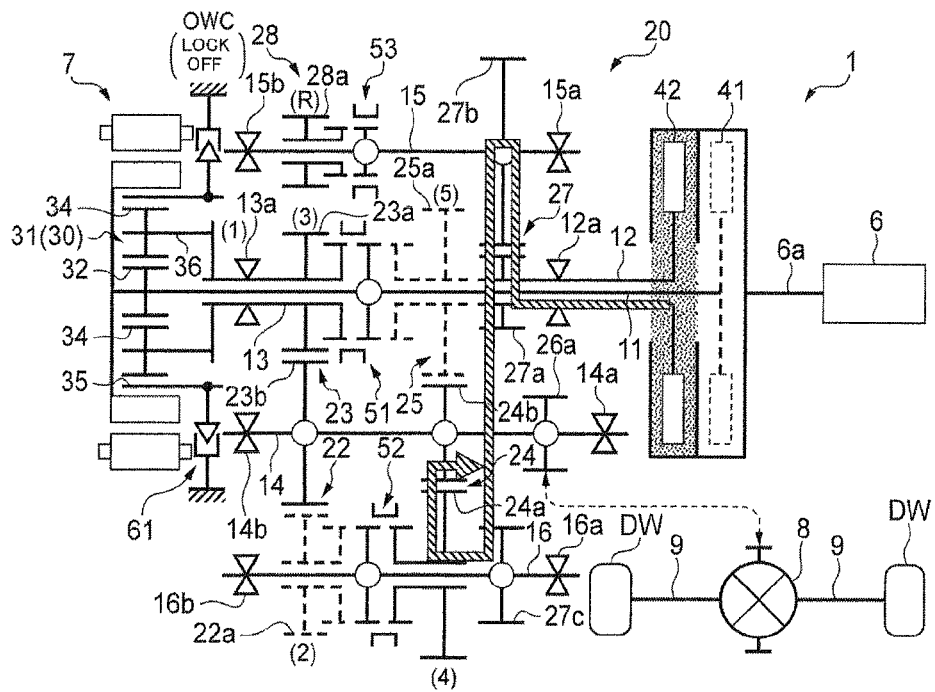

⟨4TH POST3 MODE ASSIST⟩

FIG.15 ⟨4TH MODE (CLUTCH DOUBLE CLAMP) ASSIST⟩

FIG.16 ⟨4TH PRE5 MODE ASSIST⟩

FIG.17
(a)
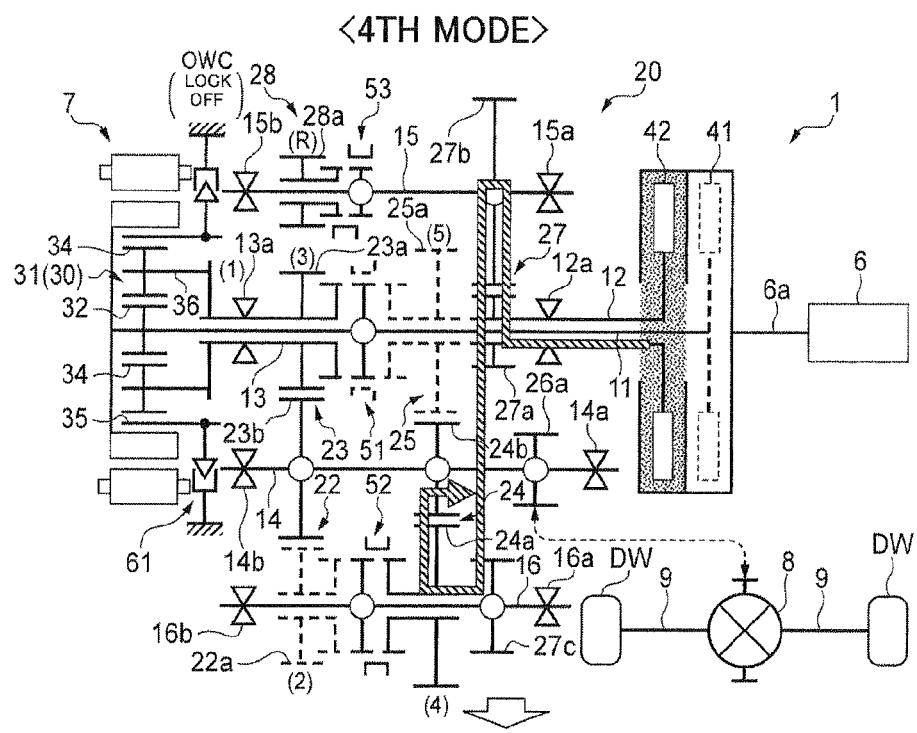
(b)
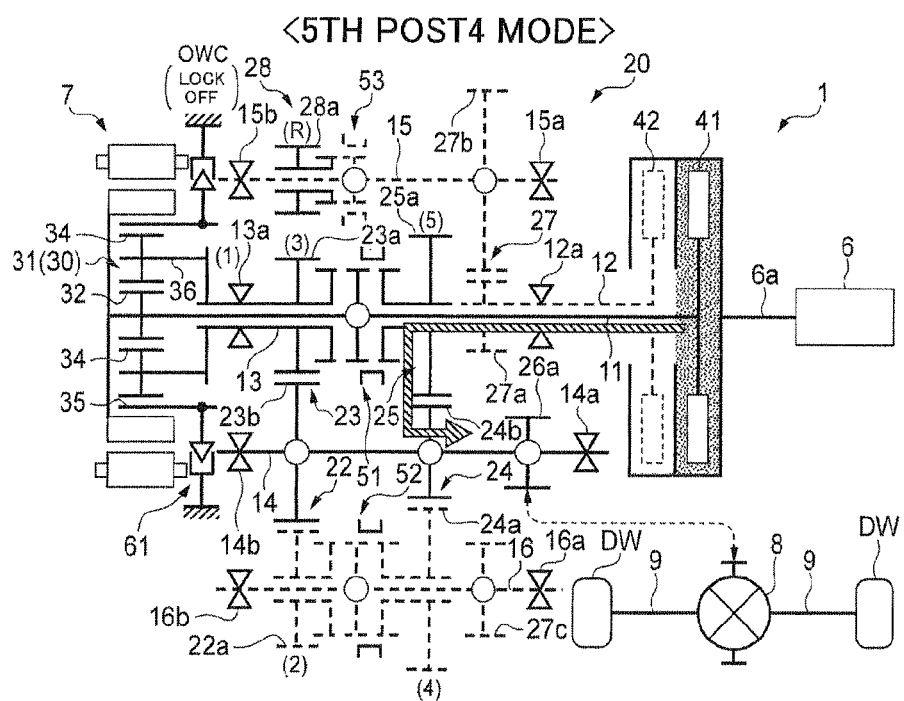

FIG.18 〈5TH MODE ASSIST〉

FIG.19 <1ST EV MODE>

⟨3RD EV MODE⟩

FIG.21 ⟨5TH EV MODE⟩

FIG.27 ⟨ENGINE START & VERY LOW-SPEED TRAVELING⟩

FIG.28 ⟨IDLE CHARGING⟩

FIG.30

| Vehicle Condition | | Clutch | | One-way Clutch (Brake), Sifter | | | | Motor | | | Engine |
|---|---|---|---|---|---|---|---|---|---|---|---|
| Function | Condition | First (Odd Number Stage) | Second (Even Number Stage) | 1 OWC | 3-5 | 2-4 | RVS | Rotation Direction | Torque Applying Direction | Condition | |
| Engine Start During Stopping | Engine Start | | | - | - | - | - | Normal | Normal | Drive | Start |
| Normal Traveling | 1st | ON | OFF | 1 | - | - | - | Normal | Normal | Drive | ON |
| | | ON | OFF | 1 | - | - | - | Normal | Reverse | Charge | ON |
| | 1st Pre2 | ON | OFF | 1 | - | 2 | - | Normal | Normal | Drive | ON |
| | | ON | OFF | 1 | - | 2 | - | Normal | Reverse | Charge | ON |
| | 2nd Post1 | OFF | ON | 1 | - | 2 | - | Normal | Normal | Drive | ON |
| | | OFF | ON | 1 | - | 2 | - | Normal | Reverse | Charge | ON |
| | | ON | ON | - | - | 2 | - | Normal | Normal | Drive | ON |
| | 2nd | ON | ON | - | - | 2 | - | Normal | Reverse | Charge | ON |
| | | OFF | ON | - | - | 2 | - | | | Disconnect | ON |
| | 2nd Pre3 | OFF | ON | - | 3 | 2 | - | Normal | Normal | Drive | ON |
| | | OFF | ON | - | 3 | 2 | - | Normal | Reverse | Charge | ON |
| | 3rd Post2 | ON | OFF | - | 3 | 2 | - | Normal | Normal | Drive | ON |
| | | ON | OFF | - | 3 | 2 | - | Normal | Reverse | Charge | ON |
| | 3rd | ON | OFF | - | 3 | | - | Normal | Normal | Drive | ON |
| | | ON | OFF | - | 3 | | - | Normal | Reverse | Charge | ON |
| | 3rd Pre4 | ON | OFF | - | 3 | 4 | - | Normal | Normal | Drive | ON |
| | | ON | OFF | - | 3 | 4 | - | Normal | Reverse | Charge | ON |
| | 4th Post3 | OFF | ON | - | 3 | 4 | - | Normal | Normal | Drive | ON |
| | | OFF | ON | - | 3 | 4 | - | Normal | Reverse | Charge | ON |
| | | ON | ON | - | - | 4 | - | Normal | Normal | Drive | ON |
| | 4th | ON | ON | - | - | 4 | - | Normal | Reverse | Charge | ON |
| | | OFF | ON | - | - | 4 | - | | | Disconnect | ON |
| | 4th Pre5 | OFF | ON | - | 5 | 4 | - | Normal | Normal | Drive | ON |
| | | OFF | ON | - | 5 | 4 | - | Normal | Reverse | Charge | ON |
| | 5th Post4 | ON | OFF | - | 5 | - | - | Normal | Normal | Drive | ON |
| | | ON | OFF | - | 5 | - | - | Normal | Reverse | Charge | ON |
| | 5th | ON | OFF | - | 5 | - | - | Normal | Normal | Drive | ON |
| | | ON | OFF | - | 5 | - | - | Normal | Reverse | Charge | ON |
| | RVS | ON | ON | - | - | - | RVS | Reverse | Reverse | Drive | ON |
| | | ON | ON | - | - | - | RVS | Reverse | Normal | Charge | ON |
| | | OFF | OFF | - | - | - | RVS | | | Disconnect | ON |
| Motor Traveling | 1st | OFF | OFF | 1 | - | - | - | Normal | Normal | Drive | - |
| | | OFF | OFF | 1 | - | - | - | Normal | Reverse | Regenerate | - |
| | 3rd | OFF | OFF | - | 3 | - | - | Normal | Normal | Drive | - |
| | | OFF | OFF | - | 3 | - | - | Normal | Reverse | Regenerate | - |
| | 5th | OFF | OFF | - | 5 | - | - | Normal | Normal | Drive | - |
| | | OFF | OFF | - | 5 | - | - | Normal | Reverse | Regenerate | - |
| | RVS | OFF | OFF | 1 | - | - | - | Reverse | Reverse | Drive | - |
| | | OFF | OFF | 1 | - | - | - | Reverse | Normal | Regenerate | - |
| | | OFF | OFF | - | 3 | - | - | Reverse | Reverse | Drive | - |
| | | OFF | OFF | - | 3 | - | - | Reverse | Normal | Regenerate | - |
| | | OFF | OFF | - | 5 | - | - | Reverse | Reverse | Drive | - |
| | | OFF | OFF | - | 5 | - | - | Reverse | Normal | Regenerate | - |
| Engine Start During Motor Traveling | (1st) | ON | OFF | 1 | - | - | - | Normal | Normal | Drive | Start |
| | | OFF | ON | 1 | - | 2 | - | Normal | Normal | Drive | Start |
| | | OFF | ON | 1 | - | 4 | - | Normal | Normal | Drive | Start |
| | (3rd) | ON | OFF | - | 3 | - | - | Normal | Normal | Drive | Start |
| | | OFF | ON | - | 3 | 2 | - | Normal | Normal | Drive | Start |
| | | OFF | ON | - | 3 | 4 | - | Normal | Normal | Drive | Start |
| | (5th) | ON | OFF | - | 5 | - | - | Normal | Normal | Drive | Start |
| | | OFF | ON | - | 5 | 2 | - | Normal | Normal | Drive | Start |
| | | OFF | ON | - | 5 | 4 | - | Normal | Normal | Drive | Start |
| Parking | Parking | OFF | OFF | - | - | - | - | Normal | Reverse | Charge | - |

POWER TRANSMISSION APPARATUS FOR HYBRID VEHICLE

CROSS REFERENCED TO RELATED APPLICATION

This application is a National Stage entry of International Application No. PCT/JP2010/053937, filed Mar. 3, 2010, which claims priority to Japanese Patent Application No. 2009-049254 filed Mar. 3, 2009, the disclosure of the prior application is incorporated in its entirety by reference.

TECHNICAL FIELD

The present invention relates to a power transmission apparatus for a hybrid vehicle.

BACKGROUND ART

A power transmission apparatus for a hybrid vehicle is known which includes an engine, a motor, and a planetary gear mechanism having a sun gear, a ring gear, a plurality of planetary gears meshed with the sun gear and the ring gear, and a carrier supporting the plurality of planetary gears (for example, see PTL 1).

As shown in FIG. 36, a power transmission apparatus 100 for a hybrid vehicle described in PTL 1 is configured such that a first motor 104 serving as a generator is connected to a sun gear 102 of a planetary gear mechanism 101, an engine 106 is connected to a carrier 105, and a drive shaft 108 is connected to a ring gear 107. Thus, torque of the engine 106 is distributed to the ring gear 107 and the sun gear 102 by the planetary gear mechanism 101, and partial torque distributed to the ring gear 107 is transmitted to the drive shaft 108. In the power transmission apparatus 100 for a hybrid vehicle described in PTL 1, the torque of the engine 106 is partially transmitted to the drive shaft 108, so a second motor 109 is connected to the ring gear 107 so as to compensate the torque to the drive shaft 108.

CITATION LIST

Patent Literature

[PTL 1] JP-A-2007-290677

SUMMARY OF INVENTION

Technical Problem

However, in the power transmission apparatus 100 for a hybrid vehicle described in PTL 1, a power distribution system is used in which the engine 106 is connected to the carrier 105. For this reason, the engine torque is inevitably distributed, and to transmit the same torque as the engine torque to the drive shaft 108, it is necessary to compensate the motor torque from the second motor 109. As a result, the power transmission apparatus has a complex structure and is expensive, making it difficult to mount the power transmission apparatus in the vehicle.

The invention has been achieved in consideration of the above-described situation, and it is an object of the invention to provide a power transmission apparatus for a hybrid vehicle which enables assist by an electric motor and has excellent vehicle mounting capability.

Solution to Problem

The above-described object is achieved by the following configuration.

(1) In a power transmission apparatus (for example, a power transmission apparatus 1, 1A, 1B, 1C, 1D, 1E in embodiments which will be discussed later) for a hybrid vehicle having an internal combustion engine (for example, an engine 6 in the embodiments which will be discussed later) and an electric motor (for example, a motor 7 in the embodiments which will be discussed later), the power transmission apparatus is provided with:

an engine-output shaft (for example, a crankshaft 6a in the embodiments which will be discussed later) to which a power is output from the internal combustion engine;

a first input shaft (for example, a first main shaft 11 in the embodiments which will be discussed later) arranged in parallel to the engine-output shaft and selectively coupled with the engine-output shaft by a first connection/disconnection unit (for example, a first clutch 41 in the embodiments which will be discussed later);

a second input shaft (for example, a second intermediate shaft 16 in the embodiments which will be discussed later) arranged in parallel to the engine-output shaft and selectively coupled with the engine-output shaft by a second connection/disconnection unit (for example, a second clutch 42 in the embodiments which will be discussed later);

an output/input shaft (for example, a counter shaft in the embodiments which will be discussed later) arranged in parallel to the engine-output shaft and configured to output the power to a driven portion (for example, drive wheels DW, DW in the embodiments which will be discussed later);

a first gear group arranged on the first input shaft, the first gear group having a plurality of gears (for example, a third-speed drive gear 23a, a fifth-speed drive gear 25a, a seventh-speed drive gear 97a/a second-speed drive gear 22a, a fourth-speed drive gear 24a, a sixth-speed drive gear 96a in the embodiments which will be discussed later) selectively coupled with the first input shaft through a first synchronization device (for example, a first gear-shifting shifter 51 in the embodiments which will be discussed later);

a second gear group arranged on the second input shaft, the second gear group having a plurality of gears (for example, a second-speed drive gear 22a, a fourth-speed drive gear 24a, a sixth-speed drive gear 96a/a third-speed drive gear 23a, a fifth-speed drive gear 25a, a seventh-speed drive gear 97a in the embodiments which will be discussed later) selectively coupled with the second input shaft through a second synchronization device (for example, a second gear-shifting shifter 52 in the embodiments which will be discussed later);

a third gear group arranged on the output/input shaft, the third gear group having a plurality of gears (for example, a first common driven gear 23b, a second common driven gear 24b, a third common driven gear 96b in the embodiments which will be discussed later) meshed with the gears of the first gear group and the gears of the second gear group in a sharing manner; and a differential reduction unit (for example, a differential reduction unit 30 in the embodiments which will be discussed later) in which a first rotation element (for example, a sun gear 32 in the embodiments which will be discussed later), a second rotation element (for example, a carrier 36 in the embodiments which will be discussed later), and a third rotation element (for example, a ring gear 35 in the embodiments which will be discussed later) are rotatable differentially from each other, wherein the first rotation element is connected to one of the first input shaft and the second input shaft and also connected to the electric motor, the third rotation element is connected to a lock mechanism (for example, a one-way clutch 61 in the embodiments which will be discussed later) capable of stopping rotation thereof, the second rotation element is connected to one of the gears of the first gear group arranged on the first input shaft and the gears of the second gear group arranged on the second gear group to transmit power to the output/input shaft, and the other of the first input shaft and the second input shaft which is not connected to the first rotation element is configured to transmit power to the output/input shaft without passing through the differential reduction unit.

(2) In addition to the configuration described in (1), the other of the first input shaft and the second input shaft which is not connected to the first rotation element may be connected to the engine-output shaft through an idle gear train (for example, an idle gear train 27 in the embodiments which will be discussed later).

(3) In addition to the configuration described in (1) or (2), the differential reduction unit may be a planetary gear-type reduction unit (for example, a planetary gear mechanism 31 in the embodiments which will be discussed later) which coaxially includes, as three single pinion-type rotation elements, a sun gear (for example, a sun gear 32 in the embodiments which will be discussed later), a ring gear (for example, a ring gear 35 in the embodiments which will be discussed later), and a carrier (for example, a carrier 36 in the embodiments which will be discussed later) rotatably supporting a plurality of gears (for example, planetary gears 34 in the embodiments which will be discussed later) meshed between the sun gear and the ring gear, the first rotation element may be the sun gear, the second rotation element may be the carrier, and the third rotation element may be the ring gear.

(4) In addition to the configuration described in any one of (1) to (3), at least a part of a rotor (for example, a rotor 72 in the embodiments which will be discussed later), a stator (for example, a stator 71 in the embodiments which will be discussed later), or a cross winding portion (for example, a coil 71*c* in the embodiments which will be discussed later) constituting the electric motor may be arranged to overlap with the differential reduction unit in an axial direction.

(5) In addition to the configuration described in any one of (1) to (4), the lock mechanism may be a brake capable of locking the third rotation element or may include a brake unit capable of locking the third rotation element.

(6) In addition to the configuration described in (5), the lock mechanism may be a one-way clutch (for example, a one-way clutch 61 in the embodiments which will be discussed later) including the brake unit, and the one-way clutch may be configured to selectively set whether to permit rotation of the third rotation element in a normal rotation direction or rotation of the third rotation element in a reverse rotation direction in a state where the third rotation element is not locked by the brake unit.

(7) In addition to the configuration described in any one of (1) to (6), the internal combustion engine and the electric motor may be arranged coaxially with the first input shaft, and the first rotation element may be connected to the first input shaft.

(8) In addition to the configuration described in any one of (1) to (7), the gears (for example, a third-speed drive gear 23*a*, a fifth-speed drive gear 25*a*, a seventh-speed drive gear 97*a* in the embodiments which will be discussed later) of the first gear group and the gears of the third gear group may be meshed with each other to constitute a plurality of odd-numbered stage gear pairs (for example, a third-speed gear pair 23, a fifth-speed gear pair 25, a seventh-speed gear pair 97 in the embodiments which will be discussed later), and the gears of the second gear group and the gears (for example, a first common driven gear 23*b*, a second common driven gear 24*b*, a third common driven gear 96*b* in the embodiments which will be discussed later) of the third gear group may be meshed with each other to constitute a plurality of even-numbered stage gear pairs (for example, a second-speed gear pair 22, a fourth-speed gear pair 24, a sixth-speed gear pair 96 in the embodiments which will be discussed later).

(9) In addition to the configuration described in (8), upon first-speed traveling, the first synchronization device may be disconnected, the third rotation element may be locked by the lock mechanism, and power of the first rotation element may be reduced and transmitted to the second rotation element, and upon a traveling in a third-speed traveling or over the third-speed traveling, the first synchronization device may be connected and the lock state of the third rotation element by the lock mechanism may be released to transmit power.

(10) In addition to the configuration described in any one of (1) to (9), upon reverse traveling, the first connection/disconnection unit and the second connection/disconnection unit may be disconnected to release connection to the internal combustion engine, and the third rotation element may be locked by the lock mechanism or the lock state of the third rotation element by the lock mechanism may be released and the first synchronization device may be connected to reversely rotate the electric motor.

(11) In addition to the configuration described in any one of (1) to (6), the internal combustion engine may be arranged coaxially with the first input shaft, the electric motor may be arranged coaxially with the second input shaft, and the first rotation element may be connected to the second input shaft.

(12) In addition to the configuration described in (11), the gears (for example, a third-speed drive gear 23*a*, a fifth-speed drive gear 25*a*, a seventh-speed drive gear 97*a* in the embodiments which will be discussed later) of the first gear group and the gears (for example, a first common driven gear 23*b*, a second common driven gear 24*b*, a third common driven gear 96*b* in the embodiments which will be discussed later) of the third gear group may be meshed with each other to constitute a plurality of odd-numbered stage gear pairs (for example, a third-speed gear pair 23, a fifth-speed gear pair 25, a seventh-speed gear pair 97 in the embodiments which will be discussed later), and the gears (for example, a second-speed drive gear 22*a*, a fourth-speed drive gear 24*a*, a sixth-speed drive gear 96*a* in the embodiments which will be discussed later) of the second gear group and the gears (for example, a first common driven gear 23*b*, a second common driven gear 24*b*, a third common driven gear 96*b* in the embodiments which will be discussed later) of the third gear group may be meshed with each other to constitute a plurality of even-numbered stage gear pairs (for example, a second-speed gear pair 22, a fourth-speed gear pair 24, a sixth-speed gear pair 96 in the embodiments which will be discussed later).

(13) In addition to the configuration described in (11), the gears (for example, a second-speed drive gear 22*a*, a fourth-speed drive gear 24*a*, a sixth-speed drive gear 96*a* in the embodiments which will be discussed later) of the first gear group and the gears (for example, a first common driven gear 23*b*, a second common driven gear 24*b*, a third common driven gear 96*b* in the embodiments which will be discussed later) of the third gear group may be meshed with each other to constitute a plurality of even-numbered stage gear pairs (for example, a second-speed gear pair 22, a fourth-speed gear pair 24, a sixth-speed gear pair 96 in the embodiments which will be discussed later), and the gears (for example, a third-speed drive gear 23*a*, a fifth-speed drive gear 25*a*, a seventh-speed drive gear 97*a* in the embodiments which will be discussed later) of the second gear group and the gears (for example, a first common driven gear 23*b*, a second common driven gear 24*b*, a third common driven gear 96*b* in the embodiments which will be discussed later) of the third gear group may be meshed with each other to constitute a plurality of odd-numbered stage gear pairs (for example, a third-speed gear pair 23, a fifth-speed gear pair 25, a seventh-speed gear pair 97 in the embodiments which will be discussed later).

(14) In addition to the configuration described in (2), a first intermediate shaft (for example, a first intermediate shaft 15 in the embodiments which will be discussed later) may be provided in parallel to the first input shaft and the second input shaft, the first intermediate shaft may be attached with integrally rotatable idle gears (for example, a first idle driven gear 27b in the embodiments which will be discussed later) constituting the idle gear train and provided with a reverse drive gear (for example, a reverse drive gear 28a in the embodiments which will be discussed later) which is selectively coupled with the first intermediate shaft through a reverse synchronization device (for example, a reverse shifter 53 in the embodiments which will be discussed later), and the reverse drive gear may be meshed with the gears (for example, a first common driven gear 23b in the embodiments which will be discussed later) of the third gear group.

(15) In addition to the configuration described in (2), a first intermediate shaft (for example, a first intermediate shaft 15 in the embodiments which will be discussed later) and a reverse shaft (for example, a reverse shaft 17 in the embodiments which will be discussed later) may be provided in parallel to the first input shaft and the second input shaft, the first intermediate shaft may be attached with integrally rotatable first idle gears (for example, a first idle driven gear 27b in the embodiments which will be discussed later) constituting the idle gear train, the reverse shaft may be attached with integrally rotatable second idle gears (for example, a third idle driven gear 27d in the embodiments which will be discussed later) which are meshed with the first idle gears and provided with a reverse drive gear (for example, a reverse drive gear 28a in the embodiments which will be discussed later) which is selectively coupled with the reverse shaft through a reverse synchronization device (for example, a reverse shifter 53 in the embodiments which will be discussed later), and one of the first input shaft and the second input shaft may be attached with an integrally rotatable reverse driven gear (for example, a reverse driven gear 28b in the embodiments which will be discussed later) which is meshed with the reverse drive gear.

(16) In addition to the configuration described in (2), in a state where EV traveling is carried out by disconnecting the first and second connection/disconnection units and connecting the first synchronization device to drive the electric motor, when the internal combustion engine is started by extracting torque of the electric motor and releasing the first synchronization device to connect the first connection/disconnection unit, power is output from the second rotation element, and the third rotation element rotates in the reverse rotation direction.

(17) In addition to the configuration described in (7), after the internal combustion engine has been started, first-speed traveling is carried out by disconnecting the first connection/disconnection unit, driving the electric motor such that the third rotation element rotates in the normal rotation direction, stopping the third rotation element by the lock mechanism, and connecting the first connection/disconnection unit.

(18) In addition to the configuration described in (7), a power from the first rotation element may not be transmitted through the second rotation element to the output/input shaft, by releasing the first synchronization device and not locking the third rotation element, when the first connection/disconnection unit is connected and the electric motor is regenerating during an idling of the internal combustion engine.

(19) In addition to the configuration described in (7), a compressor of an air conditioner and an oil pump may be connected to the first input shaft, and the compressor of the air conditioner and the oil pump may be driven by the power for traveling.

(20) In addition to the configuration described in (15), the first rotation element may be connected to the first input shaft, the power of the internal combustion engine may be transmitted through the reverse drive gear and the reverse driven gear to the first input shaft as a reverse rotation by connecting the second connection/disconnection unit and connecting the reverse synchronization device, and the power of the electric motor may be added to a reverse traveling by outputting the power from the electric motor in a reverse rotating and locking the third rotation element.

(21) In addition to the configuration described in (15), a compressor of an air conditioner may be connected to the reverse drive gear in a manner that a power is transmittable, the compressor of the air conditioner may be driven without outputting the power into the output/input shaft, by temporarily releasing a locking of the third rotation element, in an idling state where a driver is pressing a brake pedal during the reverse synchronization device is connected, and the third rotation element may be locked when the driver releases the brake pedal.

(22) In addition to the configuration described in (9), a plug-in mechanism for enabling an electric charging from an outer charging apparatus to an electric storage device may be provided, and in an EV traveling, an EV shifting mode where an odd-numbered stage traveling of the third-speed traveling or the traveling over the third-speed traveling is carried out after a starting in a first speed and an EV fixing mode where the starting and the traveling is carried out in a third-speed may be selectable by a driver.

(23) In addition to the configuration described in (22), the EV shifting mode may be selectable during the EV traveling in the EV fixing mode, when a rotating speed is out of a range where an ignition of the internal combustion engine is possible in the third-speed traveling, the ignition of the internal combustion engine may be carried out after a shifting down to the first-speed traveling.

Advantageous Effects of Invention

With the power transmission apparatus for a hybrid vehicle described in (1), the first rotation element of the differential reduction unit is connected to one of the first input shaft and the second input shaft connected to the engine-output shaft and to the electric motor, and the second rotation element is connected to the output/input shaft through one of the gears of the first gear group arranged on the first input shaft and the gears of the second gear group arranged on the second gear group and the gears of the third gear group. For this reason, power of the electric motor can assist power of the internal combustion engine, and combined power can be transmitted from the first rotation element of the differential reduction unit to the output/input shaft through the second rotation element. Therefore, vehicle mounting capability can be improved without newly supplementing a motor, as compared with a power distribution-type power transmission apparatus of the related art.

When the internal combustion engine is paused, the internal combustion engine can be ignited by the electric motor.

The power transmission apparatus is a so-called twin clutch-type transmission having the first input shaft selectively coupled with the engine-output shaft by the first connection/disconnection unit and the second input shaft selectively coupled with the engine-output shaft by the second connection/disconnection unit. Therefore, assist or regeneration by the electric motor can be carried out over the entire region, and EV traveling, internal combustion engine traveling, and electric motor assist traveling can be easily changed.

Upon EV traveling by the electric motor, the first connection/disconnection unit and the second connection/disconnection unit are disconnected to drive the electric motor, such that motor traveling can be carried out with no drag of the internal combustion engine.

The third rotation element is connected to the lock mechanism, so the third rotation element is locked such that a large reduction gear ratio can be obtained by the differential reduction unit, and the power transmission apparatus can be reduced in size.

With the power transmission apparatus for a hybrid vehicle described in (2), the other of the first input shaft and the second input shaft is connected to the engine-output shaft through the idle gear train, so gear-shifting can be carried out by the idle gear train.

With the power transmission apparatus for a hybrid vehicle described in (3), the differential reduction unit is a planetary gear-type reduction unit, so the differential reduction unit can have a simple configuration. In addition, since the lock mechanism can be arranged in adjacent of the planetary gear-type reduction unit and the carrier can be used for a reduction, it is advantageous for a first-speed traveling.

With the power transmission apparatus for a hybrid vehicle described in (4), at least a part of the electric motor is arranged to overlap with the differential reduction unit in the axial direction, such that an inner diameter-side space of the electric motor can be effectively utilized, and the length of the power transmission apparatus in the axial direction can be reduced.

With the power transmission apparatus for a hybrid vehicle described in (5), the lock mechanism is a brake or includes a brake unit, such that the third rotation element can be locked. By locking the third rotation element, a zero-point fixing on a collinear chart is possible, so that the power of the internal combustion engine can be transmitted by using a gear ratio.

With the power transmission apparatus for a hybrid vehicle described in (6), the lock mechanism is a one-way clutch including the brake unit, and the one-way clutch is configured to selectively set whether to permit rotation of the third rotation element in the normal rotation direction or to permit rotation of the third rotation element in the reverse rotation direction in a state where the third rotation element is not locked by the brake unit. Therefore, the rotations in the rotation permission direction and the opposite direction can be mechanically locked.

With the power transmission apparatus for a hybrid vehicle described in (7), the internal combustion engine and the electric motor are arranged coaxially with the first input shaft. Therefore, a member having a large dimension in a radial direction is arranged coaxially, such that vehicle mounting capability of the power transmission apparatus can be improved.

The first rotation element is connected to the first input shaft, such that EV traveling can be carried out by the gears of the first gear group provided in the first input shaft.

With the power transmission apparatus for a hybrid vehicle described in (8), a twin clutch-type transmission is configured with the first input shaft as an odd-numbered stage input shaft and the second input shaft as an even-numbered stage input shaft. In this case, shift change is carried out between the even-numbered stage and the odd-numbered stage by switching the first connection/disconnection unit and the second connection/disconnection unit, such that the time required to connect and disconnect the clutch is shortened. Therefore, a gear-shifting shock can be suppressed. That is, since the odd-numbered stages and the even-number stages are replaced in turn in a usual successive shifting, such like first-speed, second-speed, third-speed, and fourth-speed, a time can be shortened by carrying out a pre-shifting on the input shaft which is not used for the traveling, so that it is possible to directly respond to an accelerating opening demand of a driver.

With the power transmission apparatus for a hybrid vehicle described in (9), the lock mechanism and the first synchronization device are appropriately controlled such that appropriate driving can be carried out in accordance with the situations.

With the power transmission apparatus for a hybrid vehicle described in (10), the electric motor is reversely rotated to carry out reverse traveling, and a reverse gear will not be provided. Therefore, the power transmission apparatus can be reduced in size. Even when a reverse gear is provided, reverse traveling by the electric motor is carried out in a start/low-speed region where the internal combustion engine is inefficient, such that fuel consumption can be improved.

With the power transmission apparatus for a hybrid vehicle described in (11), the internal combustion engine is arranged coaxially with the first input shaft, and the electric motor is arranged coaxially with the second input shaft. Therefore, when the dimension of the first input shaft in the axial direction is limited, the dimension of the first input shaft in the axial direction can be reduced.

With the power transmission apparatus for a hybrid vehicle described in (12) and (13), a twin clutch-type transmission is configured with the first input shaft as an odd-numbered stage or even-numbered stage input shaft and the second input shaft as an even-numbered stage or odd-numbered stage input shaft. In this case, shift change is carried out between the even-numbered stage and the odd-numbered stage by switching the first connection/disconnection unit and the second connection/disconnection unit, such that the time required to connect and disconnect the clutch is shortened. Therefore, a gear-shifting shock can be suppressed. Moreover, if the electric motor is arranged coaxially with the second input shaft and the first input shaft is set as a input shaft for an odd-numbered stage, a first-speed traveling powered only by the internal combustion engine can be possible by providing a first-speed gear pair on the first input shaft, so that a traveling is possible even when the electric motor is in trouble.

With the power transmission apparatus for a hybrid vehicle described in (14), the gears of the third gear group are meshed with the reverse drive gear, such that it is not necessary to provide a reverse driven gear. Therefore, reduction in size and weight can be realized.

With the power transmission apparatus for a hybrid vehicle described in (15), upon reverse traveling, a large reduction gear ratio can be obtained through the differential reduction unit.

With the power transmission apparatus for a hybrid vehicle described in (16), the internal combustion engine can be started while EV traveling is being carried out.

With the power transmission apparatus for a hybrid vehicle described in (17), after the internal combustion engine is started while EV traveling is being carried out, internal combustion engine traveling can be smoothly carried out.

With the power transmission apparatus for a hybrid vehicle described in (18), a charging to the electric storage device is possible even without running the vehicle when a SOC of the electric storage device is low.

With the power transmission apparatus for a hybrid vehicle described in (19), the compressor of the air conditioner and the oil pump can be powered by the internal combustion engine or the electric motor, so that an additional apparatus, such as an electric air conditioner, is not required.

With the power transmission apparatus for a hybrid vehicle described in (20), the power of the electric motor can be added also to the reverse traveling.

With the power transmission apparatus for a hybrid vehicle described in (21), the compressor of the air conditioner can be driven even when the driver presses the brake pedal.

With the power transmission apparatus for a hybrid vehicle described in (22), in the EV fixing mode, a gear-shifting shock by a gear shifting of the AMT can be suppressed.

With the power transmission apparatus for a hybrid vehicle described in (23), the internal combustion engine can be surely started.

BRIEF DESCRIPTION OF DRAWINGS

FIG. 4 is a diagram when a vehicle is stopped, (a) of FIG. 4 is a speed diagram, and (b) of FIG. 4 is a diagram showing a transmission situation of torque of the power transmission apparatus.

FIG. 5 is a diagram when an engine is started, (a) of FIG. 5 is a speed diagram, and (b) of FIG. 5 is a diagram showing a transmission situation of torque of the power transmission apparatus.

FIG. 6 is a diagram at the time of 1st mode assist, (a) of FIG. 6 is a speed diagram, and (b) of FIG. 6 is a diagram showing a transmission situation of torque of the power transmission apparatus.

FIG. 7 (a) of FIG. 7 is a diagram showing a transmission situation of torque of the power transmission apparatus in the 1st mode, and (b) of FIG. 7 is a diagram showing a transmission situation of torque of the power transmission apparatus in a 2nd Post1 mode.

FIG. 11 (a) of FIG. 11 is a diagram showing a transmission situation of torque of the power transmission apparatus in the 2nd mode, and (b) of FIG. 11 is a diagram showing a transmission situation of torque of the power transmission apparatus in a 3rd Post2 mode.

FIG. 13 (a) of FIG. 13 is a diagram showing a transmission situation of torque of the power transmission apparatus in the 3rd mode, and (b) of FIG. 13 is a diagram showing a transmission situation of torque of the power transmission apparatus in a 4th Post3 mode.

FIG. 17 (a) of FIG. 17 is a diagram showing a transmission situation of torque of the power transmission apparatus in the 4th mode, and (b) of FIG. 17 is a diagram showing a transmission situation of torque of the power transmission apparatus in a 5th Post4 mode.

FIG. 21 is a diagram showing a transmission situation of torque of the power transmission apparatus.

FIG. 30 is a diagram showing the vehicle conditions of the power transmission apparatus of the first embodiment and the conditions of a clutch, a gear-shifting shifter, a brake, a motor, and an engine.

DESCRIPTION OF EMBODIMENTS

Embodiments of the invention are described in detail with reference to the drawings.

First Embodiment

Figure 1:
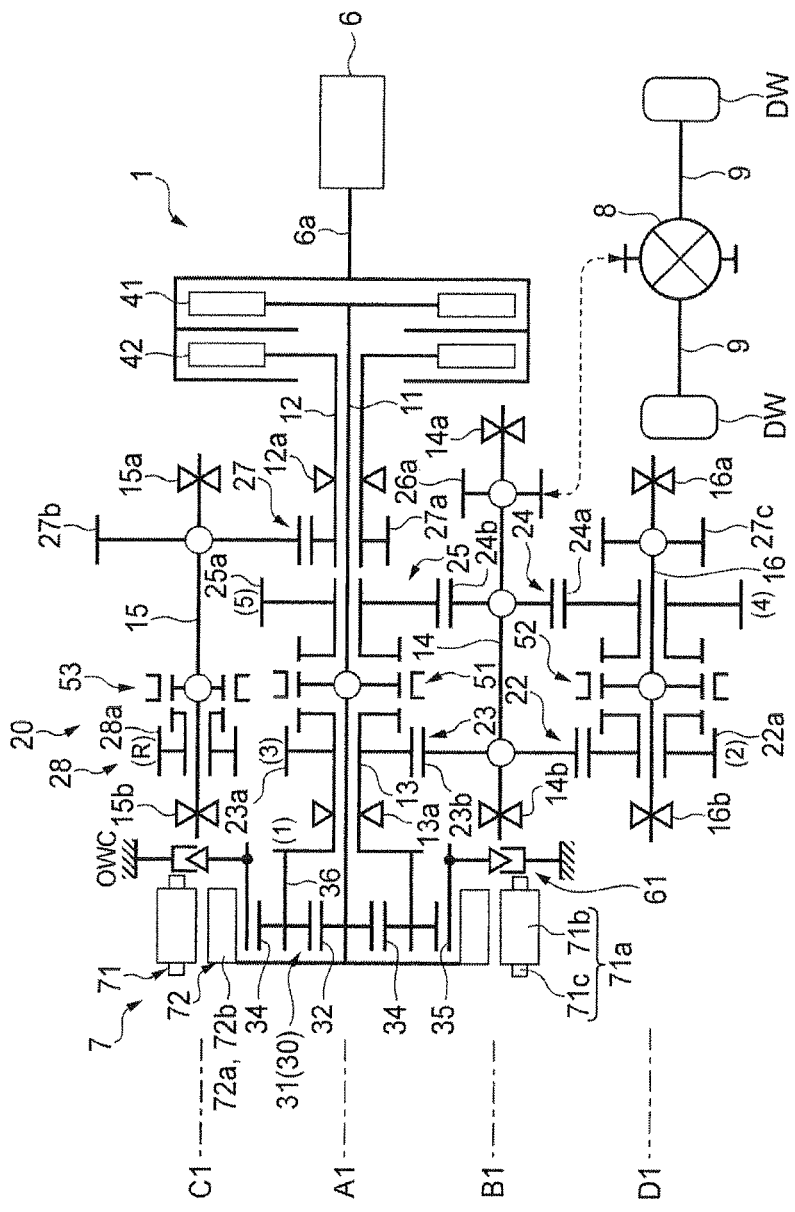
FIG. 1 is a diagram schematically showing a power transmission apparatus for a hybrid vehicle according to a first embodiment of the invention, and is a view taken along the line I-I of FIG. 2.
Figure 2:
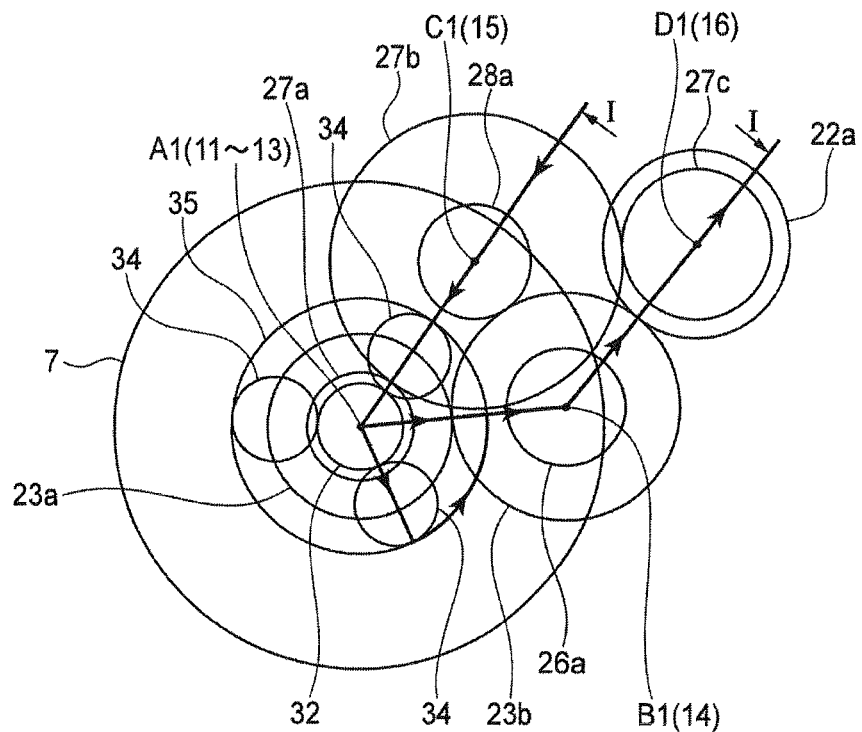
FIG. 2 is an explanatory view showing a relationship of a transmission mechanism of the power transmission apparatus of FIG. 1.

FIG. 1 schematically shows a power transmission apparatus 1 for a hybrid vehicle (hereinafter, referred to as power transmission apparatus 1) according to a first embodiment of the invention. The power transmission apparatus 1 drives drive wheels DW and DW (driven portion) through drive shafts 9 and 9 of a vehicle (not shown). The power transmission apparatus 1 includes an internal combustion engine (hereinafter, referred to as "engine") 6 serving as a drive source, an electric motor (hereinafter, referred to as "motor") 7, a transmission 20 transmitting power to the drive wheels DW and DW, and a differential reduction unit 30 constituting a part of the transmission 20.

The engine 6 is, for example, a gasoline engine. A first clutch 41 (first connection/disconnection unit) and a second clutch 42 (second connection/disconnection unit) of the transmission 20 are connected to a crankshaft 6a (output shaft) of the engine 6.

The motor 7 is a three-phase brushless DC motor and has a stator 71 having 3n armatures 71a, and a rotor 72 arranged to be opposite the stator 71. Each of the armatures 71a has a core 71b and a coil 71c wound around the core 71b. The armatures 71a are fixed in a casing (not shown) and substantially arranged at regular intervals in a circumferential direction around a rotation shaft. The 3n coils 71c constitute n sets of three-phase coils of U phase, V phase, and W phase.

The rotor 72 has n permanent magnets 72a substantially arranged at regular intervals around the rotation shaft. Two adjacent permanent magnets 72a are different in polarity. A fixing portion 72b fixing a corresponding permanent magnet 72a has a hollow cylindrical shape made of a soft magnetic material (for example, iron). The fixing portion 72b is arranged on the outer periphery of a ring gear 35 of a planetary gear mechanism 31 constituting the differential reduction unit 30 described below and connected to a sun gear 32 of the planetary gear mechanism 31. Thus, the rotor 72 is configured so as to rotate integrally with a sun gear 32 of the planetary gear mechanism 31 constituting the differential reduction unit 30.

The differential reduction unit 30 is formed by a single pinion-type planetary gear mechanism 31, and has a sun gear 32 (first rotation element), a ring gear 35 (third rotation element) arranged coaxially with the sun gear 32 so as to surround the sun gear 32, planetary gears 34 meshed with the sun gear 32 and the ring gear 35, and a carrier 36 (second rotation element) supporting the planetary gears 34 in such a manner that the planetary gears 34 rotate on their axes and revolve. In this way, the sun gear 32, the ring gear 35, and the carrier 36 are differentially rotated.

A one-way clutch 61 is connected to the ring gear 35. The one-way clutch 61 is configured to selectively permit rotation of the ring gear 35 in any direction and to stop (lock) rotation of the ring gear 35. The one-way clutch includes an electrically driven switching unit (brake unit). When the switching unit is driven, the one-way clutch 61 is put in three states including a lock state where the ring gear 35 is locked, a one-way state where only rotation of the ring gear 35 in a normal rotation direction is permitted, and a one-way state where only rotation of the ring gear 35 in a reverse rotation direction is permitted. That is, the one-way clutch 61 is locked when the switching unit is driven, and is configured such that a fixation direction and a rotation permission direction are arbitrarily selected when the switching unit is not driven.

The transmission 20 is a so-called twin clutch-type transmission which includes the first clutch 41 and the second clutch 42, and the planetary gear mechanism 31 constituting the differential reduction unit 30, and a plurality of gear-shifting gear groups which will be described below.

Specifically, the transmission 20 includes a first main shaft 11 (first input shaft), a second main shaft 12, and a connection shaft 13 arranged on the same axis (rotation axis A1) with the crankshaft 6a of the engine 6, a counter shaft 14 (output/input shaft) freely rotating around a rotation axis B1 arranged in parallel to the rotation axis A1, a first intermediate shaft 15 freely rotating around a rotation axis C1 arranged in parallel to the rotation axis A1, and a second intermediate shaft 16 (second input shaft) freely rotating around a rotation axis D1 arranged in parallel to the rotation axis A1.

On the engine 6 side, the first clutch 41 is connected to the first main shaft 11, and on the opposite side to the engine 6, the sun gear 32 of the planetary gear mechanism 31 and the rotor 72 of the motor 7 are attached to the first main shaft 11. Thus, the first main shaft 11 is selectively coupled with the crankshaft 6a of the engine 6 by the first clutch 41 and directly connected to the motor 7, such that power of the engine 6 and/or the motor 7 is transmitted to the sun gear 32.

The second main shaft 12 is formed in a hollow shape to be shorter than the first main shaft 11. The second main shaft 12 is relatively rotatably arranged so as to cover the periphery of the first main shaft 11 on the engine 6 side and supported by a bearing 12a fixed to the casing (not shown). On the engine 6 side, the second clutch 42 is connected to the second main shaft 12, and on the opposite side to the engine 6, an idle drive gear 27a is integrally rotatably attached to the second clutch 42. Thus, the second main shaft 12 is selectively coupled with the crankshaft 6a of the engine 6 by the second clutch 42, such that power of the engine 6 is transmitted to the idle drive gear 27a.

The connection shaft 13 is formed in a hollow shape to be shorter than the first main shaft 11. The connection shaft 13 is relatively rotatably arranged so as to cover the periphery of the first main shaft 11 on the engine 6 side and supported by a bearing 13a fixed to the casing (not shown). On the engine 6 side, a third-speed drive gear 23a is integrally rotatably attached to the connection shaft 13, and on the opposite side to the engine 6 with the bearing 13a interposed therebetween, the carrier 36 of the planetary gear mechanism 31 is integrally rotatably attached to the connection shaft 13. Thus, the carrier 36 and the third-speed drive gear 23a attached to the connection shaft 13 are integrally rotated by revolution of the planetary gears 34.

The first main shaft 11 is provided with a fifth-speed drive gear 25a which relatively rotates with respect to the first main shaft 11 between the third-speed drive gear 23a attached to the connection shaft 13 and the idle drive gear 27a attached to the second main shaft 12, and a first gear-shifting shifter 51 (first synchronization device) which connects or disconnects the first main shaft 11 and the third-speed drive gear 23a or the fifth-speed drive gear 25a between the third-speed drive gear 23a and the fifth-speed drive gear 25a. When the first gear-shifting shifter 51 is in-geared at a third-speed connection position, the first main shaft 11 and the third-speed drive gear 23a are connected and integrally rotated. When the first gear-shifting shifter 51 is in-geared at a fifth-speed connection position, the first main shaft 11 and the fifth-speed drive gear 25a are integrally rotated. When the first gear-shifting shifter 51 is at a neutral position, the first main shaft 11 relatively rotates with respect to the third-speed drive gear 23a and the fifth-speed drive gear 25a. When the first main shaft 11 and the third-speed drive gear 23a integrally rotate, the sun gear 32 attached to the first main shaft 11 and the carrier 36 connected to the third-speed drive gear 23a by the connection shaft 13 integrally rotate, and the ring gear 35 also integrally rotate. Thus, the planetary gear mechanism 31 is integrated.

The first intermediate shaft 15 is rotatably supported by bearings 15a and 15b both ends of which are fixed to the casing (not shown). A first idle driven gear 27b which is meshed with the idle drive gear 27a attached to the second main shaft 12 is integrally rotatably attached to the first intermediate shaft 15. The first intermediate shaft 15 is provided with a reverse drive gear 28a which relatively rotates with respect to the first intermediate shaft 15 at a position corresponding to the third-speed drive gear 23a which is provided around the first main shaft 11 arranged in parallel. The first intermediate shaft 15 is also provided with a reverse shifter 53 which connects or disconnects the first intermediate shaft 15 and the reverse drive gear 28a. When the reverse shifter 53 is in-geared at a reverse connection position, the first intermediate shaft 15 and the reverse drive gear 28a integrally rotate. When the reverse shifter 53 is at the neutral position, the first intermediate shaft 15 and the reverse drive gear 28a relatively rotate.

The second intermediate shaft 16 is rotatably supported by bearings 16a and 16b, both ends of which are fixed to the casing (not shown). A second idle driven gear 27c which is meshed with the first idle driven gear 27b attached to the first intermediate shaft 15 is integrally rotatably attached to the second intermediate shaft 16. The second idle driven gear 27c constitutes an idle gear train 27 together with the idle drive gear 27a and the first idle driven gear 27b. The second intermediate shaft 16 is provided with a second-speed drive gear 22a and a fourth-speed drive gear 24a which relatively rotate with respect to the second intermediate shaft 16 at positions corresponding to the third-speed drive gear 23a and the fifth-speed drive gear 25a which are provided around the first main shaft 11 arranged in parallel. The second intermediate shaft 16 is also provided with a second gear-shifting shifter 52 (second synchronization device) which connects or disconnects the second intermediate shaft 16 and the second-speed drive gear 22a or the fourth-speed drive gear 24a between the second-speed drive gear 22a and the fourth-speed drive gear 24a. When the second gear-shifting shifter 52 is in-geared at a second-speed connection position, the second intermediate shaft 16 and the second-speed drive gear 22a integrally rotate. When the second gear-shifting shifter 52 is in-geared at a fourth-speed connection position, the second intermediate shaft 16 and the fourth-speed drive gear 24a integrally rotate. When the second gear-shifting shifter 52 is at the neutral position, the second intermediate shaft 16 relatively rotates with respect to the second-speed drive gear 22a and the fourth-speed drive gear 24a.

The counter shaft 14 is rotatably supported by bearings 14a and 14b, both ends of which are fixed to the casing (not shown). The first common driven gear 23b, the second common driven gear 24b, and a final gear 26a are integrally rotatably attached to the counter shaft 14 in order from the opposite side to the engine 6.

The first common driven gear 23b is meshed with the third-speed drive gear 23a attached to the connection shaft 13 and constitutes a third-speed gear pair 23 together with the third-speed drive gear 23a. The first common driven gear 23b is also meshed with the second-speed drive gear 22a provided in the second intermediate shaft 16 and constitutes a second-speed gear pair 22 together with the second-speed drive gear 22a. The first common driven gear 23b is also meshed with the reverse drive gear 28a provided in the first intermediate shaft 15 and constitutes a reverse gear pair 28 together with the reverse drive gear 28a. The second common driven gear 24b is meshed with the fifth-speed drive gear 25a provided in the first main shaft 11 and constitutes the fifth-speed gear pair 25 together with the fifth-speed drive gear 25a. The second common driven gear 24b is also meshed with the fourth-speed drive gear 24a provided in the second intermediate shaft 16 and constitutes a fourth-speed gear pair 24 together with the fourth-speed drive gear 24a.

The final gear 26a is meshed with a differential gear mechanism 8, and the differential gear mechanism 8 is connected to the drive wheels DW and DW through the drive shafts 9 and 9. Thus, power which is transmitted to the counter shaft 14 is output from the final gear 26a to the differential gear mechanism 8, the drive shafts 9 and 9, and the drive wheels DW and DW.

Accordingly, the transmission 20 is configured such that the third-speed drive gear 23a and the fifth-speed drive gear 25a as an odd-numbered gear-shifting stage are provided in the first main shaft 11 as one input shaft of two input shafts, the sun gear 32 of the planetary gear mechanism 31 is connected to the first main shaft 11, and the second-speed drive gear 22a and the fourth-speed drive gear 24a as an even-numbered gear-shifting stage are provided in the second intermediate shaft 16 as the other input shaft of the two input shafts.

The power transmission apparatus 1 configured as above is configured such that the transmission 20 is arranged between the engine 6 and the motor 7 along the rotation axis A1, and the motor 7 has a ring shape so as to surround the outside of the planetary gear mechanism 30. Specifically, at least a part of the rotor 72, the stator 71, or the coil 71c (cross winding portion) wound around the stator 71, which constitute the motor 7, is arranged to overlap with the planetary gear mechanism 31 in the axial direction.

With regard to the first gear-shifting shifter 51, the second gear-shifting shifter 52, and the reverse shifter 53, for example, a jaw clutch, such as a dog clutch, may be used. In this embodiment, a clutch mechanism is used which has a synchronizer mechanism matching the revolutions of shafts to be connected or a shaft and a gear to be connected.

With the above-described configuration, the power transmission apparatus 1 for a hybrid vehicle of this embodiment has the following first to fourth transmission paths.

(1) A first transmission path is a transmission path in which the crankshaft 6a of the engine 6 is connected to the drive wheels DW and DW through the first main shaft 11, the sun gear 32 of the planetary gear mechanism 31, the carrier 36, the connection shaft 13, the third-speed gear pair 23 (third-speed drive gear 23a and first common driven gear 23b), the counter shaft 14, the final gear 26a, the differential gear mechanism 8, and the drive shafts 9 and 9. The reduction gear ratio of the planetary gear mechanism 31 as a differential reduction unit is set such that torque which is transmitted through the first transmission path corresponds to the first speed.

(2) A second transmission path is a transmission path in which the crankshaft 6a of the engine 6 is connected to the drive wheels DW and DW through the second main shaft 12, the idle gear train 27 (idle drive gear 27a, first idle driven gear 27b, and second idle driven gear 27c), the second intermediate shaft 16, the second-speed gear pair 22 (second-speed drive gear 22a and first common driven gear 23b) or the fourth-speed gear pair 24 (fourth-speed drive gear 24a and second common driven gear 24b), the counter shaft 14, the final gear 26a, the differential gear mechanism 8, and the drive shafts 9 and 9.

(3) A third transmission path is a transmission path in which the crankshaft 6a of the engine 6 is connected to the drive wheels DW and DW through the first main shaft 11, the third-speed gear pair 23 (third-speed drive gear 23a and first common driven gear 23b) or the fifth-speed gear pair 25 (fifth-speed drive gear 25a and second common driven gear 24b), the counter shaft 14, the final gear 26a, the differential gear mechanism 8, and the drive shafts 9 and 9.

(4) A fourth transmission path is a transmission path in which the motor 7 is connected to the drive wheels DW and DW through the planetary gear mechanism 31, the third-speed gear pair 23 (third-speed drive gear 23a and first common driven gear 23b), or the fifth-speed gear pair 25 (fifth-speed drive gear 25a and second common driven gear 24b), the counter shaft 14, the final gear 26a, the differential gear mechanism 8, and the drive shafts 9 and 9.

Figure 3:
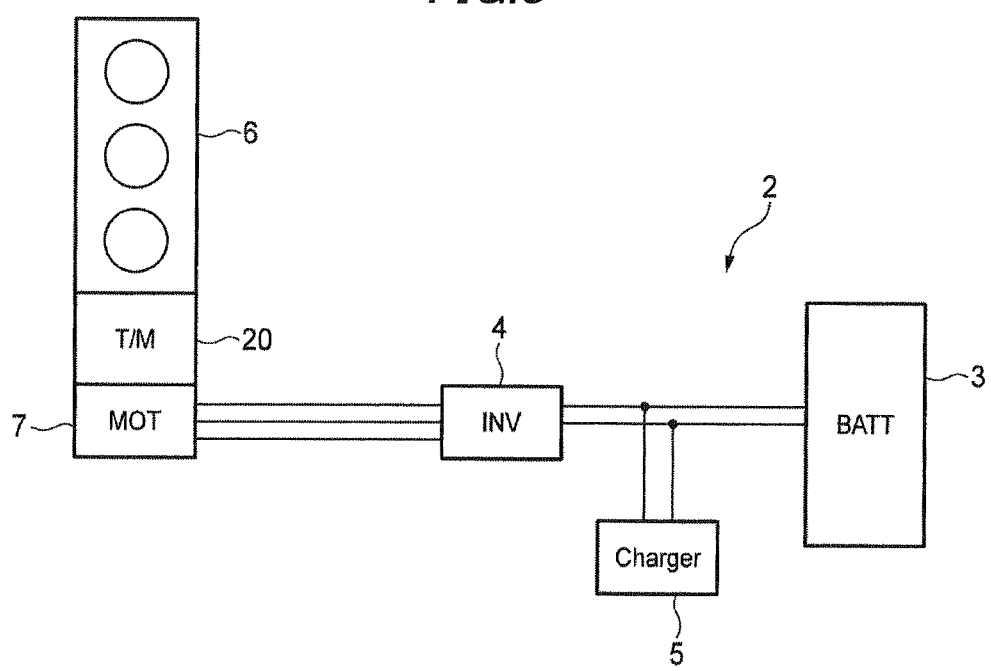
FIG. 3 is a diagram for explaining a power supplying system.

The power transmission apparatus 1 of this embodiment is provided with a power supply system 2, as shown in FIG. 3, which transfers power between the power transmission apparatus 1 and the motor 7. The power supply system has an electric storage device, such as a secondary battery. As the electric storage device, a battery 3 is used. Further, a capacitor may be used as the electric storage device. The battery 3 and the motor 7 are connected to each other through an inverter 4. In addition, a battery charger 5, as a plug-in mechanism, for enabling an charging to the battery 3 from an outer charging apparatus such as a home electronic power supply is also provided. Accordingly, the hybrid vehicle provided with the power transmission apparatus 1 is a plug-in hybrid electric vehicle. The power supply system 2 may include a fuel cell system (not shown) in addition to the electric supply device. The fuel cell system is a system in which an electromotive force is obtained by reaction of hydrogen and oxygen, and can supply generated power to the motor or can charge generated power in the electric storage device.

Next, a control system of the vehicle will be described. An electronic control device (not shown) is provided as a controller. The electronic control device receives detection signals of various sensors or switches, for example, a speed increase request, a braking request, an engine revolution, a motor revolution, revolutions of the first and second main shafts 11 and 12, and a revolution of the counter shaft 14, and the like, and outputs signals for controlling the engine 6, signals for controlling the motor 7, signals indicating the power generation state, the charge state, and the discharge state of the power supply system 2, signals for controlling the first and second gear-shifting shifters 51 and 52 and the reverse shifter 53, signals for controlling the switching unit of the one-way clutch 61, and the like.

Next, control of the power transmission apparatus 1 will be described. In the following description, unless specifically defined, it is assumed that the first and second clutches 41 and 42 are disconnected, the first, second, and reverse shifters 51 to 53 are at the neutral position, and the one-way clutch 61 is in the one-way state (OWC lock OFF) where rotation in a direction is permitted. Hereinafter, this state may be referred to as an initial state. The lock state of the one-way clutch 61 includes a case where the ring gear 35 is mechanically locked to rotate the ring gear 35 in the opposite direction to the rotation permission direction, and a case where rotation of the ring gear 35 in the rotation permission direction is locked by the switching unit. In the following description, for simplification, it is assumed that both cases are not differentiated.

First, in the power transmission apparatus 1, a state where a vehicle is stopped, that is, ignition is OFF (IG_OFF) will be described.

Figure 4:
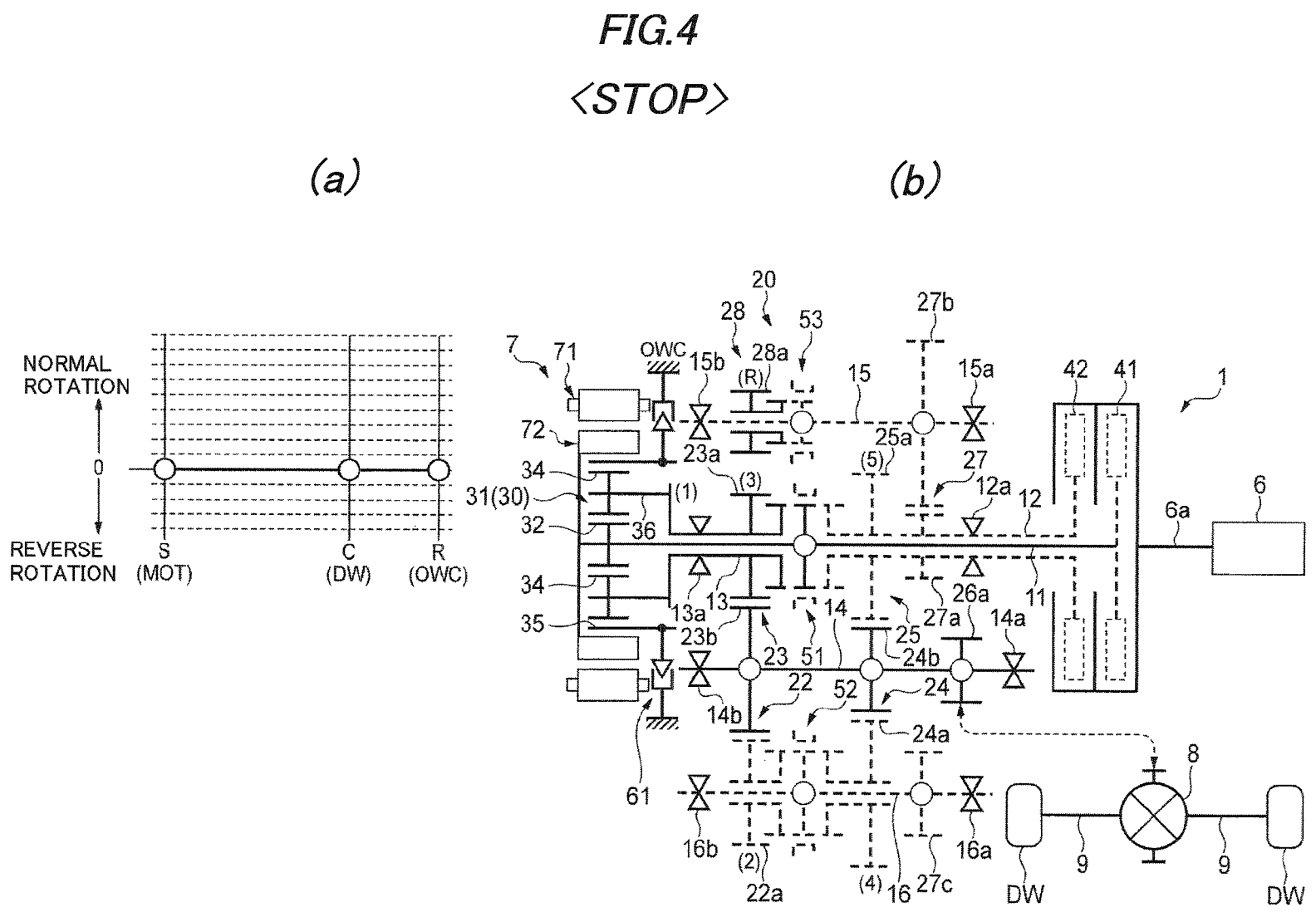

In a state where ignition is OFF, as shown in (a) of FIG. 4, the engine 6 and the motor 7 are stopped, and no torque is generated. At this time, the power transmission apparatus 1 is in the initial state.

In this state, if ignition is ON (IG_ON) and the motor 7 is driven (torque is applied in the normal rotation direction) to connect the first clutch 41, as shown in (b) of FIG. 5, the sun gear 32 of the planetary gear mechanism 31 connected to the rotor 72 rotates in the normal rotation direction. At this time, since the one-way clutch 61 is not locked, the ring gear 35 rotates in the reverse rotation direction. Thus, motor torque is not transmitted to the carrier 36 and the vehicle is stopped. Motor torque is transmitted from the first main shaft 11, which rotates integrally with the sun gear 32, to the crankshaft 6a of the engine 6, such that the crankshaft 6a is cranked and the engine 6 is started (ENG start during stopping).

After the engine has been started, if the first clutch 41 is connected and engine torque increases in a state where the one-way clutch 61 is locked, engine torque transmitted to the sun gear 32 is reduced and transmitted to the carrier 36. Then, as shown in (a) of FIG. 7, engine torque is transmitted to the drive wheels DW and DW through the first transmission path which passes through the third-speed gear pair 23, such that first-speed traveling (1st mode) is carried out. The state of (a) of FIG. 7 is referred to as 1st mode.

(a) of FIG. 6 and (b) of FIG. 6 show a case where the motor 7 assists during traveling in the 1st mode. In a speed diagram of (a) of FIG. 6, the stop position of the motor 7 is 0, the upper side represents the normal rotation direction, the lower side represents the reverse rotation direction, the sun gear 32 is denoted by "S", the carrier 36 is denoted by "C", and the ring gear 35 is denoted by "R". The same is also applied to speed diagrams described below. (b) of FIG. 6 is a diagram showing a transmission situation of torque. A hatched bold arrow represents a flow of torque, and hatching in the arrow corresponds to hatching in an arrow representing torque in the respective speed diagrams. The normal rotation direction of the motor 7 refers to a direction in which torque in a forward direction is transmitted to the drive wheels DW and DW through the drive shafts 9 and 9, and the reverse rotation direction refers to a direction in which torque in a backward direction is transmitted to the drive wheels DW and DW through the drive shafts 9 and 9.

During traveling in the 1st mode, if the motor 7 is driven to apply motor torque in the normal rotation direction, motor torque is reduced and transmitted from the sun gear 32 to the carrier 36, and then transmitted to the drive wheels DW and DW through the fourth transmission path which passes through the third-speed gear pair 23. In other words, engine torque and motor torque are transmitted to the sun gear 32, and combined torque is transmitted to the drive wheels DW and DW. Meanwhile, the motor 7 is not driven and regenerative torque is applied to the motor 7 in the reverse rotation direction, such that charging can be carried out by the motor 7 during traveling in the 1st mode.

Subsequently, control when first-speed traveling is shifted up to second-speed traveling will be described. First, in the 1st mode state of (a) of FIG. 7, the second gear-shifting shifter 52 is in-geared from the neutral position to the second-speed connection position (1st Pre2 mode). Hereinafter, this state is referred to as 1st Pre2 mode. In this state, the motor 7 is driven to apply motor torque in the normal rotation direction, or regenerative torque is applied in the reverse rotation direction, assist or charging can be carried out by the motor 7. Then, the connection states of the first and second clutches 41 and 42 are changed, that is, the first clutch 41 is disconnected and the second clutch 42 is connected, such that as shown in (b) of FIG. 7, engine torque is transmitted to the drive wheels DW and DW through the second transmission path which passes through the second-speed gear pair 22. Thus, second-speed traveling (2nd Post1 mode) is carried out. Hereinafter, the state of (b) of FIG. 7 is referred to as 2nd Post1 mode.

Figure 8:
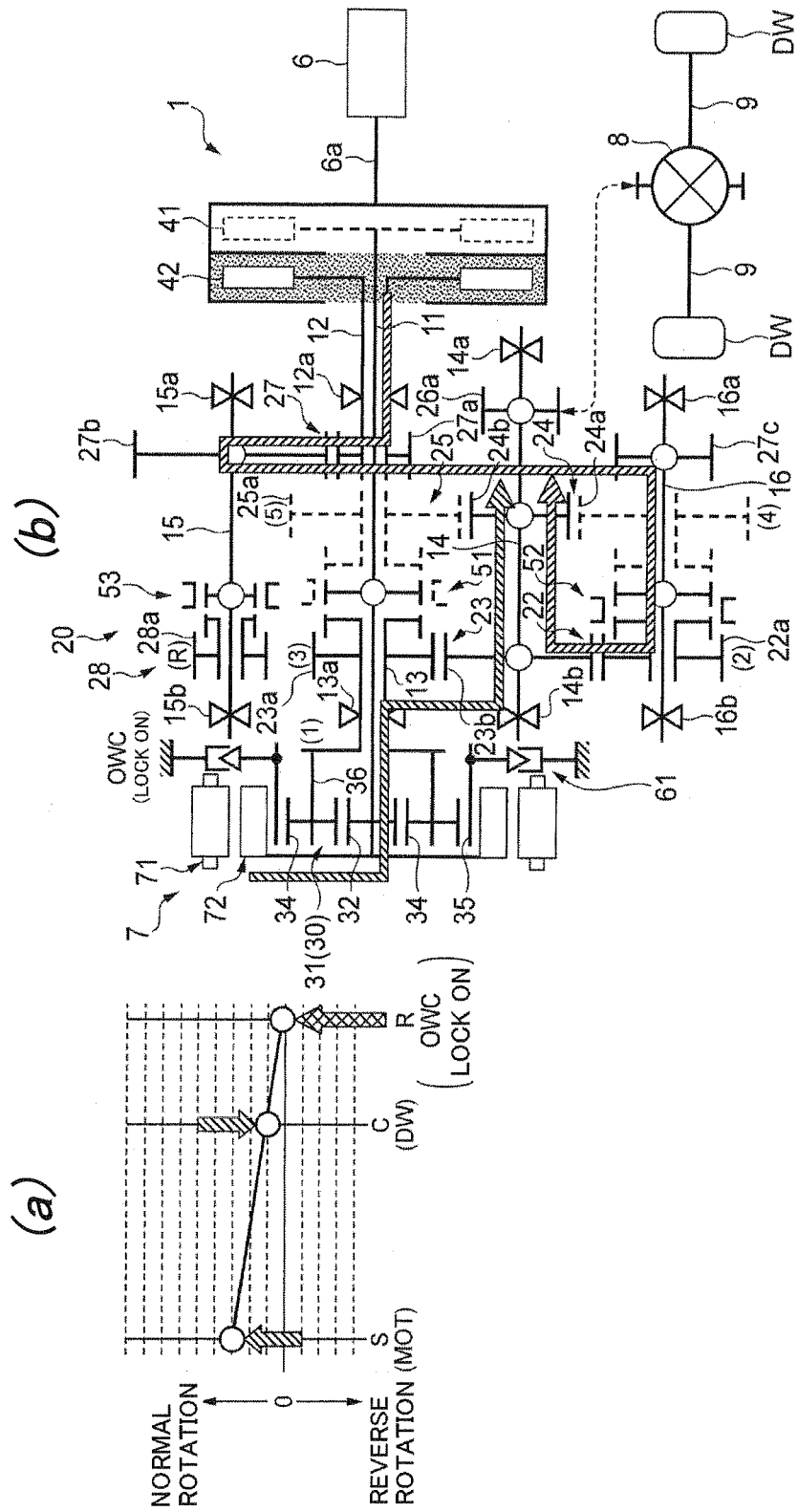
FIG. 8 is a diagram at the time of 2nd Post1 mode assist, (a) of FIG. 8 is a speed diagram, and (b) of FIG. 8 is a diagram showing a transmission situation of torque of the power transmission apparatus.

(a) of FIG. 8 and (b) of FIG. 8 show a case where the motor 7 assists during traveling in the 2nd Post1 mode. In this state, the motor 7 is driven to apply motor torque in the normal rotation direction, such that torque is input to the sun gear 32. Then, motor torque is reduced and transmitted from the sun gear 32 to the carrier 36, and then transmitted to the drive wheels DW and DW through the fourth transmission path which passes through the third-speed gear pair 23. Meanwhile, the motor 7 is not driven and regenerative torque is applied to the motor 7 in the reverse rotation direction, such that charging can be carried out by the motor 7.

In the 2nd Post1 mode, as shown in (a) of FIG. 11, if the one-way clutch 61 is unlocked, a 2nd mode is carried out. In the 2nd mode, the first clutch 41 is disconnected and the one-way clutch 61 is unlocked, so the sun gear 32 and the ring gear 35 run idle, and the motor 7 is disconnected.

In the 2nd mode, in addition to the example shown in (a) of FIG. 11, instead of changing the connection states of the first and second clutches 41 and 42 in the 1st Pre2 mode, the one-way clutch 61 is unlocked and the second clutch 42 may be connected while the first clutch 41 is being connected.

Figure 9:
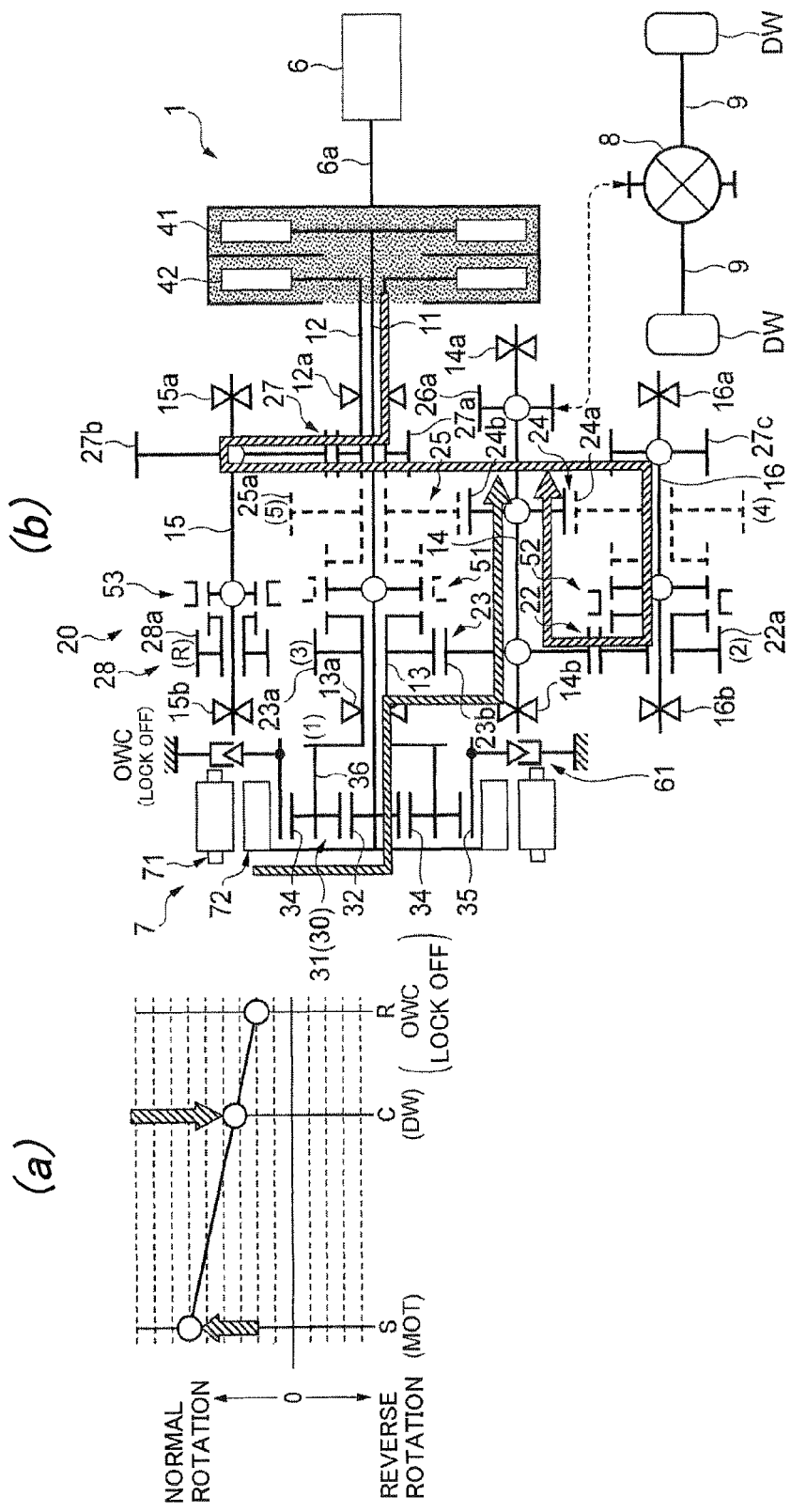
FIG. 9 is a diagram at the time of 2nd mode (clutch double clamp) assist, (a) of FIG. 9 is a speed diagram, and (b) of FIG. 9 is a diagram showing a transmission situation of torque of the power transmission apparatus.

(a) of FIG. 9 and (b) of FIG. 9 show a case where the motor 7 assists during traveling in the 2nd mode, in which both the first and second clutches 41 and 42 are connected (clutch double clamp). In this state, the motor 7 is driven to apply motor torque in the normal rotation direction, such that motor torque is input to the sun gear 32. Then, motor torque is reduced and transmitted from the sun gear 32 to the carrier 36, and then transmitted to the drive wheels DW and DW through the fourth transmission path which passes through the third-speed gear pair 23. Meanwhile, the motor 7 is not driven and regenerative torque is applied to the motor 7 in the reverse rotation direction, such that charging can be carried out by the motor 7. When both the first and second clutches 41 and 42 are connected, the sun gear 32 is diverted to a second-speed reduction gear ratio, and the carrier 36 is diverted to a third-speed reduction gear ratio, so predetermined differential rotation shown in (a) of FIG. 9 occurs in the planetary gear mechanism 31.

Subsequently, control when second-speed traveling is shifted up to third-speed traveling will be described. First, in the 2nd mode shown in (a) of FIG. 11, the first gear-shifting shifter 51 is in-geared from the neutral position to the third-speed connection position (2nd Pre3 mode). Hereinafter, this state is referred to as 2nd Pre3 mode.

Figure 10:
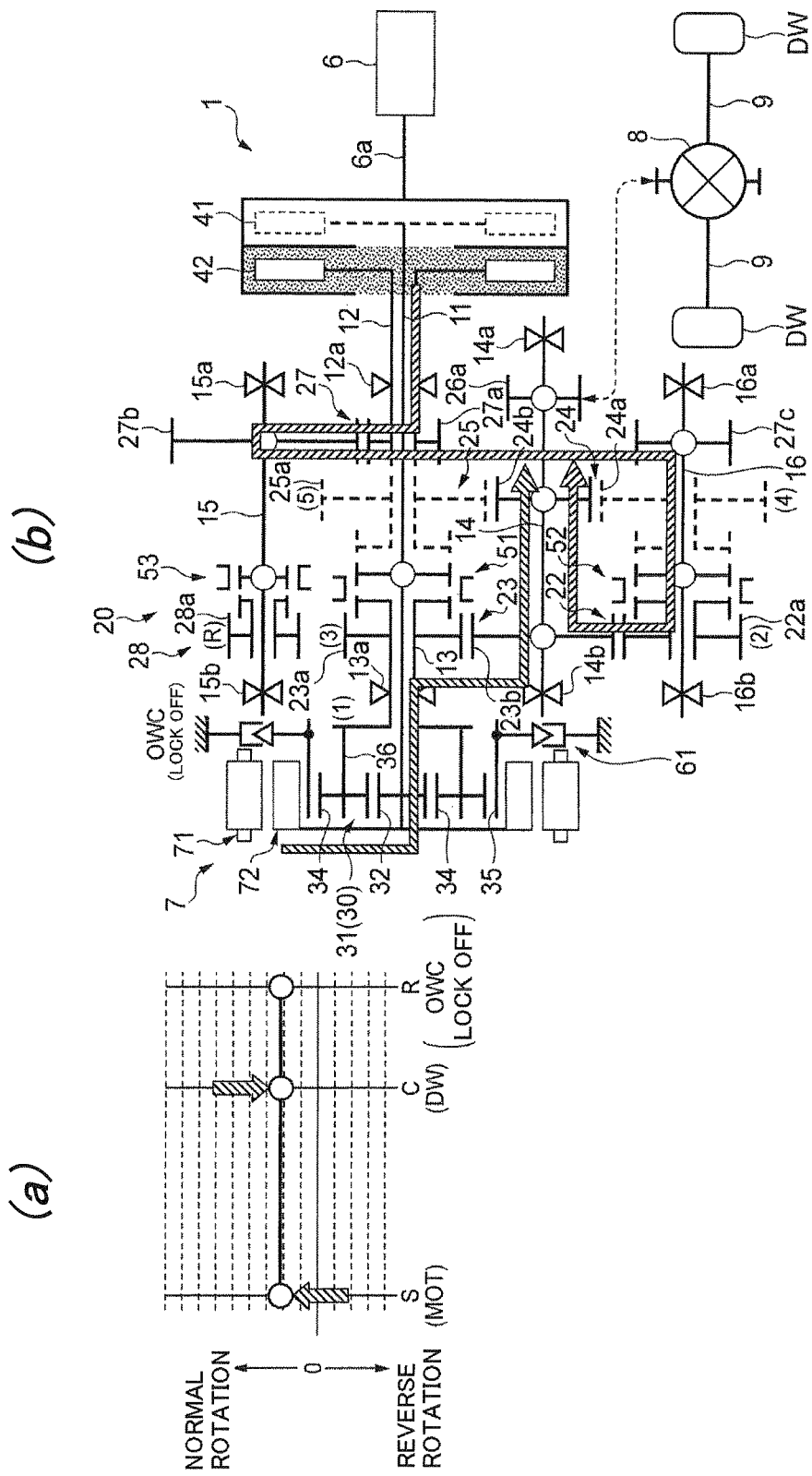
FIG. 10 is a diagram at the time of 2nd Pre3 mode assist, (a) of FIG. 10 is a speed diagram, and (b) of FIG. 10 is a diagram showing a transmission situation of torque of the power transmission apparatus.

(a) of FIG. 10 and (b) of FIG. 10 show a case where the motor 7 assists during traveling in the 2nd Pre3 mode. As described above, the first gear-shifting shifter 51 is in-geared to the third-speed connection position, such that the planetary gear mechanism 31 integrally rotates. Thus, the motor 7 is driven to apply motor torque in the normal rotation direction, such that motor torque is transmitted to the drive wheel DW and DW through the fourth transmission path, which passes through the third-speed gear pair 23, as it is without being reduced. Meanwhile, the motor 7 is not driven and regenerative torque is applied to the motor 7 in the reverse rotation direction, such that charging can be carried out by the motor 7.

Then, the connection states of the first and second clutches 41 and 42 are changed, that is, the second clutch 42 is disconnected and the first clutch 41 is connected, such that as shown in (b) of FIG. 11, engine torque is transmitted to the drive wheels DW and DW through the third transmission path which passes through the third-speed gear pair 23. Thus, third-speed traveling (3rd Post2 mode) is carried out. Hereinafter, the state of (b) of FIG. 11 is referred to as 3rd Post2 mode. In this state, the motor 7 is driven to apply motor torque in the normal rotation direction, or regenerative torque is applied in the reverse rotation direction, such that assist or charging can be carried out by the motor 7.

Then, in the 3rd Post2 mode, as shown in (a) of FIG. 13, the second gear-shifting shifter 52 is in-geared from the second-speed connection position to the neutral position, such that a 3rd mode is carried out.

Figure 12:
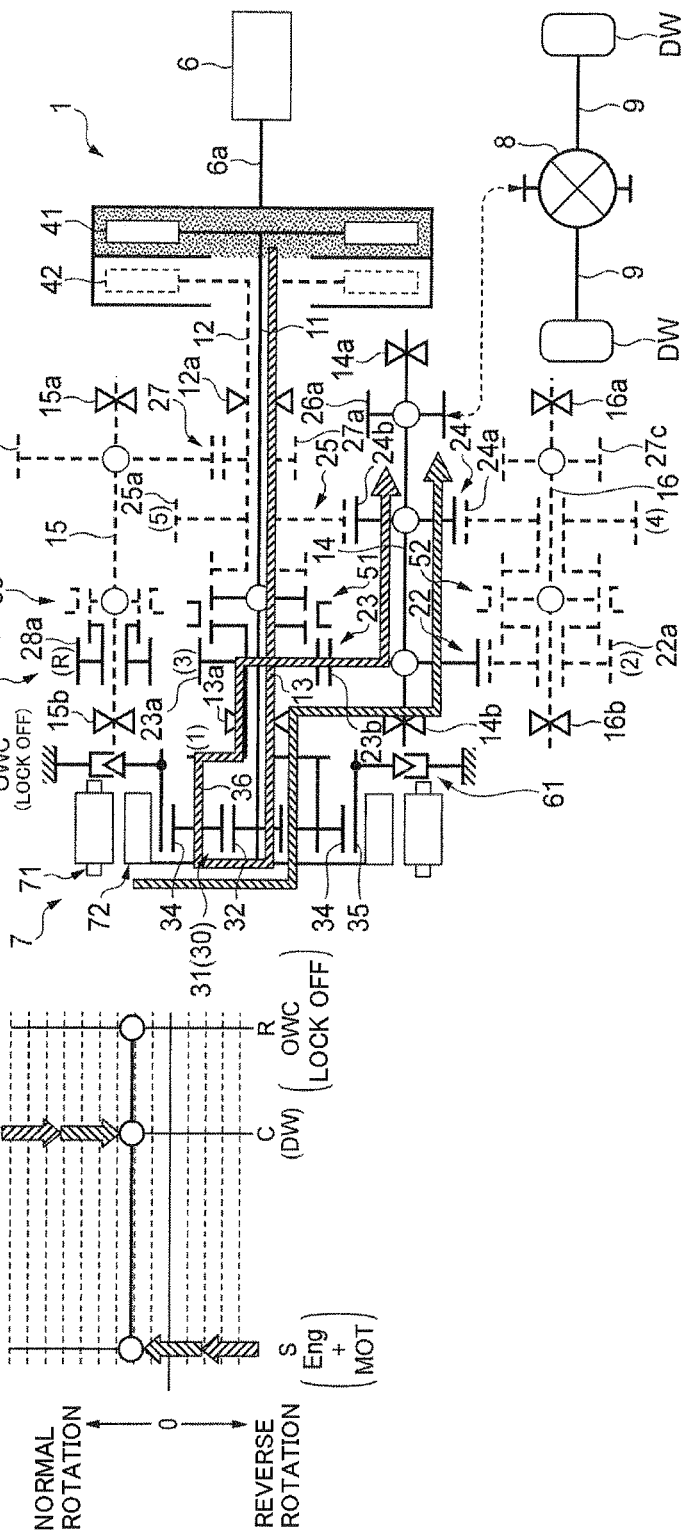
FIG. 12 is a diagram at the time of 3rd mode assist, (a) of FIG. 12 is a speed diagram, and (b) of FIG. 12 is a diagram showing a transmission situation of torque of the power transmission apparatus.

(a) of FIG. 12 and (b) of FIG. 12 show a case where the motor 7 assists during traveling in the 3rd mode. In this state, the motor 7 is driven to apply motor torque in the normal rotation direction, such that motor torque is transmitted to the drive wheels DW and DW through the fourth transmission path, which passes through the third-speed gear pair 23, as it is without being reduced. Meanwhile, the motor 7 is not driven and regenerative torque is applied to the motor 7 in the reverse rotation direction, such that charging can be carried out by the motor 7 during traveling in the 3rd mode.

Subsequently, control when third-speed traveling is shifted up to fourth-speed traveling will be described. First, in the 3rd mode of (a) of FIG. 13, the second gear-shifting shifter 52 is in-geared from the neutral position to the fourth-speed connection position (3rd Pre4 mode). Hereinafter, this state is referred to as 3rd Pre4 mode. In this state, the motor 7 is driven to apply motor torque in the normal rotation direction, or regenerative torque is applied in the reverse rotation direction, such that assist or charging can be carried out by the motor 7. Then, the connection states of the first and second clutches 41 and 42 are changed, that is, the first clutch 41 is disconnected and the second clutch 42 is connected, such that as shown in (b) of FIG. 13, engine torque is transmitted to the drive wheels DW and DW through the second transmission path which passes through the fourth-speed gear pair 24. Thus, fourth-speed traveling (4th Post3 mode) is carried out. Hereinafter, the state of (b) of FIG. 13 is referred to as 4th Post3 mode.

Figure 14:
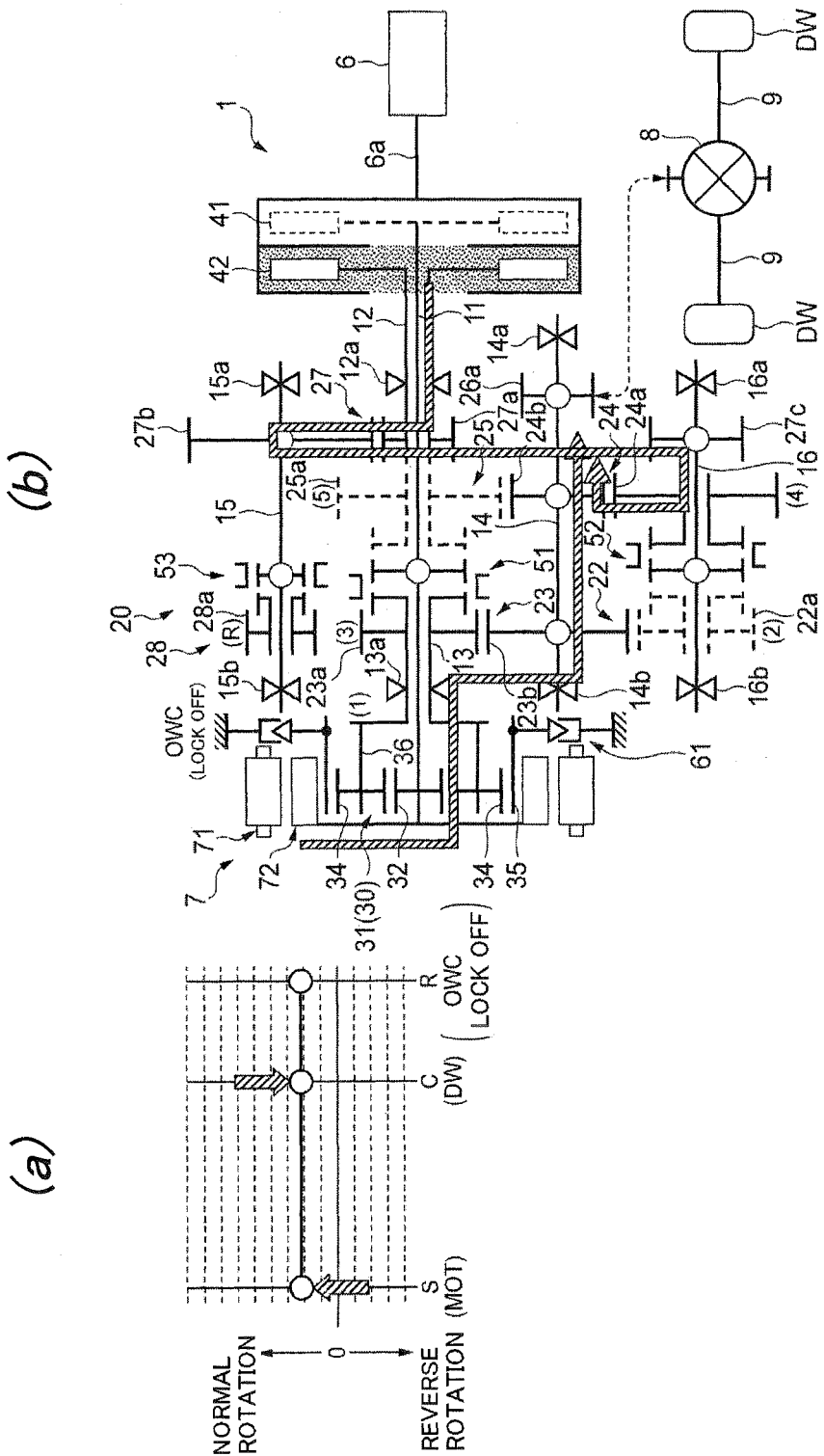
FIG. 14 is a diagram at the time of 4th Post3 mode assist, (a) of FIG. 14 is a speed diagram, and (b) of FIG. 14 is a diagram showing a transmission situation of torque of the power transmission apparatus.

(a) of FIG. 14 and (b) of FIG. 14 show a case where the motor 7 assists during traveling in the 4th Post3 mode. In this state, the motor 7 is driven to apply motor torque in the normal rotation direction, such that motor torque is transmitted to the drive wheels DW and DW through the fourth transmission path, which passes through the third-speed gear pair 23, as it is. Meanwhile, the motor 7 is not driven and regenerative torque is applied to the motor in the reverse rotation direction, such that charging can be carried out by the motor 7 during traveling in the 4th Post3 mode.

Then, in the 4th Post3 mode, as shown in (a) of FIG. 17, the first gear-shifting shifter 51 is in-geared from the third-speed connection position to the neutral position, such that a 4th mode is carried out. In the 4th mode, the first clutch 41 is disconnected and the one-way clutch 61 is unlocked, such that the sun gear 32 and the ring gear 35 run idle, and the motor 7 is disconnected.

In the 4th mode, in addition to the example shown in (a) of FIG. 17, instead of changing the connection states of the first and second clutches 41 and 42 in the 3rd Pre4 mode, the second clutch 42 may be connected while the first clutch 41 is being connected.

Figure 15:
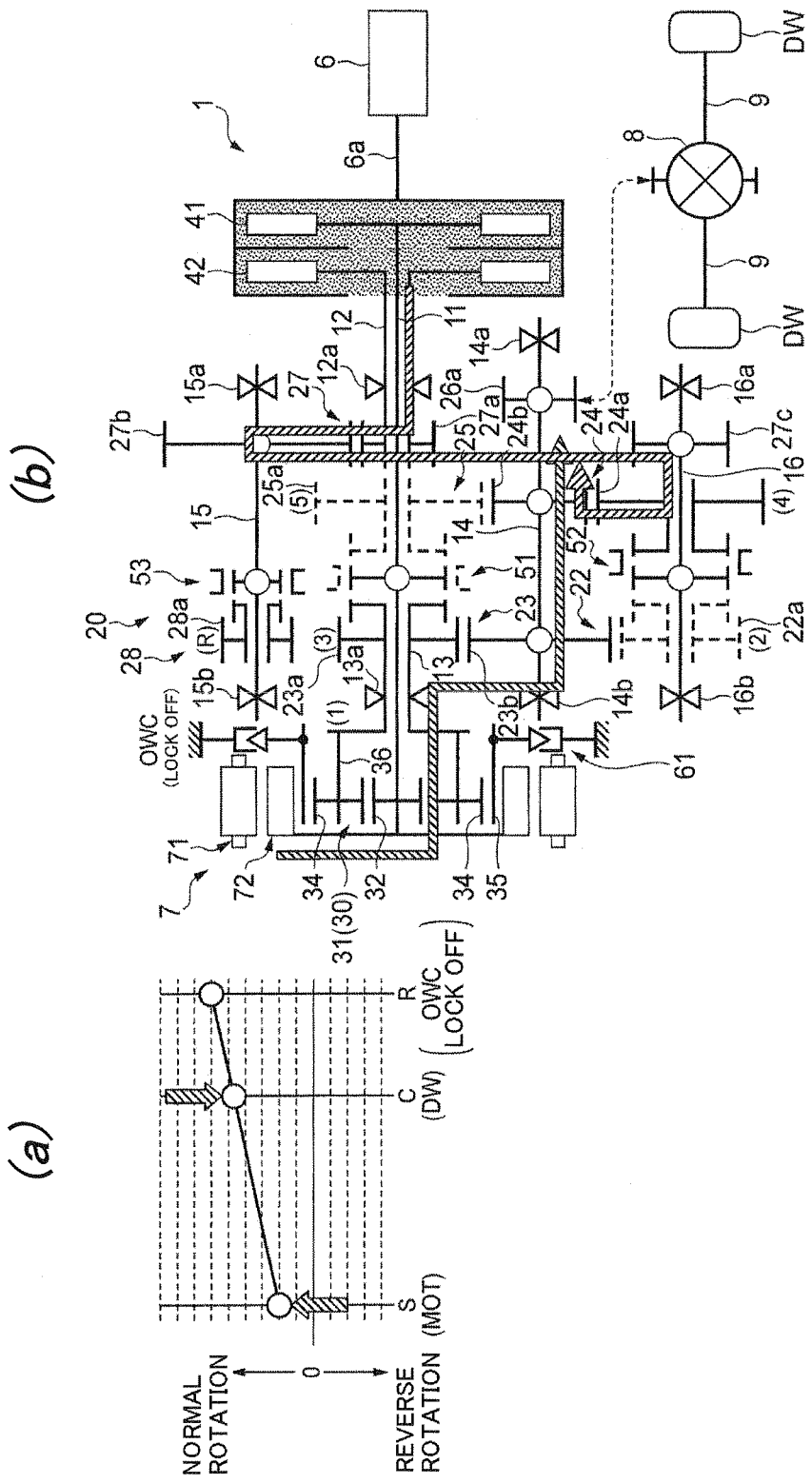
FIG. 15 is a diagram at the time of 4th mode (clutch double clamp) assist, (a) of FIG. 15 is a speed diagram, and (b) of FIG. 15 is a diagram showing a transmission situation of torque of the power transmission apparatus.

(a) of FIG. 15 and (b) of FIG. 15 show a case where the motor 7 assists during traveling in the 4th mode, in which both the first and second clutches 41 and 42 are connected (clutch double clamp). In this state, the motor 7 is driven to apply motor torque in the normal rotation direction, such that motor torque is input to the sun gear 32. Then, motor torque is increased and transmitted from the sun gear 32 to the carrier 36, and then transmitted to the drive wheels DW and DW through the fourth transmission path which passes through the third-speed gear pair 23. Meanwhile, the motor 7 is not driven and regenerative torque is applied to the motor 7 in the reverse rotation direction, such that charging can be carried out by the motor 7 during traveling in the 4th mode. When both the first and second clutches 41 and 42 are connected, the sun gear 32 is diverted to a fourth-speed reduction gear ratio, and the carrier 36 is diverted to a third-speed reduction gear ratio, so predetermined differential rotation shown in (a) of FIG. 15 occurs in the planetary gear mechanism 31.

Subsequently, control when fourth-speed traveling is shifted up to fifth-speed traveling will be described. First, in the 4th mode shown in (a) of FIG. 17, the first gear-shifting shifter 51 is in-geared from the neutral position to a fifth-speed connection position (4th Pre5 mode). Hereinafter, this state is referred to as 4th Pre5 mode.

Figure 16:
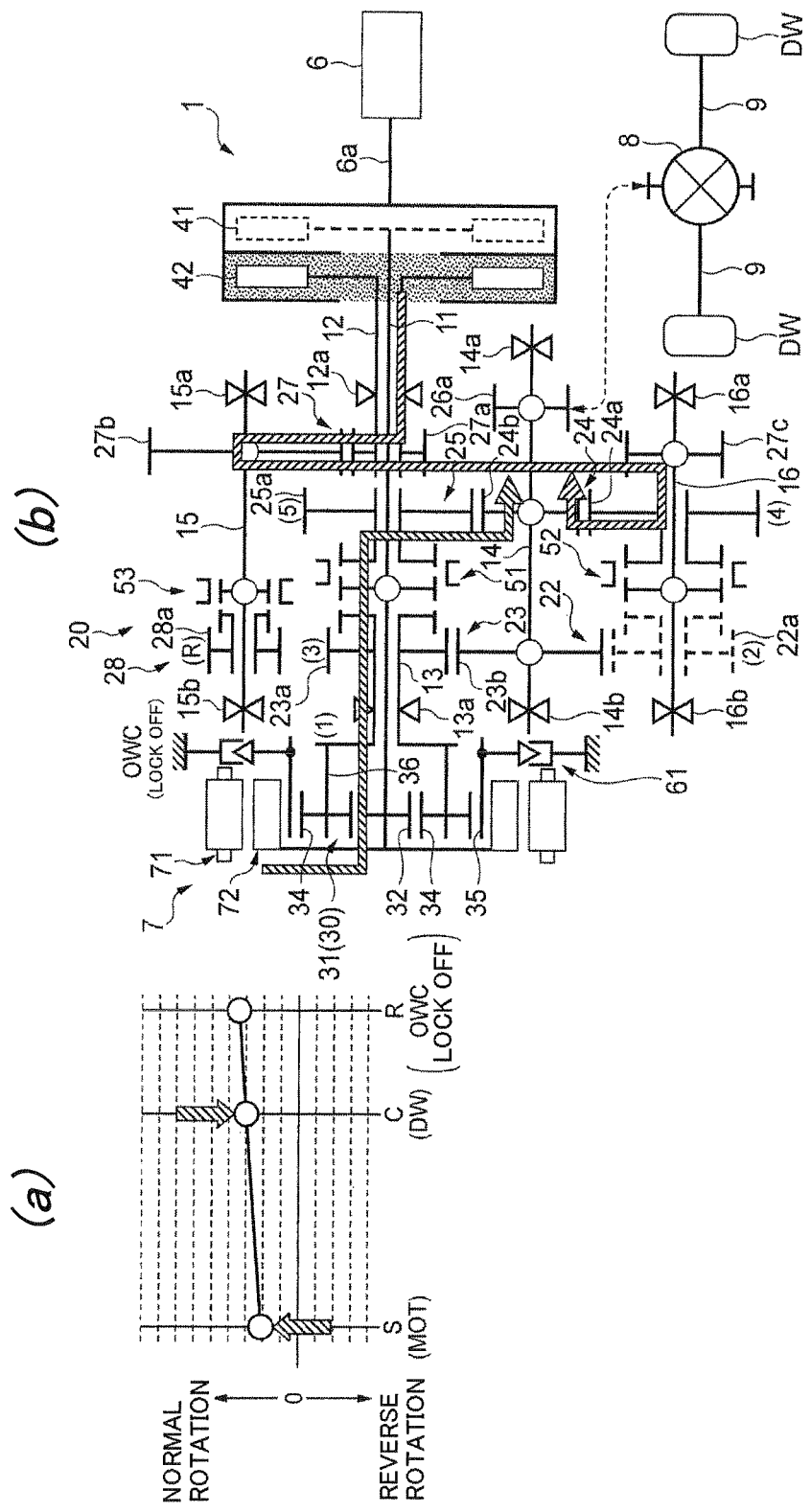
FIG. 16 is a diagram at the time of 4th Pre5 mode assist, (a) of FIG. 16 is a speed diagram, and (b) of FIG. 16 is a diagram showing a transmission situation of torque of the power transmission apparatus.

(a) of FIG. 16 and (b) of FIG. 16 show a case where the motor 7 assists during traveling in the 4th Pre5 mode. In this state, the motor 7 is driven to apply motor torque in the normal rotation direction, such that motor torque is input to the sun gear 32. Then, motor torque is increased and transmitted from the sun gear 32 to the carrier 36, and then transmitted to the drive wheels DW and DW through the fourth transmission path which passes through the fifth-speed gear pair 25. Meanwhile, the motor 7 is not driven and regenerative torque is applied to the motor 7 in the reverse rotation direction, such that charging can be carried out by the motor 7 during traveling in the 4th Pre5 mode. In this state, the sun gear 32 is diverted to a fifth-speed reduction gear ratio, and the carrier 36 is diverted to the third-speed reduction gear ratio, so predetermined differential rotation shown in (a) of FIG. 16 occurs in the planetary gear mechanism 31.

Then, the connection states of the first and second clutches 41 and 42 are changed, that is, the second clutch 42 is disconnected and the first clutch 41 is connected, such that as shown in (b) of FIG. 17, engine torque is transmitted to the drive wheels DW and DW through the third transmission path which passes through the fifth-speed gear pair 25. Thus, fifth-speed traveling (5th Post4 mode) is carried out. Hereinafter, the state of (b) of FIG. 17 is referred to as 5th Post4 mode. In this state, the motor 7 is driven to apply motor torque in the normal rotation direction, or regenerative torque is applied in the reverse rotation direction, such that assist or charging can be carried out by the motor 7.

Then, in the 5th Post4 mode, the second gear-shifting shifter 52 is in-geared from the fourth-speed connection position to the neutral position, such that a 5th mode is carried out.

Figure 18:
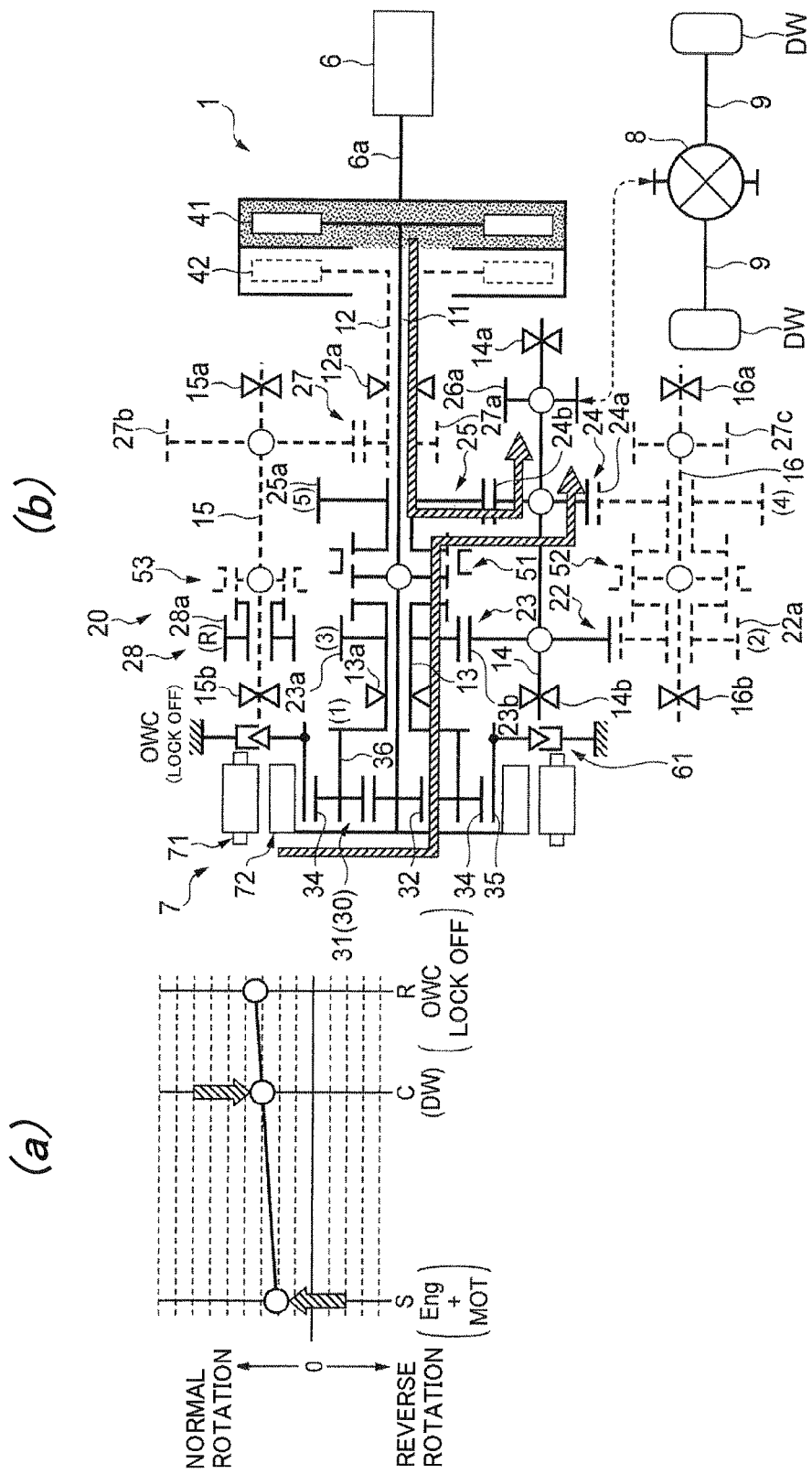
FIG. 18 is a diagram at the time of 5th mode assist, (a) of FIG. 18 is a speed diagram, and (b) of FIG. 18 is a diagram showing a transmission situation of torque of the power transmission apparatus.

(a) of FIG. 18 and (b) of FIG. 18 show a case where the motor 7 assists during traveling in the 5th mode. In this state, the motor 7 is driven to apply motor torque in the normal rotation direction, such that motor torque is increased and transmitted from the sun gear 32 to the carrier 36, and then transmitted to the drive wheels DW and DW through the fourth transmission path which passes through the third-speed gear pair 23. Meanwhile, the motor 7 is not driven and regenerative torque is applied to the motor 7 in the reverse rotation direction, such that charging can be carried out by the motor 7 during traveling in the 5th mode.

In this state, the sun gear 32 is diverted to the fifth-speed reduction gear ratio, and the carrier 36 is diverted to the third-speed reduction gear ratio, so predetermined differential rotation shown in (a) of FIG. 18 occurs in the planetary gear mechanism 31.

Next, reverse traveling in the power transmission apparatus 1 will be described.

Reverse traveling of the vehicle includes a case where the engine 6 is used and a case where reverse traveling is carried out by EV traveling. In this embodiment, description will be provided for the case where the engine 6 is used. Reverse traveling by EV traveling will be described below together with the description of EV traveling.

Reverse traveling when only torque of the engine 6 is used is realized by in-gearing the reverse shifter 53 to the reverse connection position in the initial state to connect the second clutch 42. Thus, torque of the engine 6 is transmitted to the drive wheels DW and DW through the second main shaft 12, the idle drive gear 27a, the first idle driven gear 27b, the first intermediate shaft 15, the reverse gear pair 28 (reverse drive gear 28a and first common driven gear 23b), the counter shaft 14, the final gear 26a, the differential gear mechanism 8, and the drive shafts 9 and 9. At this time, the first clutch 41 is disconnected and the one-way clutch 61 is unlocked, so the sun gear 32 and the ring gear 35 run idle, and the motor 7 is disconnected.

Next, EV traveling will be described.

The power transmission apparatus 1 includes 3 EV traveling modes.

First EV traveling is a 1st EV mode in which the one-way clutch 61 is locked (OWC lock ON) in the initial state.

Figure 19:
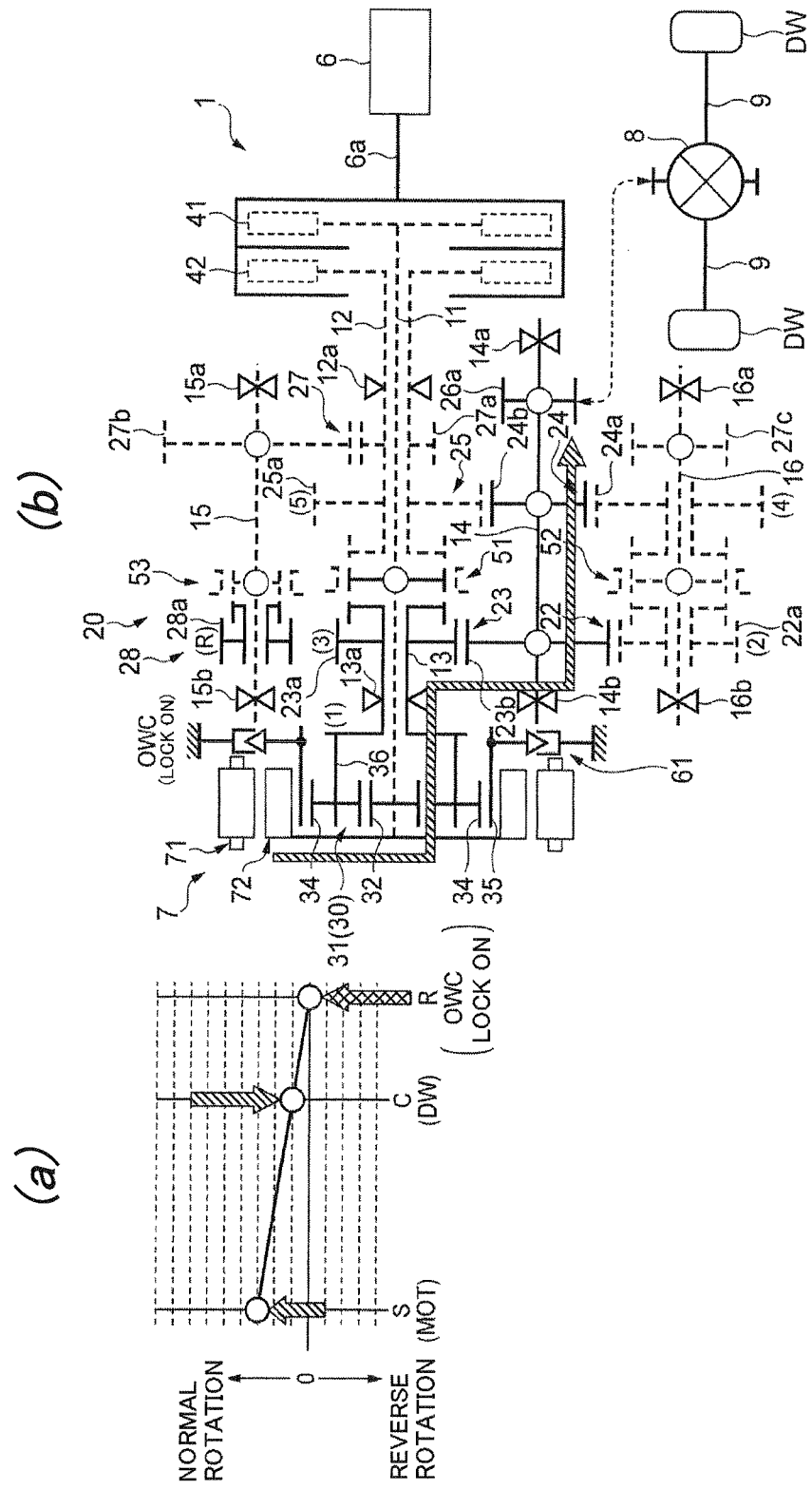
FIG. 19 is a diagram in a 1st EV mode, (a) of FIG. 19 is a speed diagram and (b) of FIG. 19 is a diagram showing a transmission situation of torque of the power transmission apparatus.

In this state, if the motor 7 is driven (torque is applied in the normal rotation direction), as shown in (a) of FIG. 19, the sun gear 32 of the planetary gear mechanism 31 connected to the rotor 72 rotates in the normal rotation direction. At this time, as shown in (b) of FIG. 19, since the first and second clutches 41 and 42 are disconnected, power transmitted to the sun gear 32 is not transmitted from the first main shaft 11 to the crankshaft 6a of the engine 6. Then, since the one-way clutch 61 is locked, motor torque is reduced and transmitted from the sun gear 32 to the carrier 36, and then transmitted to the drive wheels DW and OW through the fourth transmission path which passes through the third-speed gear pair 23.

Reverse traveling in the 1st EV mode is carried out by driving the motor 7 in the reverse rotation direction to apply motor torque in the reverse rotation direction.

Second EV traveling is a 3rd EV mode in which, in the initial state, the first gear-shifting shifter 51 is in-geared from the neutral position to the third-speed connection position. As described above, the first gear-shifting shifter 51 is in-geared to the third-speed connection position, such that the planetary gear mechanism 31 is integrated.

Figure 20:
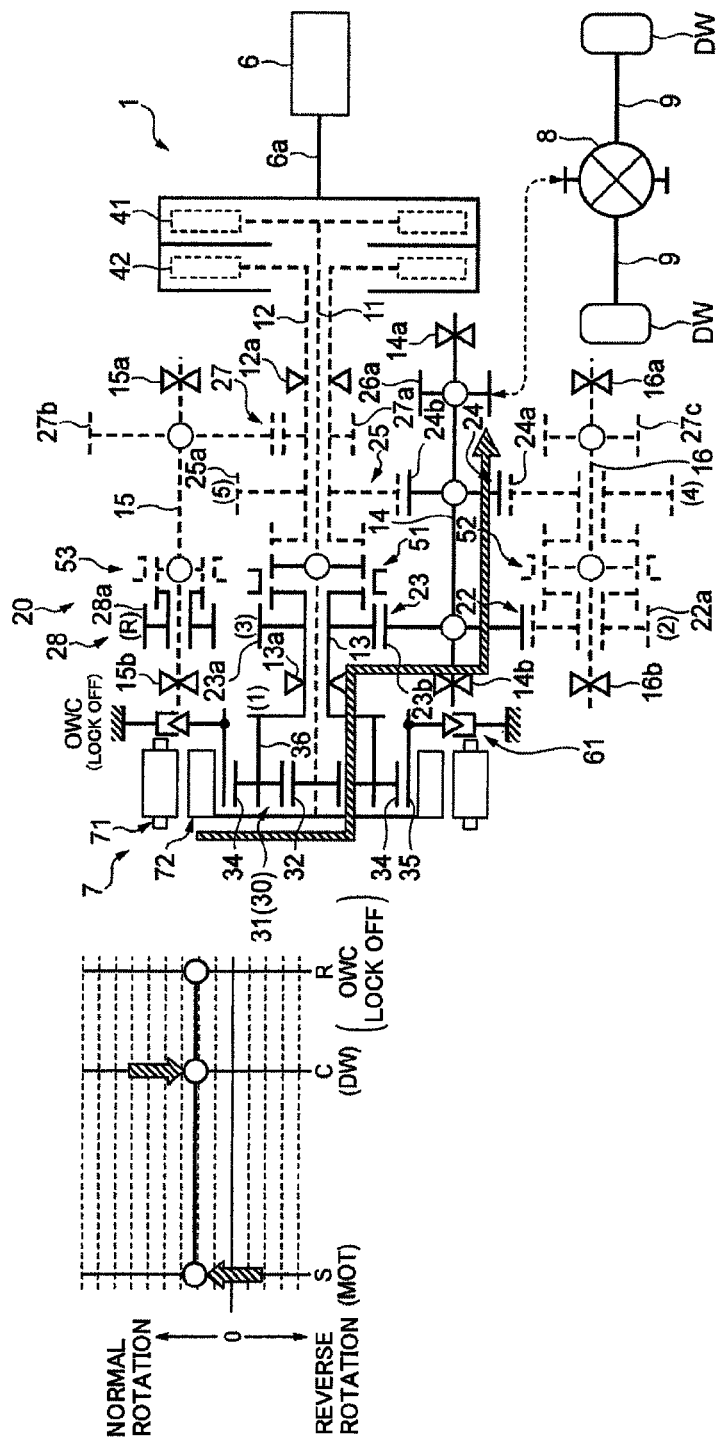
FIG. 20 is a diagram in a 3rd EV mode, (a) of FIG. 20 is a speed diagram, and (b) of FIG. 20 is a diagram showing a transmission situation of torque of the power transmission apparatus.

In this state, if the motor 7 is driven (torque is applied in the normal rotation direction), as shown in (a) of FIG. 20, the planetary gear mechanism 31 connected to the rotor 72 integrally rotates in the normal rotation direction. At this time, since the first and second clutches 41 and 42 are disconnected, power transmitted to the sun gear 32 is not transmitted from the first main shaft 11 to the crankshaft 6a of the engine 6.

Then, motor torque is transmitted to the drive wheels DW and DW through the fourth transmission path, which passes through the third-speed gear pair 23, as it is without being reduced.

Reverse traveling in the 3rd EV mode is carried out by driving the motor 7 in the reverse rotation direction to apply motor torque in the reverse rotation direction.

Third EV traveling is a 5th EV mode in which, in the initial state, the first gear-shifting shifter 51 is in-geared from the neutral position to the fifth-speed connection position.

Figure 21:
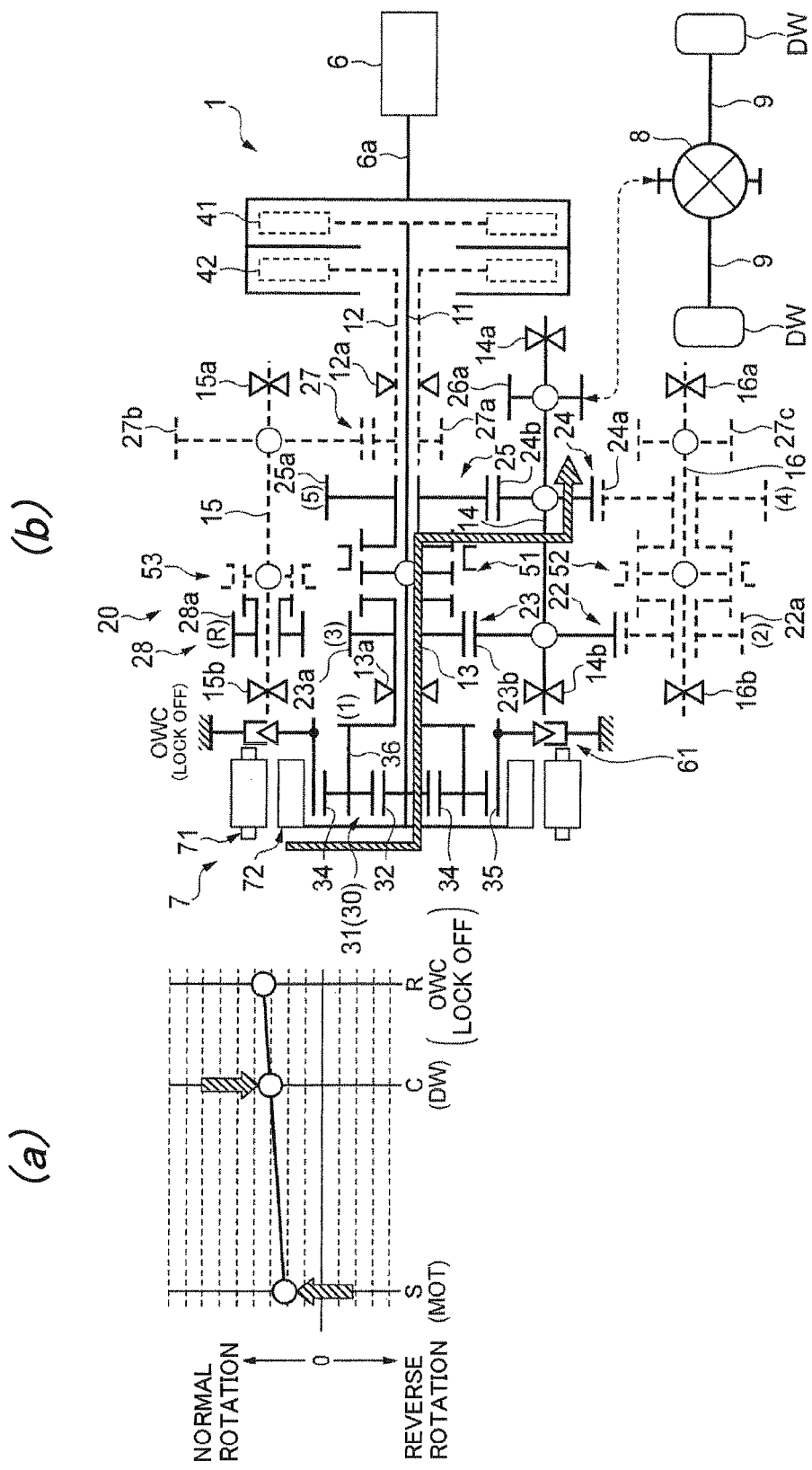
FIG. 21 is a diagram in a 5th EV mode, (a) of FIG. 21 is a speed diagram, and (b)

In this state, if the motor 7 is driven (torque is applied in the normal rotation direction), as shown in (a) of FIG. 21, the sun gear 32 of the planetary gear mechanism 31 connected to the rotor 72 rotates in the normal rotation direction. At this time, as shown in (b) of FIG. 21, since the first and second clutches 41 and 42 are disconnected, power transmitted to the sun gear 32 is not transmitted from the first main shaft 11 to the crankshaft 6a of the engine 6. Then, motor torque is increased and transmitted from the sun gear 32 to the carrier 36, and then transmitted to the drive wheels DW and DW through the fourth transmission path which passes through the fifth-speed gear pair 25. Reverse traveling in the 5th EV mode is carried out by driving the motor 7 in the reverse rotation direction to apply motor torque in the reverse rotation direction.

The shifting between the above EV traveling modes (the 1st EV mode, the 3rd EV mode, and the 5th EV mode) is an AMT shifting executed by a locking of the one-way clutch 61 and an operation of the first gear-shifting shifter 51. For example, in a shifting-up from the 1st EV mode in (b) of FIG. 19 to the 3rd EV mode in (b) of FIG. 20, the torque of the electric motor is reduced, a rotation speed of the motor is adjusted after releasing the locking of the one-way clutch 60, and the first gear-shifting shifter 51 is in-geared at the third-speed connection position.

In the present embodiment, an EV shifting mode where the third-speed traveling or the fifth-speed traveling is carried out after a starting in the 1st EV mode, or a third-speed EV fixing mode where the starting and the traveling is carried out in the 3rd EV mode is selected according to an SOC of the battery 3.

Figure 22:
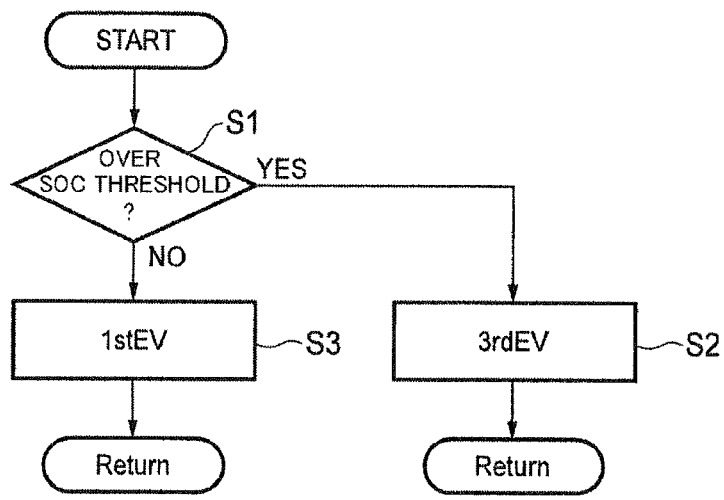
FIG. 22 shows an example of a control in an EV traveling.

As shown in FIG. 22, in this control, first, it is detected whether the SOC of the battery 3 is on or over a threshold (S1). When the SOC of the battery 3 is on or over the threshold, the third-speed EV fixing mode is selected and the EV starting and the traveling is carried out in the 3rd EV mode (S2). Thereby, a wide-ranging traveling is achieved without a shifting operation, that is, without a gear-shifting shock by the AMT shifting. Moreover, when the SOC of the battery 3 is lower than the threshold, the EV shifting mode is selected and the starting is carried out in the 1st EV mode (S3).

Figure 23:
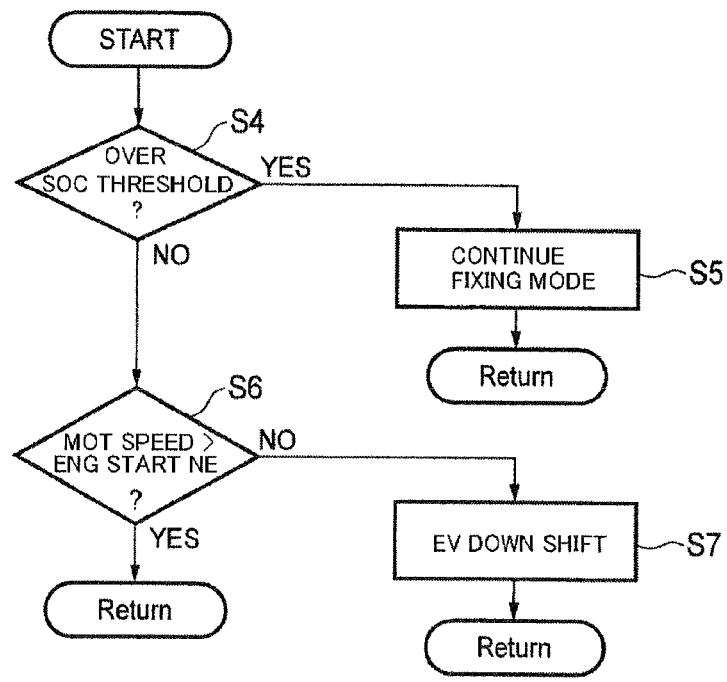
FIG. 23 shows an example of a control in an EV fixing mode in FIG. 22.

Further, it is possible to switch to the EV shifting mode even when the EV fixing mode is selected. An example of this case is shown in FIG. 23. In this control, first, it is detected whether the SOC of the battery 3 is on or over a threshold (S4). When the SOC of the battery 3 is on or over the threshold, the EV fixing mode is continued (S5). When the SOC of the battery 3 is lower than the threshold, a rotating speed of the motor 7 is compared with a starting rotating speed of the engine 6 (S6). When the rotating speed of the motor 7 is lower than the starting rotating speed of the engine 6 in a comparing result, a down-shifting is executed (S7), so as to start the engine 6.

Figure 24:
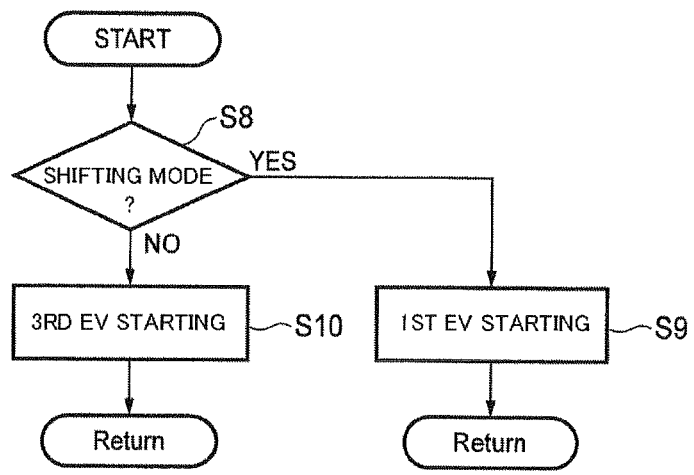
FIG. 24 shows an example of a control in an EV traveling.

Further, the EV shifting mode and the EV fixing mode may be set so that they are selectable by a switching operation by a driver. In this case, as shown in FIG. 24, it is detected whether EV shifting is selected (S8). When the EV shifting mode is selected, the starting is carried out in the 1st EV mode (S9). When the EV shifting mode is not selected, the EV starting is carried out in the 3rd EV mode (S10).

Figure 25:
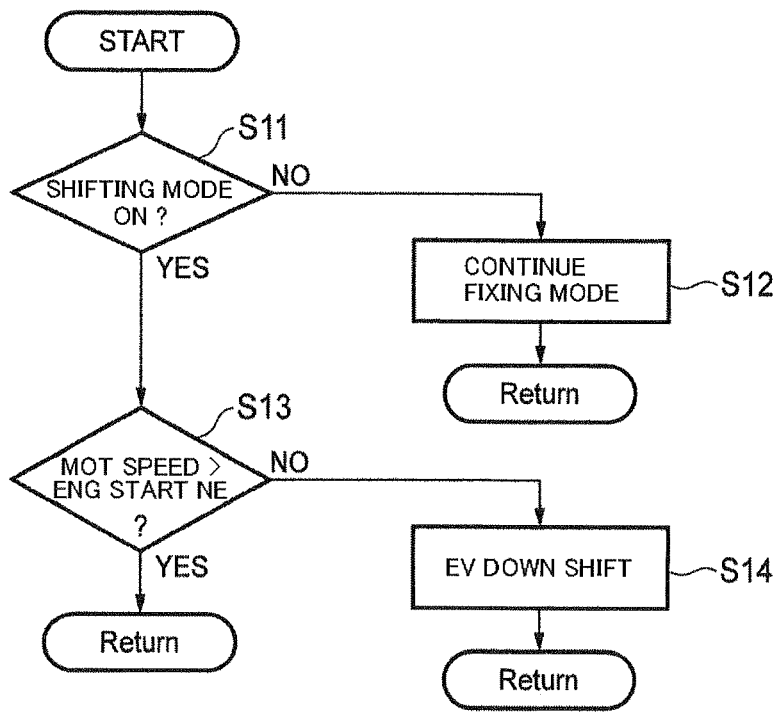
FIG. 25 shows an example of a control in an EV fixing mode in FIG. 24.

Further, it is possible to switch to the EV shifting mode even when the EV fixing mode is selected. In this case, as shown in FIG. 25, first, it is detected whether the EV shifting mode is selected (S11). When the EV shifting mode is not selected in a detecting result, the EV fixing mode is continued (S12). When the EV shifting mode is selected, a rotating speed of the motor 7 is compared with a starting rotating speed of the engine 6 (S13). When the rotating speed of the motor 7 is lower than the starting rotating speed of the engine 6 in a comparing result, a down-shifting is executed (S14), so that the engine 6 is always ready to start.

Figure 26:
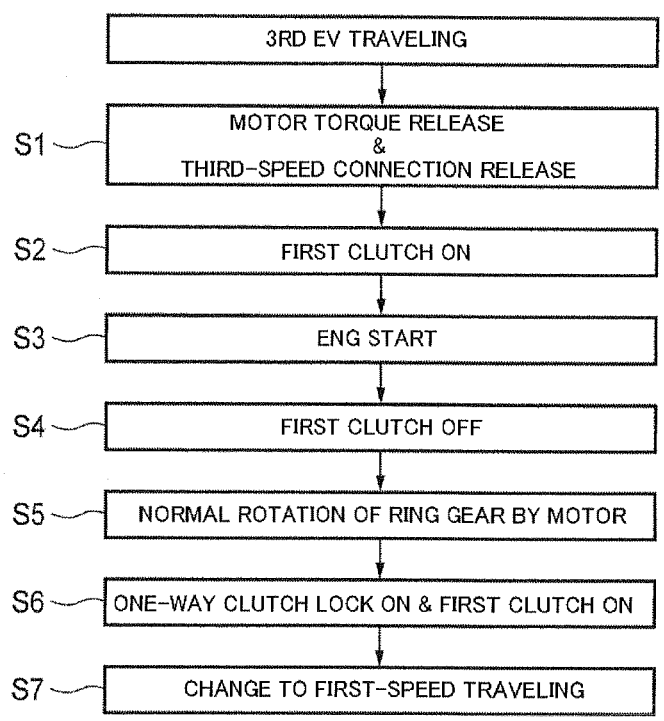
FIG. 26 is a flowchart when an engine is started from EV traveling.

Next, a case where an engine is started from a very low speed EV traveling in the 3rd EV mode will be described with reference to a flowchart of FIG. 26.

Figure 27:
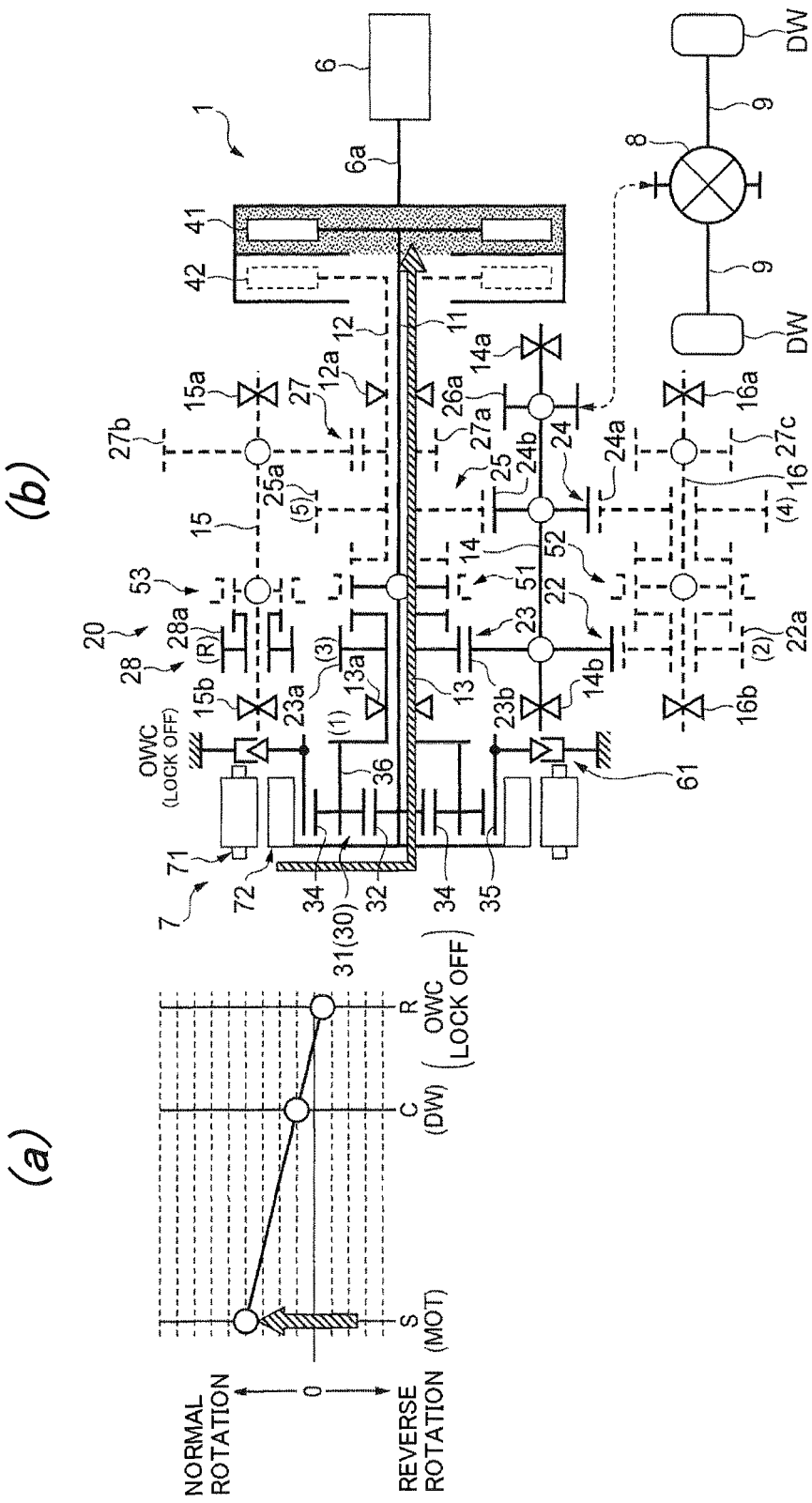
FIG. 27 (a) of FIG. 27 is a speed diagram and (b) of FIG. 27 is a diagram showing a transmission situation of torque of the power transmission apparatus when very low-speed traveling is carried out at the same time an engine is started.

First, during traveling in the 3rd EV mode shown in (a) of FIG. 20 and (b) of FIG. 20, torque of the motor 7 is extracted and the first gear-shifting shifter 51 which is in-geared to the third-speed connection position is in-geared to the neutral position (S1). Subsequently, the first clutch 41 is connected (S2), and the crankshaft 6a is cranked to start the engine 6 (S3). At this time, as shown in (a) of FIG. 27 and (b) of FIG. 27, the sun gear 32 rotates in the normal rotation direction, and the ring gear 35 rotates in the reverse rotation direction. A small amount of torque is transmitted to the carrier 36, such that very low-speed traveling is carried out. Subsequently, the first clutch 41 is disconnected (S4), and motor torque increases to rotate the ring gear 35 in the normal rotation direction (S5). Then, the one-way clutch 61 is locked and the first clutch 41 is connected (S6). Thus, traveling in the 3rd EV mode can be changed to first-speed traveling (1st mode assist) shown in (a) of FIG. 6 and (b) of FIG. 6 (S7).

Instead of connecting the first clutch 41 to start the engine 6, the second clutch 42 may be connected and the second gear-shifting shifter 52 may be in-geared to the second-speed connection position or the fourth-speed connection position, thereby starting the engine 6.

Similarly, in the 1st EV mode and the 5th EV mode, the engine can be started.

Next, a case where charging is carried out while the vehicle is stopped (idling) will be described.

Figure 28:
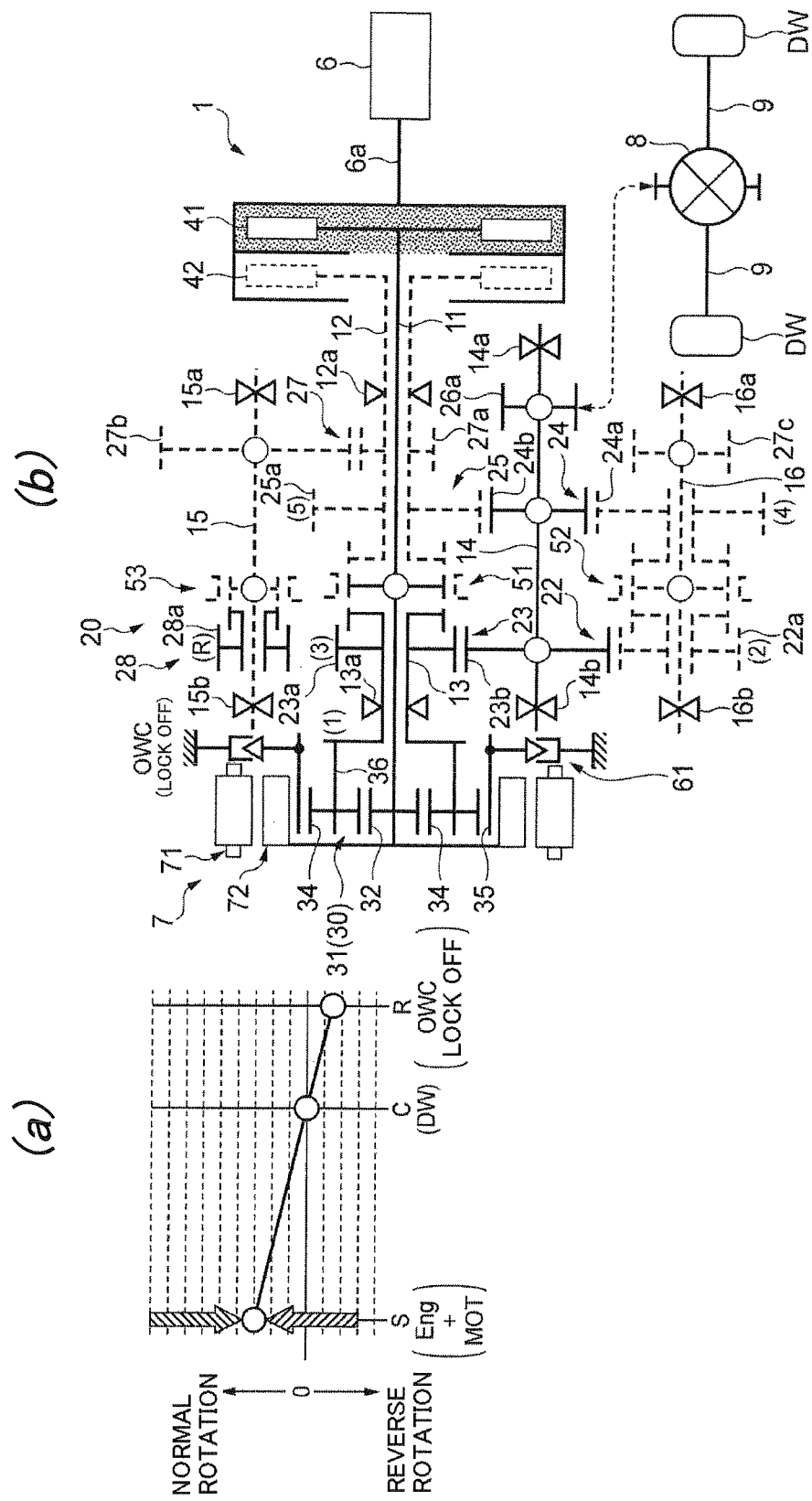
FIG. 28 (a) of FIG. 28 is a speed diagram and (b) of FIG. 28 is a diagram showing a transmission situation of torque of the power transmission apparatus at the time of idle charging.

With regard to charging while the vehicle is stopped (idling), the first clutch 41 is connected to increase engine torque from the idling state, such that as shown in (a) of FIG. 28 and (b) of FIG. 28, the motor 7 directly connected to the sun gear 32 rotates in the normal rotation direction and torque is applied in the reverse rotation direction. Thus, charging is carried out. At this time, since the one-way clutch 61 is unlocked, no torque is transmitted to the carrier 36.

Figure 29:
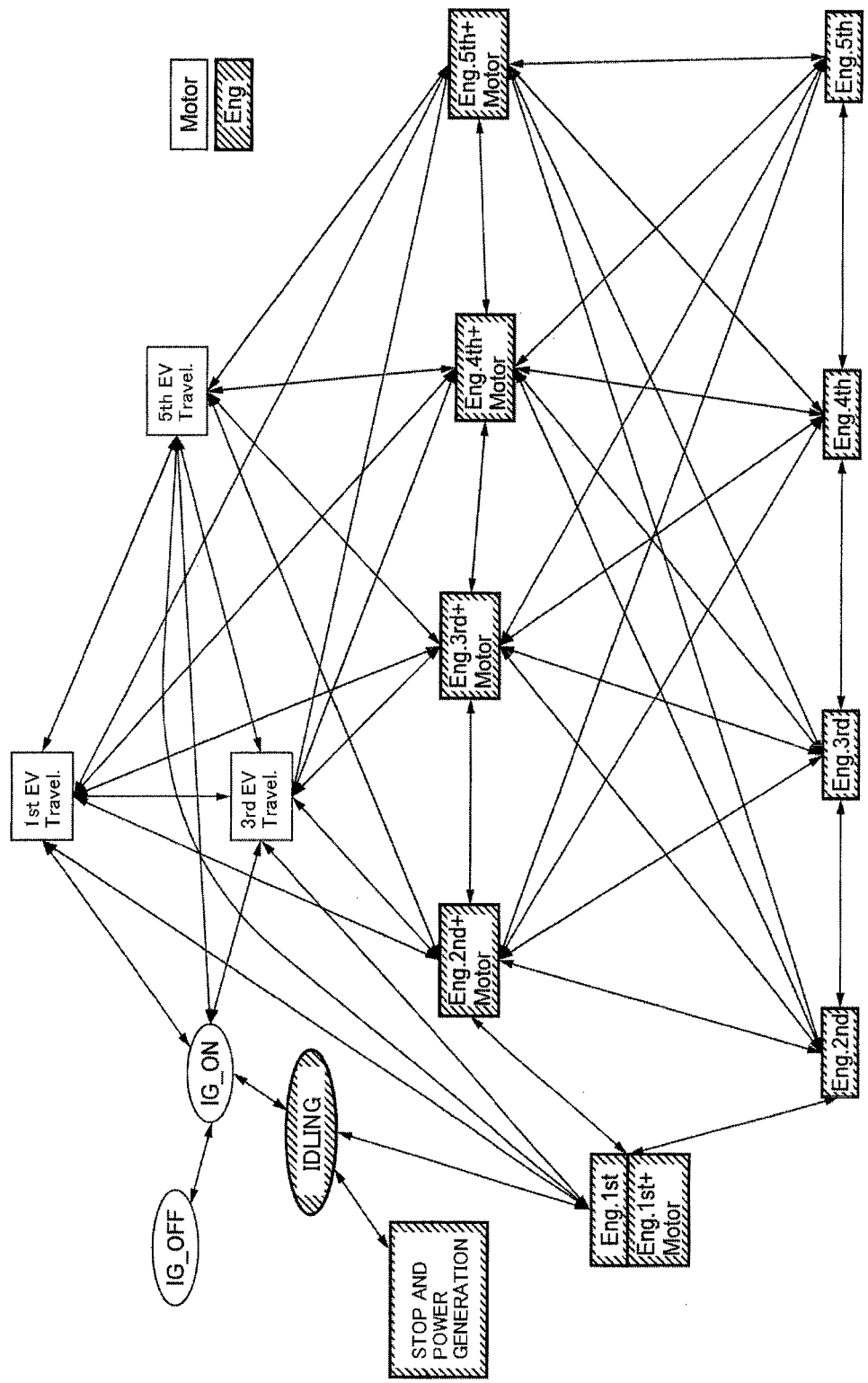
FIG. 29 is an explanatory view illustrating changes between respective modes in the power transmission apparatus of the first embodiment.

Although in the above-described embodiment, shift change is made gear by gear, the invention is not limited thereto. As shown in FIGS. 29 and 30, gear-shifting, assist, or charging may be appropriately carried out depending on the vehicle speed or necessary torque. For example, by starting the engine 6 during the EV traveling and by pre-shifting the second gear-shifting shifter 52 to carrying out the second-speed traveling under a double holding of the clutches 41, 42 as shown in (a) of FIG. 9 and (b) of FIG. 9, a transition from the EV traveling including the engine starting to a hybrid traveling is smoothly executed. In addition, in the odd-numbered stage traveling, by activating the engine in a bottom trace of a BSFC and regenerating the motor 7 when an engine output is over a required driving force, a fuel consumption can be improved.

As described above, according to the power transmission apparatus 1 of this embodiment, the sun gear 32 of the planetary gear mechanism 31 is connected to the first main shaft 11 as an input shaft, which is connected to the crankshaft 6a of the engine 6, and to the motor 7, and the carrier 36 is connected to the counter shaft 14 through the third-speed gear pair 23. For this reason, torque of the motor 7 can assist torque of the engine 6, and combined torque can be transmitted from the sun gear 32 of the planetary gear mechanism 31 to the counter shaft through the carrier 36. Therefore, vehicle mounting capability can be improved without newly supplementing a motor, as compared with a power distribution-type power transmission apparatus of the related art.

When the engine 6 is paused, the engine 6 can be ignited by the motor 7.

The power transmission apparatus 1 is a so-called twin clutch-type transmission having the first main shaft as a first input shaft, which is selectively coupled with the crankshaft 6a of the engine 6 by the first clutch 41, and the second intermediate shaft 16 as a second input shaft, which is selectively coupled with the crankshaft 6a of the engine 6 by the second clutch 42. Therefore, assist or regeneration by the motor can be carried out over the entire region, and EV traveling, internal combustion engine traveling, and motor assist traveling can be easily changed.

During EV traveling by the motor 7, the first clutch 41 and the second clutch 42 are disconnected and the motor 7 is driven, such that motor traveling can be carried out with no drag of the engine 6.

The ring gear 35 is connected to the lockable one-way clutch 61. Therefore, the ring gear 35 is locked such that a large reduction gear ratio can be obtained by the planetary gear mechanism 31, and the power transmission apparatus 1 can be reduced in size.

According to the power transmission apparatus 1 of this embodiment, the differential reduction unit 30 is formed by the planetary gear mechanism 31, such that the differential reduction unit can have a simple configuration. In addition, by setting a path where the power is transmitted through the planetary gear mechanism to be speed-reduced as a power transmitting path for the first speed as the lowest gear stage, it can be omitted to provide a first-speed gear which requires a large space in a thickness and a width for maintaining a strengthen of the gear due to a larger torque transmitting quantity compared to another gear stages. In the present embodiment, since the speed reduction is executed by the planetary gear mechanism 31 and a further reduction is executed by the third-speed gear pair 23, a required gear ratio can be obtained.

Either of dry type clutches or wet type clutches can be adopted as the first and second clutches 41, 42. When the dry type clutches are adopted, a drag loss can be decreased in the EV traveling compared with the wet type clutches.

Moreover, the power transmission apparatus 1 of the present embodiment is provided with a co-meshing structure in which the first common driven gear 23b is meshed with the second-speed drive gear 22a as well as the third-speed drive gear 23a, and the second common driven gear 24b is meshed with the fourth-speed drive gear 24a as well as the fifth-speed drive gear 25a. Accordingly, even in the odd-numbered stage traveling where the electric motor 7 is not connected, by in-gearing the first gear-shifting shifter to the third-speed connection position or the fifth-speed connection position and pre-shifting, an assist or the regeneration can be possible. In addition, by this co-meshing structure, the first gear-shifting shifter 51 on the first main shaft 11 and the second gear-shifting shifter 52 on the second intermediate shaft 16 can be align, so that it is possible to switching connections of both the first gear-shifting shifter 51 and the second gear-shifting shifter 52 by a single actuator using a cam mechanism.

In addition, according to the power transmission apparatus 1 of the present embodiment, a direct gear shifting without loss of time is possible by connecting (pre-shifting) the gear stage on the input shafts other than the input shaft where the gear stage in use is located prior to prior to the gear changing, and then changing coupling statuses of the first connection/disconnection unit 41 and the second connection/disconnection unit 42.

Furthermore, according to the power transmission apparatus 1 of the present embodiment, since the motor 7 is arranged on the first main shaft 11 where the fifth-speed drive gear 25a as the highest gear stage drive gear is provided, the output of the motor can be added to the output of the engine when further output is required even in a high speed traveling, so that a drivability of the vehicle can be further enhanced.

According to the power transmission apparatus 1 of this embodiment, at least a part of the rotor 72, the stator 71, or the coil 71c (cross winding portion) wound around the stator 71, which constitute the motor 7, is arranged to overlap with the planetary gear mechanism 31 in the axial direction. Therefore, the inner diameter-side space of the motor 7 can be effectively utilized, and the length of the power transmission apparatus 1 in the axial direction can be reduced.

According to the power transmission apparatus 1 of this embodiment, the lock mechanism is formed by the lockable one-way clutch 61, such that the rotations in the rotation permission direction and the opposite direction can be mechanically locked.

According to the power transmission apparatus 1 of this embodiment, the engine 6 and the motor 7 are arranged coaxially with the first main shaft 11 as a first input shaft. Therefore, a member having a large dimension in the radial direction is coaxially arranged, such that vehicle mounting capability of the power transmission apparatus 1 can be improved.

Second Embodiment

Figure 31:
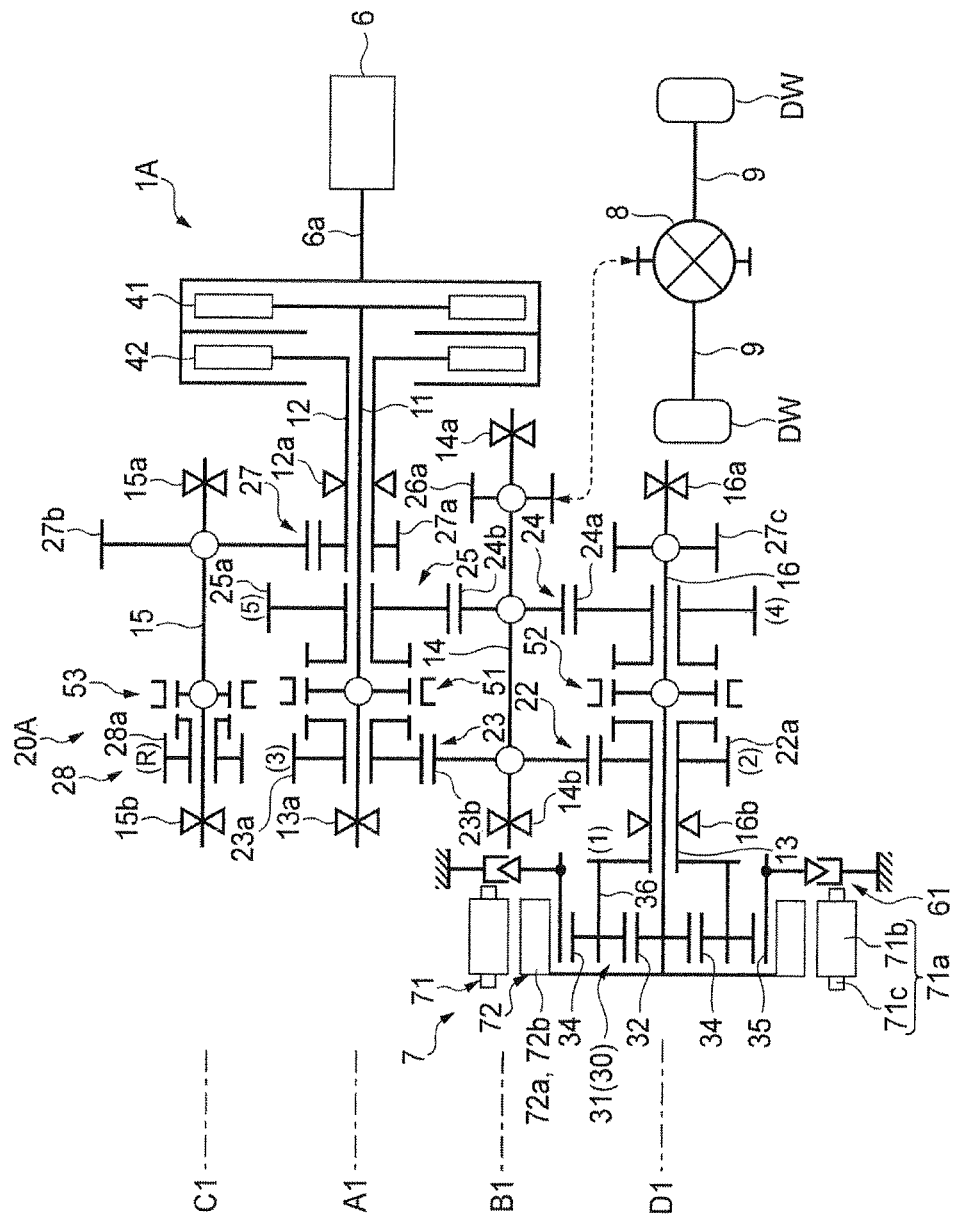
FIG. 31 is a diagram schematically showing a power transmission apparatus for a hybrid vehicle according to a second embodiment of the invention.

Next, a power transmission apparatus for a hybrid vehicle of a second embodiment will be described with reference to FIG. 31.

A power transmission apparatus 1A for a hybrid vehicle of this embodiment has the same configuration as the power transmission apparatus 1 of the first embodiment, except that the transmission has a different configuration. Therefore, the same parts as or similar parts to those of the power transmission apparatus 1 of the first embodiment are represented by the same or similar reference numerals, and description thereof will be simplified or omitted.

In a transmission 20A of this embodiment, the motor and the planetary gear mechanism 31 are attached at different positions from those of the transmission 20 of the first embodiment. Specifically, as shown in FIG. 31, the transmission 20A is configured such that the third-speed drive gear 23a and the fifth-speed drive gear 25a as an odd-numbered gear-shifting stage is provided in the first main shaft 11 as one input shaft of the two input shafts, the second-speed drive gear 22a and the fourth-speed drive gear 24a as an even-numbered gear-shifting stage are provided in the second intermediate shaft 16 as the other input shaft of the two input shafts, and the sun gear 32 of the planetary gear mechanism 31 and the rotor 72 of the motor 7 are integrally rotatably attached to each other.

Thus, a first transmission path becomes a transmission path in which the crankshaft 6a of the engine 6 is connected to the drive wheels DW and DW through the idle gear train 27, the second intermediate shaft 16, the sun gear 32 of the planetary gear mechanism 31, the carrier 36, the connection shaft 13, the second-speed gear pair 22, the counter shaft 14, the final gear 26a, the differential gear mechanism 8, and the drive shafts 9 and 9. A fourth transmission path becomes a transmission path in which the motor 7 is connected to the drive wheels DW and DW through the planetary gear mechanism 31, the second-speed gear pair 22, or the fourth-speed gear pair 24, the counter shaft 14, the final gear 26a, the differential gear mechanism 8, and the drive shafts 9 and 9.

The power transmission apparatus 1A for a hybrid vehicle has the same advantages as in the power transmission apparatus 1 for a hybrid vehicle of the first embodiment.

In addition, the engine 6 is arranged coaxially with the first main shaft 11 as a first input shaft, and the motor 7 is arranged coaxially with the second intermediate shaft 16 as a second input shaft. Therefore, this embodiment is suitable for a case where the dimension of the first main shaft 11 in the axial direction is limited, and the dimension of the first main shaft 11 in the axial direction can be reduced. Further, in the present embodiment, the first-speed drive gear may be arranged on the first main shaft 11 and a first-speed driven gear which is meshed with the first-speed drive gear may be arranged on the counter shaft 14. Thereby, the first-speed traveling powered by the engine 6 is possible even when the motor 7 is in trouble.

Third Embodiment

Figure 32:
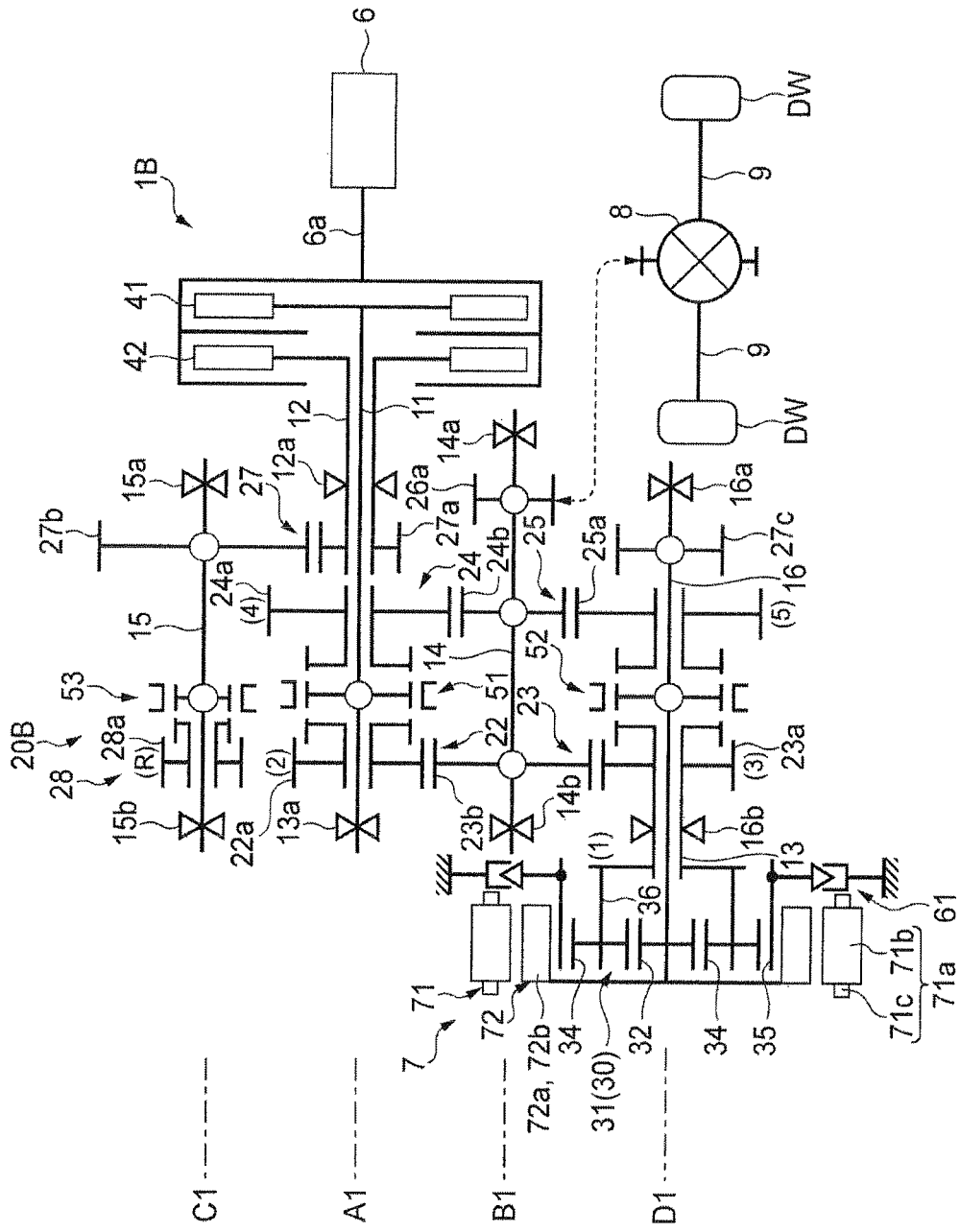
FIG. 32 is a diagram schematically showing a power transmission apparatus for a hybrid vehicle according to a third embodiment of the invention.

Next, a power transmission apparatus for a hybrid vehicle of a third embodiment will be described with reference to FIG. 32.

A power transmission apparatus 1B for a hybrid vehicle of this embodiment has the same configuration as the power transmission apparatus 1 of the first embodiment, except that the transmission has a different configuration. Therefore, the same parts as or similar parts to those of the power transmission apparatus 1 of the first embodiment are represented by the same or similar reference numerals, and description thereof will be simplified or omitted.

In a transmission 20B of this embodiment, the motor 7, the planetary gear mechanism 31, and the shifting gear are attached at different positions from those of the transmission 20 of the first embodiment. Specifically, as shown in FIG. 32, the transmission 20B is configured such that the second-speed drive gear 22a and the fourth-speed drive gear 24a as an even-numbered gear-shifting stage are provided in the first main shaft 11 as one input shaft of the two input shaft, the third-speed drive gear 23a and the fifth-speed drive gear 25a as an odd-numbered gear-shifting stage are provided in the second intermediate shaft 16 as the other input shaft of the two input shafts, and the sun gear 32 of the planetary gear mechanism 31 and the rotor 72 of the motor 7 are integrally rotatably attached to each other.

Thus, a first transmission path becomes a transmission path in which the crankshaft 6a of the engine 6 is connected to the drive wheels DW and DW through the second main shaft 12, the idle gear train 27, the second intermediate shaft 16, the sun gear 32 of the planetary gear mechanism 31, the carrier 36, the connection shaft 13, the third-speed gear pair 23, the counter shaft 14, the final gear 26a, the differential gear mechanism 8, and the drive shafts 9 and 9. A second transmission path becomes a transmission path in which the crankshaft 6a of the engine 6 is connected to the drive wheels DW and DW through the first main shaft 11, the second-speed gear pair 22 or the fourth-speed gear pair 24, the counter shaft 14, the final gear 26a, the differential gear mechanism 8, and the drive shafts 9 and 9.

A third transmission path becomes a transmission path in which the crankshaft 6a of the engine 6 is connected to the drive wheels DW and DW through the second main shaft 12, the idle gear train 27, the second intermediate shaft 16, the third-speed gear pair 23 or the fifth-speed gear pair 25, the counter shaft 14, the final gear 26a, the differential gear mechanism 8, and the drive shafts 9 and 9.

The power transmission apparatus 1B for a hybrid vehicle has the same advantages as in the power transmission apparatus 1 for a hybrid vehicle of the first embodiment.

Fourth Embodiment

Figure 33:
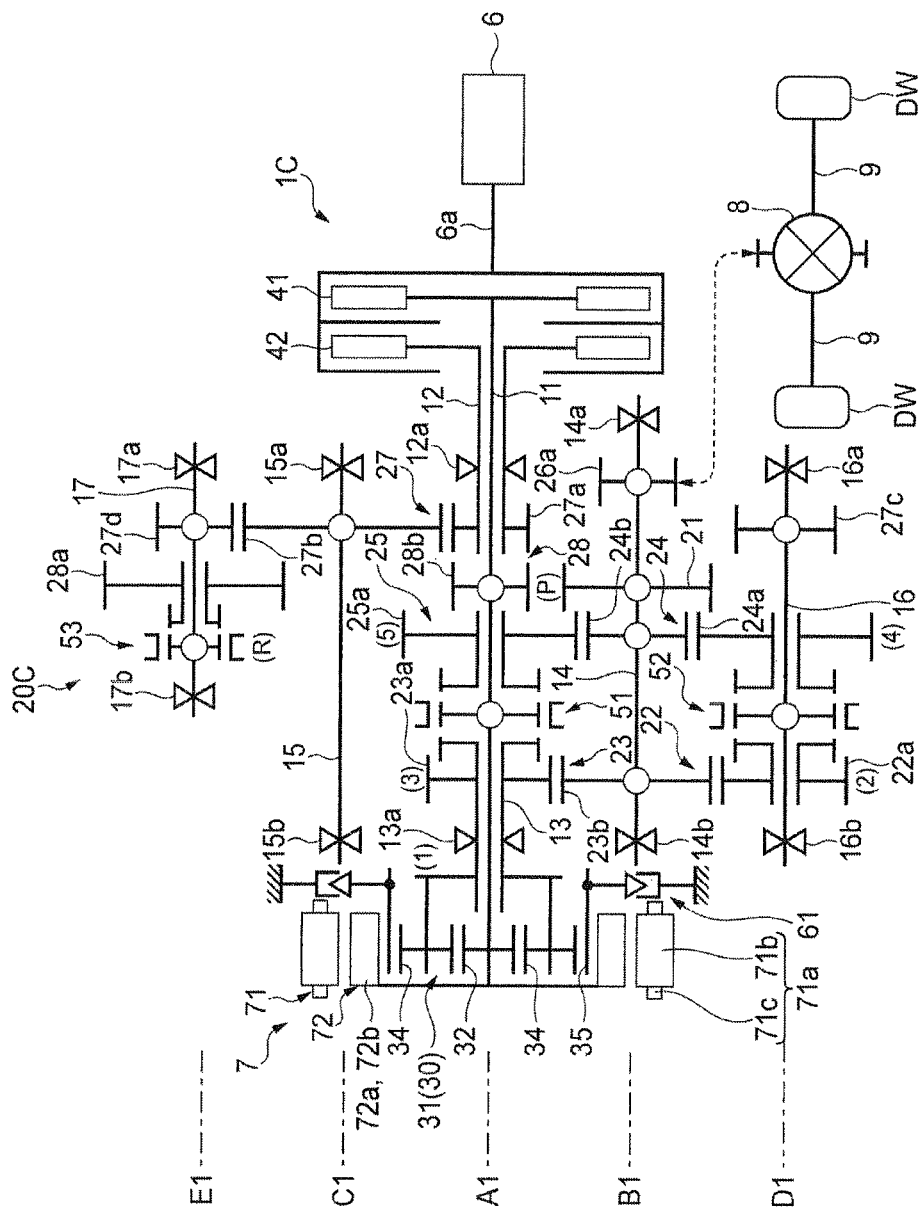
FIG. 33 is a diagram schematically showing a power transmission apparatus for a hybrid vehicle according to a fourth embodiment of the invention.

Next, a power transmission apparatus for a hybrid vehicle of a fourth embodiment will be described with reference to FIG. 33.

A power transmission apparatus 1C for a hybrid vehicle of this embodiment has the same configuration as the power transmission apparatus 1 of the first embodiment, except that the transmission has a different configuration. Therefore, the same parts as or similar parts to those of the power transmission apparatus 1 of the first embodiment are represented by the same or similar reference numerals, and description thereof will be simplified or omitted.

A transmission 20C of this embodiment further has a reverse shaft 17 which freely rotates around a rotation axis E1 in parallel to the rotation axes A1 to D1, and the reverse drive gear 28a is provided in the reverse shaft 17 while no reverse drive gear 28a is provided in the first intermediate shaft 15.

The reverse shaft 17 is rotatably supported by bearings 17a and 17b which are fixed to the casing (not shown). A third idle driven gear 27d which is meshed with the first idle driven gear 27b attached to the first intermediate shaft 15 is integrally rotatably attached to the reverse shaft 17, and the reverse drive gear 28a is provided in the reverse shaft 17 to relatively rotate with respect to the reverse shaft 17. The third idle driven gear 27d constitutes a second idle gear train 27B together with the idle drive gear 27a and the first idle driven gear 27b. The reverse shaft 17 is also provided with a reverse shifter 53 which connects or disconnects the reverse shaft 17 and the reverse drive gear 28a. When the reverse shifter 53 is in-geared to the reverse connection position, the reverse shaft 17 and the reverse drive gear 28a integrally rotate. When the reverse shifter 53 is at the neutral position, the reverse shaft 17 and the reverse drive gear 28a relatively rotate.

A reverse driven gear 28b which is meshed with the reverse drive gear 28a provided in the reverse shaft 17 is attached to the first main shaft 11 to rotate integrally with the first main shaft 11 between the fifth-speed drive gear 25a and the idle drive gear 27a attached with the second main shaft 12. The reverse driven gear 28b constitutes the reverse gear pair 28 together with the reverse drive gear 28a.

When reverse traveling is carried out by the power transmission apparatus 1C, reverse traveling is realized by in-gearing the reverse shifter 53 to the reverse connection state in the initial state and locking the one-way clutch 61 to connect the second clutch 42. Thus, torque of the engine 6 is transmitted to the drive wheels DW and DW through the second main shaft 12, the second idle gear train 27B (idle drive gear 27a, first idle driven gear 27b, and third idle driven gear 27d), the reverse gear pair 28 (reverse drive gear 28a and first common driven gear 23b), the first main shaft 11, the sun gear 32 of the planetary gear mechanism 31, the carrier 36, the connection shaft 13, the third-speed gear pair 23 (third-speed drive gear 23a and first common driven gear 23b), the counter shaft 14, the final gear 26a, the differential gear mechanism 8, and the drive shafts 9 and 9.

A parking gear 29 constituting a parking lock mechanism (not shown) is attached to the counter shaft 14 to rotate integrally with the counter shaft 14 between the second common driven gear 24b and the final gear 26a. The parking gear 29 is locked by the parking lock mechanism (not shown) at the time of engine start by the motor 7 shown in (b) of FIG. 5 and at the time of charging during idling shown in (a) of FIG. 28 and (b) of FIG. 28, so even when an unintended drive force is applied, power can be reliably prevented from being transmitted to the drive wheels DW and DW.

The power transmission apparatus 1C for a hybrid vehicle of this embodiment has the same advantages as in the power transmission apparatus 1 for a hybrid vehicle of the first embodiment. In addition, during reverse traveling, the gear ratio can be increased. Furthermore, since the parking gear 29 is provided, even when an unintended drive force is applied at the time of engine start by the motor 7 and at the time of charging during idling, power can be reliably prevented from being transmitted to the drive wheels DW and DW.

Fifth Embodiment

Figure 34:
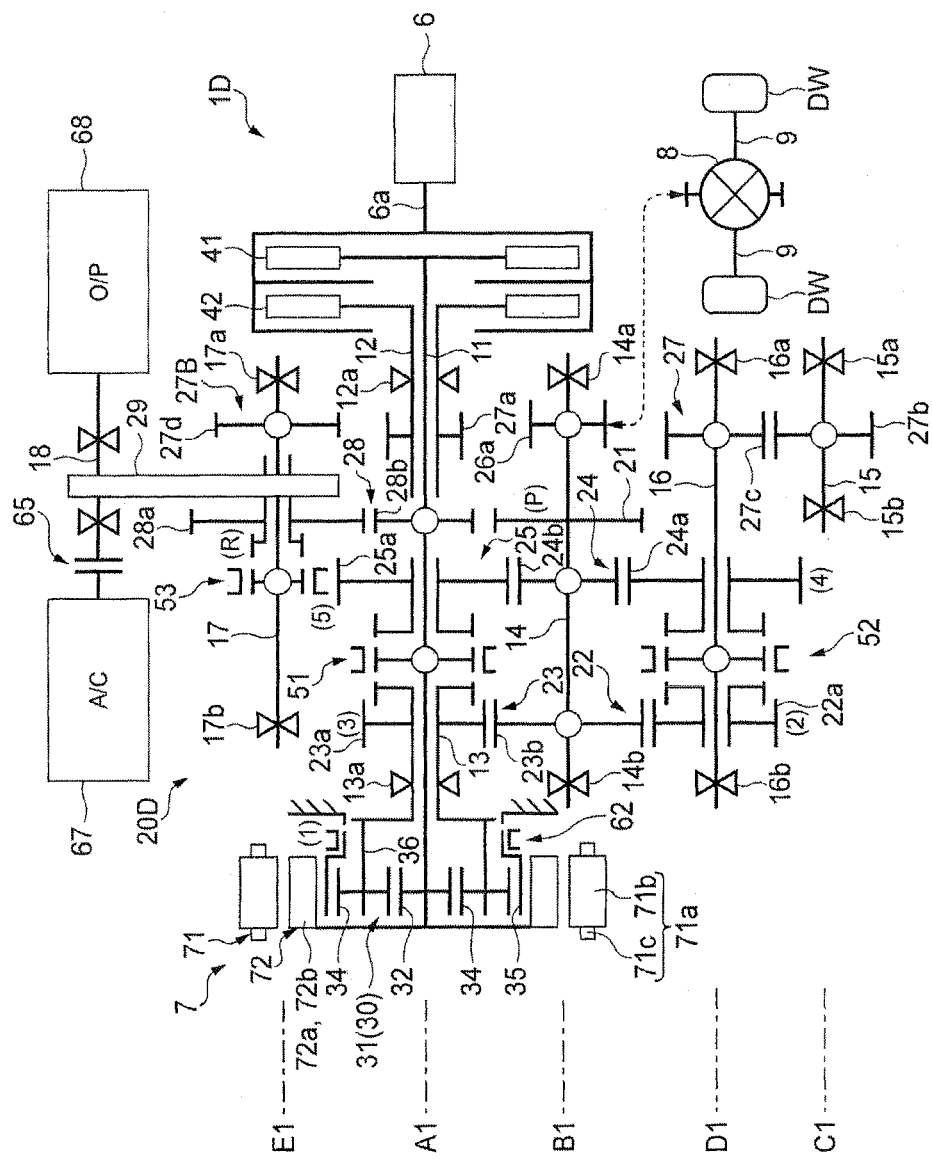
FIG. 34 is a diagram schematically showing a power transmission apparatus for a hybrid vehicle according to a fifth embodiment of the invention.

Next, a power transmission apparatus for a hybrid vehicle of a fifth embodiment will be described with reference to FIG. 34.

A power transmission apparatus 1D for a hybrid vehicle of this embodiment has the same configuration as the power transmission apparatus 1C of the fourth embodiment, except that the lock mechanism incorporated in the transmission has a different configuration. Therefore, the same parts as or similar parts to those of the power transmission apparatus 1C of the fourth embodiment are represented by the same or similar reference numerals, and description thereof will be simplified or omitted.

A transmission 20D of this embodiment is configured such that a synchronous lock device 62 including a synchronizer mechanism is provided instead of the one-way clutch 61, and the ring gear 35 is smoothly locked in response to signals from the electronic control device (not shown).

In the power transmission apparatus 1D, a compressor 67 of an air conditioner and an oil pump 68 are further provided. The compressor 67 of the air conditioner and the oil pump 68 are coaxially arranged on an accessory shaft 18, interposing a chain 29 therebetween. The power of the engine 6 and/or the motor 7 which rotating the first main shaft 11 is transmitted by an accessory pulley through the chain 29 to the accessory shaft 18. In addition, an A/C clutch 65 is also provided between the compressor 67 of the air conditioner and the accessory shaft 18, so that a power transmitting therebetween can be cut.

Accordingly, by rotating the first main shaft 11, the compressor 67 of the air conditioner and the oil pump 68 can be driven through the reverse gar pair 28 and the chain 29. In addition, the reverse traveling in the power transmission apparatus 1D is carried out by in-gearing the reverse shifter 53 to the reverse connection position, locking the synchronous lock device 62, and connecting the second clutch 42, as also explained for the power transmission apparatus 1C. Since the chain 29 is coupled to the reverse drive gear 28a, when a driver is waiting while pressing a brake pedal, the compressor 67 of the air conditioner and the oil pump 68 would be stopped. However, in the present embodiment, when the driver is waiting while pressing the brake pedal during in-gearing the reverse shifter 53, the compressor 67 for the air conditioner is driven without outputting the power to the drive wheels DW, DW, by temporally releasing the locking of the ring gear 35, and when the driver releases the brake pedal, the ring gear 35 is locked again. Thereby, the compressor 67 of the air conditioner can be driven without outputting the power to the drive wheels DW, DW, and a smooth transition to the reverse traveling can be possible. Further, this control may be executed only when a defogger apparatus detects a condition that a window would be fogged.

The power transmission apparatus 1D for a hybrid vehicle configured as above has the same advantages as in the first to fourth embodiments. In addition, the compressor 67 of the air conditioner and the oil pump 68 can be driven by the power of the engine 6 and/or the motor 7.

Sixth Embodiment

Figure 35:
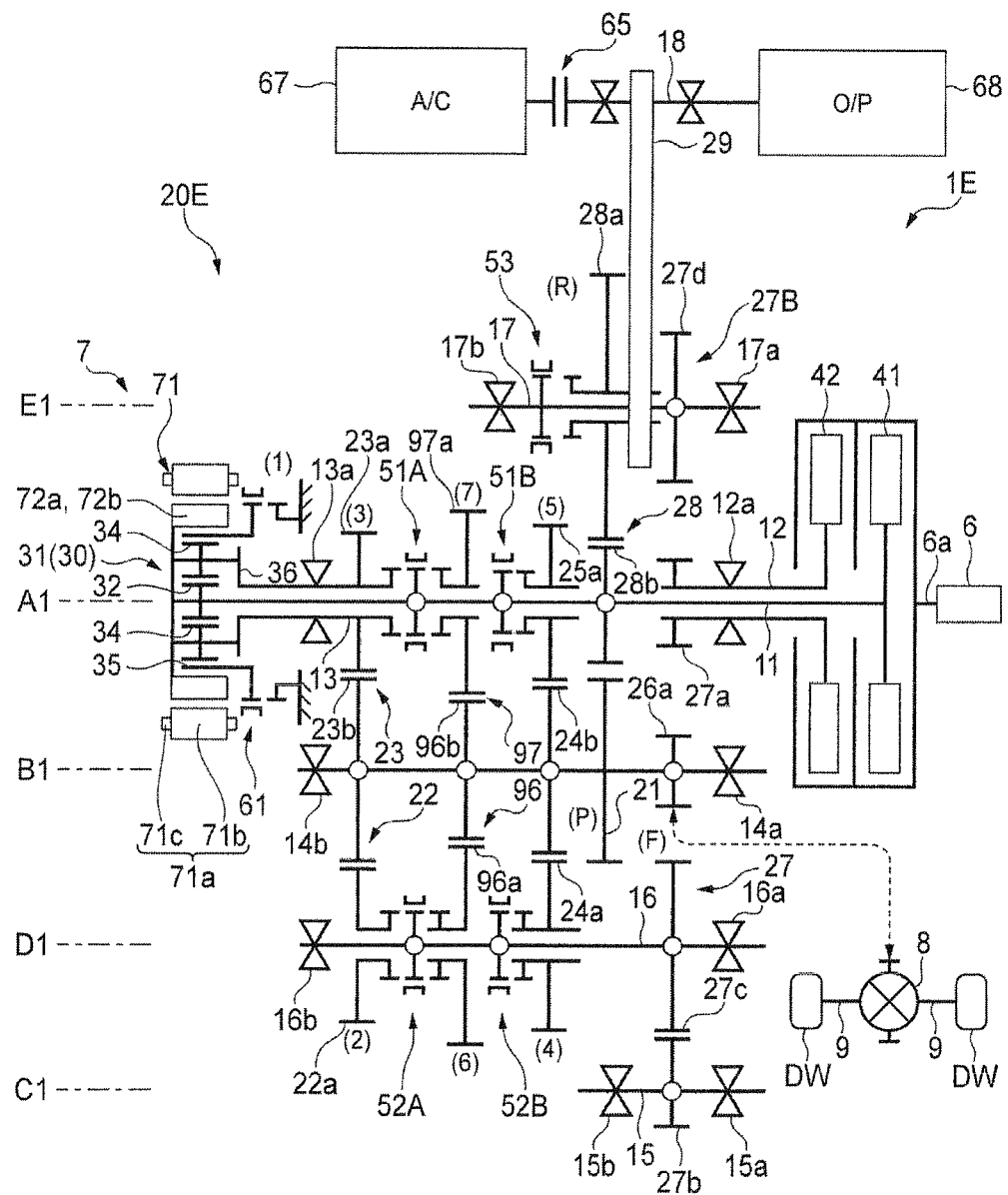
FIG. 35 is a diagram schematically showing a power transmission apparatus for a hybrid vehicle according to a sixth embodiment of the invention.
Figure 36:
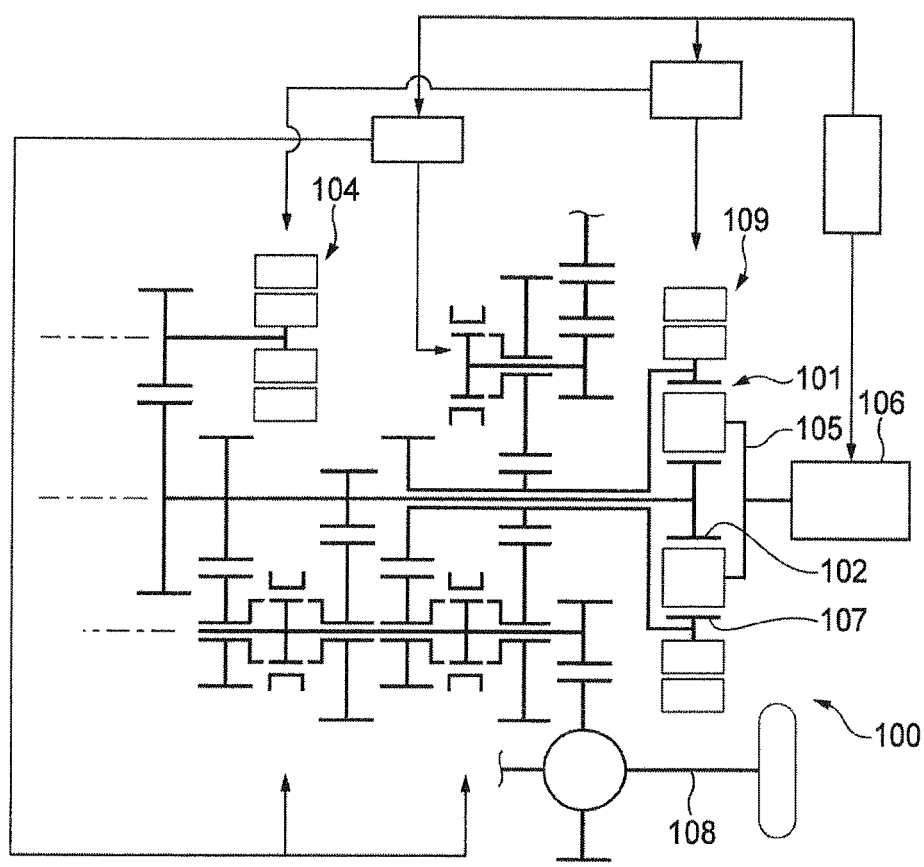
FIG. 36 is a diagram schematically showing a power transmission apparatus for a hybrid vehicle described in PTL 1.

Next, a power transmission apparatus for a hybrid vehicle of a sixth embodiment will be described with reference to FIG. 35.

A power transmission apparatus 1E for a hybrid vehicle of this embodiment is different from the power transmission apparatus 1D for a hybrid vehicle in that a transmission includes a planetary gear mechanism 31 constituting a differential reduction unit 30, and a sixth-speed gear pair 96 and a seventh-speed gear pair 97, in addition to the second to fifth-speed gear pairs 22 to 25. Therefore, the same parts as or similar parts to the those of the power transmission apparatus 1D of the fifth embodiment are represented by the same or similar reference numerals, and description thereof will be simplified or omitted. Only differences from the power transmission apparatus 1D will be described.

The first main shaft 11 is provided with a seventh-speed drive gear 97a to relatively rotate with respect to the first main shaft 11 between the third-speed drive gear 23a and the fifth-speed drive gear 25a. A first gear-shifting shifter 51A which connects or disconnects the first main shaft 11 and the third-speed drive gear 23a or the seventh-speed drive gear 97a is provided between the third-speed drive gear 23a and the seventh-speed drive gear 97a. A third gear-shifting shifter 51B which connects or disconnects the first main shaft 11 and the fifth-speed drive gear 25a is provided between the seventh-speed drive gear 97a and the fifth-speed drive gear 25a. When the first gear-shifting shifter 51A is in-geared to the third-speed connection position, the first main shaft 11 and the third-speed drive gear 23a are connected and integrally rotate. When the first gear-shifting shifter 51A is in-geared to a seventh-speed connection position, the first main shaft 11 and the seventh-speed drive gear 97a integrally rotate. When the first gear-shifting shifter 51A is at the neutral position, the first main shaft 11 relatively rotates with respect to the third-speed drive gear 23a and the seventh-speed drive gear 97a. When the third gear-shifting shifter 51B is in-geared to the fifth-speed connection position, the first main shaft 11 and the fifth-speed drive gear 25a are connected and integrally rotate. When the third gear-shifting shifter 51B is at the neutral position, the first main shaft 11 relatively rotates with respect to the fifth-speed drive gear 25a.

The second intermediate shaft 16 is provided with a sixth-speed drive gear 96a to relatively rotate with respect to the second intermediate shaft 16 between the second-speed drive gear 22a and the fourth-speed drive gear 24a. A second gear-shifting shifter 52A which connects or disconnects the second intermediate shaft 16 and the second-speed drive gear 22a or the sixth-speed drive gear 96a is provided between the second-speed drive gear 22a and the sixth-speed drive gear 96a. A fourth gear-shifting shifter 52B which connects or disconnects the second intermediate shaft 16 and the fourth-speed drive gear 24a is provided between the sixth-speed drive gear 96a and the fourth-speed drive gear 24a. When the second gear-shifting shifter 52A is in-geared to the second-speed connection position, the second intermediate shaft 16 and the second-speed drive gear 22a are connected and integrally rotate. When the second gear-shifting shifter 52A is in-geared to the sixth-speed connection position, the second intermediate shaft 16 and the sixth-speed drive gear 96a integrally rotate. When the second gear-shifting shifter 52A is at the neutral position, the second intermediate shaft 16 relatively rotates with respect to the second-speed drive gear 22a and the sixth-speed drive gear 96a. When the fourth gear-shifting shifter 52B is in-geared to the fourth-speed connection position, the second intermediate shaft 16 and the fourth-speed drive gear 24a are connected and integrally rotate. When the fourth gear-shifting shifter 52B is at the neutral position, the second intermediate shaft 16 relatively rotates with respect to the fourth-speed drive gear 24a.

A third common driven gear 96b is attached to the counter shaft 14 to rotate integrally with the counter shaft 14 between the first common driven gear 23b and the second common driven gear 24b.

The third common driven gear 96b is meshed to the seventh-speed drive gear 97a provided in the first main shaft 11 and constitutes the seventh-speed gear pair 97 together with the seventh-speed drive gear 97a. The third common driven gear 96b is also meshed with the sixth-speed drive gear 96a provided in the second intermediate shaft 16 and constitutes the sixth-speed gear pair 26 together with the sixth-speed drive gear 96a.

In a state where the second gear-shifting shifter 52A is in-geared to the sixth-speed connection position, the second clutch 42 is connected, such that sixth-speed traveling can be carried out. In addition, in a state where the first gear-shifting shifter 51A is in-geared to the seventh-speed connection position, the first clutch 41 is connected, and seventh-speed traveling can be carried out, such that assist or charging can be carried out by the motor 7.

The power transmission apparatus 1E configured as above has the same advantages as in the first to fifth embodiments. In addition, sixth-speed and seventh-speed traveling can be carried out.

The invention is not limited to the above-described embodiments, and may be appropriately modified or improved.

Although the lockable one-way clutch 61 or the synchronous lock device 62 is illustrated as a lock mechanism, the invention is not limited thereto. A brake may be used which is configured to stop rotation of the ring gear 35. Thus, a mechanism which stops rotation of the motor 7 can be realized with a simple configuration.

The differential reduction unit is not limited to a single pinion-type planetary gear mechanism, and a double pinion-type planetary gear mechanism may be used. In addition, the differential reduction unit is not limited to a mechanical type, such as a planetary gear mechanism. For example, a type, such as a reciprocal differential motor, in which differential rotation is generated may be used.

Ninth-speed, eleventh-speed, . . . drive gears may be provided as the odd-numbered gear-shifting stage in addition to the third-speed drive gear, the fifth-speed drive gear, and the seventh-speed drive gear, and eighth-speed, tenth-speed, . . . drive gears may be provided as the even-numbered gear-shifting stage in addition to the second-speed drive gear, the fourth-speed drive gear, and the sixth-speed drive gear. With regard to the number of gears at the gear-shifting stages, at least one gear may be provided at each gear-shifting stage.

This application is based on Japanese Patent Application No. 2009-49254 filed on Mar. 3, 2009, the enclosure of which is incorporated herein by reference.

REFERENCE SIGNS LIST 1, 1A, 1B, 1C, 1D, 1E: POWER TRANSMISSION APPARATUS FOR A HYBRID VEHICLE
3: BATTERY
6: ENGINE (INTERNAL COMBUSTION ENGINE)
6a: CRANKSHAFT (ENGINE-OUTPUT SHAFT)
7: MOTOR (ELECTRIC MOTOR)
9: DRIVE SHAFT
11: FIRST MAIN SHAFT (FIRST INPUT SHAFT)
12: SECOND MAIN SHAFT
13: CONNECTION SHAFT
14: COUNTER SHAFT (OUTPUT/INPUT SHAFT)
15: FIRST INTERMEDIATE SHAFT (INTERMEDIATE SHAFT)
16: SECOND INTERMEDIATE SHAFT (SECOND INPUT SHAFT)
20, 20A, 20B, 20C, 20D, 20E: TRANSMISSION
22: SECOND-SPEED GEAR PAIR
22a: SECOND-SPEED DRIVE GEAR
23: THIRD-SPEED GEAR PAIR
23a: THIRD-SPEED DRIVE GEAR
23b: FIRST COMMON DRIVEN GEAR
24: FOURTH-SPEED GEAR PAIR
24a: FOURTH-SPEED DRIVE GEAR
24b: SECOND COMMON DRIVEN GEAR
25: FIFTH-SPEED GEAR PAIR
25a: FIFTH-SPEED DRIVE GEAR
26a: FINAL GEAR
27: IDLE GEAR TRAIN
27B: SECOND IDLE GEAR TRAIN
27a: IDLE DRIVE GEAR
27b: FIRST IDLE DRIVEN GEAR
27c: SECOND IDLE DRIVEN GEAR
27d: THIRD IDLE DRIVEN GEAR
28: REVERSE GEAR PAIR
28a: REVERSE DRIVE GEAR
28b: REVERSE DRIVEN GEAR
30: DIFFERENTIAL REDUCTION UNIT
31: PLANETARY GEAR MECHANISM
32: SUN GEAR (FIRST ELEMENT)
35: RING GEAR (THIRD ELEMENT)
36: CARRIER (SECOND ELEMENT)
41: FIRST CLUTCH (FIRST CONNECTION/DISCONNECTION UNIT)
42: SECOND CLUTCH (SECOND CONNECTION/DISCONNECTION UNIT)
51, 51A: FIRST GEAR-SHIFTING SHIFTER
51B: THIRD GEAR-SHIFTING SHIFTER
52, 52A: SECOND GEAR-SHIFTING SHIFTER
52B: FOURTH GEAR-SHIFTING SHIFTER
53: REVERSE SHIFTER
61: ONE-WAY CLUTCH (LOCK MECHANISM)
62: SYNCHRONOUS LOCK DEVICE (LOCK MECHANISM)
96: SIXTH-SPEED GEAR PAIR
96a: SIXTH-SPEED DRIVE GEAR
96b: THIRD COMMON DRIVEN GEAR
97: SEVENTH-SPEED GEAR PAIR
97a: SEVENTH-SPEED DRIVE GEAR

INDUSTRIAL APPLICABILITY

The invention is applicable to a power transmission apparatus in a hybrid vehicle in which an internal combustion engine and an electric motor are mounted.

The invention claimed is:

1. A power transmission apparatus for a hybrid vehicle having an internal combustion engine and an electric motor, the power transmission apparatus comprising:
    an engine-output shaft to which a power is output from the internal combustion engine;
    a first input shaft arranged in parallel to the engine-output shaft and selectively coupled with the engine-output shaft by a first connection/disconnection unit;
    a second input shaft arranged in parallel to the engine-output shaft and selectively coupled with the engine-output shaft by a second connection/disconnection unit;
    an output/input shaft arranged in parallel to the engine-output shaft and configured to output the power to a driven portion;
    a first gear group arranged on the first input shaft, the first gear group having a plurality of gears selectively coupled with the first input shaft through a first synchronization device;
    a second gear group arranged on the second input shaft, the second gear group having a plurality of gears selectively coupled with the second input shaft through a second synchronization device;
    a third gear group arranged on the output/input shaft, the third gear group having a plurality of gears meshed with the gears of the first gear group and the gears of the second gear group; and
    a differential reduction unit in which a first rotation element, a second rotation element, and a third rotation element are rotatable differentially from each other,
    wherein the first rotation element is connected to one of the first input shaft and the second input shaft and also connected to the electric motor,
    the third rotation element is connected to a lock mechanism capable of stopping rotation thereof,
    the second rotation element is connected to one of the gears of the first gear group arranged on the first input shaft and the gears of the second gear group arranged on the second input shaft to transmit power to the output/input shaft, and
    the other of the first input shaft and the second input shaft which is not connected to the first rotation element is configured to transmit power to the output/input shaft without passing through the differential reduction unit.

2. The power transmission apparatus for a hybrid vehicle according to claim 1, wherein the other of the first input shaft and the second input shaft which is not connected to the first rotation element is connected to the engine-output shaft through an idle gear train.

3. The power transmission apparatus for a hybrid vehicle according to claim 2,
    wherein a first intermediate shaft is provided in parallel to the first input shaft and the second input shaft,
    idle gears constituting the idle gear train are attached to the first intermediate shaft so as to integrally rotate therewith, and a reverse drive gear which is selectively coupled with the first intermediate shaft through a reverse synchronization device is provided on the first intermediate shaft, and
    the reverse drive gear is meshed with the gears of the third gear group.

4. The power transmission apparatus for a hybrid vehicle according to claim 2,
    wherein a first intermediate shaft and a reverse shaft are provided in parallel to the first input shaft and the second input shaft,
    first idle gears constituting the idle gear train are attached to the first intermediate shaft so as to integrally rotatable therewith,
    second idle gears which are meshed with the first idle gears are attached to the reverse shaft so as to integrally rotatable therewith, and a reverse drive gear which is selectively coupled with the reverse shaft through a reverse synchronization device is provided on the reverse shaft,
    a reverse driven gear which is meshed with the reverse drive gear is attached to one of the first input shaft and the second input shaft so as to integrally rotatable therewith.

5. The power transmission apparatus for a hybrid vehicle according to claim 4, wherein the first rotation element is connected to the first input shaft,
    the power of the internal combustion engine is transmitted through the reverse drive gear and the reverse driven gear to the first input shaft as a reverse rotation by connecting the second connection/disconnection unit and connecting the reverse synchronization device, and
    the power of the electric motor is added to a reverse traveling by outputting the power from the electric motor in a reverse rotating and locking the third rotation element.

6. The power transmission apparatus for a hybrid vehicle according to claim 4, wherein a compressor of an air conditioner is connected to the reverse drive gear in a manner that a power is transmittable,
    the compressor of the air conditioner is driven without outputting the power into the output/input shaft, by temporarily releasing a locking of the third rotation element, in an idling state where a driver is pressing a brake pedal while the reverse synchronization device is connected, and
    the third rotation element is locked when the driver releases the brake pedal.

7. The power transmission apparatus for a hybrid vehicle according to claim 4, further comprising:
    a plug-in mechanism for enabling an electric charging from an outer charging apparatus to an electric storage device,
    wherein, in an EV traveling, an EV shifting mode where an odd-numbered stage traveling of a third-speed traveling or a traveling over the third-speed traveling is carried out after a starting in a first speed and an EV fixing mode where the starting and the traveling is carried out in a third-speed are selectable by a driver.

8. The power transmission apparatus for a hybrid vehicle according to claim 2,
    wherein, in a state where EV traveling is carried out by disconnecting the first and second connection/disconnection units and connecting the first synchronization device to drive the electric motor, when the internal combustion engine is started by extracting torque of the electric motor, releasing the first synchronization device, and connecting the first connection/disconnection unit, a power is output from the second rotation element, and the third rotation element rotates in the reverse rotation direction.

9. The power transmission apparatus for a hybrid vehicle according to claim 1, wherein the differential reduction unit is a planetary gear-type reduction unit which coaxially includes, as three single pinion-type rotation elements, a sun gear, a ring gear, and a carrier rotatably supporting a plurality of planetary gears meshed between the sun gear and the ring gear, the first rotation element is the sun gear,
the second rotation element is the carrier, and
the third rotation element is the ring gear.

10. The power transmission apparatus for a hybrid vehicle according to claim 9, wherein the lock mechanism is a brake capable of locking the third rotation element or includes a brake unit capable of locking the third rotation element.

11. The power transmission apparatus for a hybrid vehicle according to claim 1, wherein at least a part of a rotor, a stator, or a cross winding portion constituting the electric motor is arranged to overlap with the differential reduction unit in an axial direction.

12. The power transmission apparatus for a hybrid vehicle according to claim 1, wherein the lock mechanism is a brake capable of locking the third rotation element or includes a brake unit capable of locking the third rotation element.

13. The power transmission apparatus for a hybrid vehicle according to claim 12,
wherein the lock mechanism comprises a one-way clutch including said brake unit, and
the one-way clutch is configured to selectively set whether to permit a rotation of the third rotation element in a normal rotation direction or a rotation of the third rotation element in a reverse rotation direction in a state where the third rotation element is not locked by the brake unit.

14. The power transmission apparatus for a hybrid vehicle according to claim 1,
wherein the internal combustion engine and the electric motor are arranged coaxially with the first input shaft, and
the first rotation element is connected to the first input shaft.

15. The power transmission apparatus for a hybrid vehicle according to claim 14,
wherein, after the internal combustion engine has been started, a first-speed traveling is carried out by disconnecting the first connection/disconnection unit and driving the electric motor such that the third rotation element rotates in the normal rotation direction, and then by stopping the third rotation element by the lock mechanism and connecting the first connection/disconnection unit.

16. The power transmission apparatus for a hybrid vehicle according to claim 14, wherein a power from the first rotation element is not transmitted through the second rotation element to the output/input shaft, by releasing the first synchronization device and not locking the third rotation element, when the first connection/disconnection unit is connected and the electric motor is regenerating during an idling of the internal combustion engine.

17. The power transmission apparatus for a hybrid vehicle according to claim 14, wherein a compressor of an air conditioner and an oil pump are connected to the first input shaft, and
the compressor of the air conditioner and the oil pump are driven by the power for traveling.

18. The power transmission apparatus for a hybrid vehicle according to claim 1,
wherein the gears of the first gear group and the gears of the third gear group are meshed with each other to constitute a plurality of odd-numbered stage gear pairs, and
the gears of the second gear group and the gears of the third gear group are meshed with each other to constitute a plurality of even-numbered stage gear pairs.

19. The power transmission apparatus for a hybrid vehicle according to claim 18,
wherein, in a first-speed traveling, the first synchronization device is disconnected, the third rotation element is locked by the lock mechanism, and a power of the first rotation element is transmitted to the second rotation element, and
in a third-speed traveling or an odd-numbered stage traveling over the third-speed traveling, the first synchronization device is connected and the lock state of the third rotation element by the lock mechanism is released so as to transmit power.

20. The power transmission apparatus for a hybrid vehicle according to claim 1,
wherein, in a reverse traveling,
the first connection/disconnection unit and the second connection/disconnection unit are disconnected to release a connection with the internal combustion engine, and the third rotation element is locked by the lock mechanism, or
the lock state of the third rotation element by the lock mechanism is released, the first synchronization device is connected, and the electric motor is reversely rotated.

21. The power transmission apparatus for a hybrid vehicle according to claim 1,
wherein the internal combustion engine is arranged coaxially with the first input shaft, the electric motor is arranged coaxially with the second input shaft, and the first rotation element is connected to the second input shaft.

22. The power transmission apparatus for a hybrid vehicle according to claim 21,
wherein the gears of the first gear group and the gears of the third gear group are meshed with each other to constitute a plurality of odd-numbered stage gear pairs, and
the gears of the second gear group and the gears of the third gear group are meshed with each other to constitute a plurality of even-numbered stage gear pairs.

23. The power transmission apparatus for a hybrid vehicle according to claim 21,
wherein the gears of the first gear group and the gears of the third gear group are meshed with each other to constitute a plurality of even-numbered stage gear pairs, and
the gears of the second gear group and the gears of the third gear group are meshed with each other to constitute a plurality of odd-numbered stage gear pairs.

24. The power transmission apparatus for a hybrid vehicle according to claim 1, further comprising:
a plug-in mechanism for enabling an electric charging from an outer charging apparatus to an electric storage device,
wherein, in an EV traveling, an EV shifting mode where an odd-numbered stage traveling of a third-speed traveling or a traveling over the third-speed traveling is carried out after a starting in a first speed and an EV fixing mode where the starting and the traveling is carried out in a third-speed are selectable by a driver.

25. The power transmission apparatus for a hybrid vehicle according to claim 24, wherein the EV shifting mode is selectable during the EV traveling in the EV fixing mode,
when a rotating speed is out of a range where an ignition of the internal combustion engine is possible in the third-speed traveling, the ignition of the internal combustion engine is carried out after a shifting down to the first-speed traveling.

* * * * *